(12) United States Patent
Mittelmark

(10) Patent No.: US 9,010,019 B2
(45) Date of Patent: Apr. 21, 2015

(54) PLANT AIR PURIFICATION ENCLOSURE APPARATUS AND METHOD

(75) Inventor: Martin Mittelmark, Schuylerville, NY (US)

(73) Assignees: Marc A. Mittelmark, Apex, NC (US); Zachary Mittelmark, Boston, MA (US); Michael Mittelmark, Marina Del Ray, CA (US); Matthew Mittelmark, Lexington, MA (US)

( * ) Notice: Subject to any disclaimer, the term of this patent is extended or adjusted under 35 U.S.C. 154(b) by 292 days.

(21) Appl. No.: 13/580,159

(22) PCT Filed: Mar. 10, 2011

(86) PCT No.: PCT/US2011/027860
§ 371 (c)(1),
(2), (4) Date: Aug. 21, 2012

(87) PCT Pub. No.: WO2011/115806
PCT Pub. Date: Sep. 22, 2011

(65) Prior Publication Data
US 2012/0311926 A1    Dec. 13, 2012

Related U.S. Application Data

(63) Continuation-in-part of application No. 13/060,668, filed on Feb. 24, 2011, now Pat. No. 8,894,741, and a continuation-in-part of application No. 13/062,580, filed on Mar. 7, 2011, now Pat. No. 8,083,835.

(60) Provisional application No. 61/314,215, filed on Mar. 16, 2010.

(51) Int. Cl.
*A01G 9/16* (2006.01)
*F24F 3/16* (2006.01)
*B01D 53/84* (2006.01)

(52) U.S. Cl.
CPC . *F24F 3/16* (2013.01); *B01D 53/84* (2013.01); *B01D 2259/4508* (2013.01); *F24F 2003/1653* (2013.01)

(58) Field of Classification Search
CPC ............ A01G 9/14; A01G 9/246; A01G 9/24
USPC .................................................. 47/17, 1.01 R
See application file for complete search history.

(56) References Cited

U.S. PATENT DOCUMENTS 3,717,953 A    2/1973  Kuhn et al.
3,969,479 A    7/1976  Lonnes et al.
(Continued)

FOREIGN PATENT DOCUMENTS

CH    654978 A5    3/1986
DE    19521239 A1    12/1996
(Continued)

OTHER PUBLICATIONS

National Aeronautics and Space Administration, Spinoff 2007, Plants Clean Air and Water for Indoor Environments, accessible at http://www.sti.nasa.gov/tto/Spinoff2007/PDF/basic_version_07.pdf, pp. 60-61.

*Primary Examiner* — Kristen C Hayes
(74) *Attorney, Agent, or Firm* — Jay R. Yablon

(57) ABSTRACT

A plant air purifying enclosure, or "PAPE," contained within an unconditioned space, either within or outside a building, containing therein a plant air purifier, which is used to purify air using plants and microbes growing therein. The PAPE enclosure itself receives poor indoor quality air from within structure where the PAPE is located or from a structure close by along with thermal energy which keeps the plant air purifier enclosure at a suitable temperature for the plants and air cleaning microbes within the air purifier. Poor air enters the enclosure, is purified by the plants and microbes, and returns in purified form back to the habitable space from which it was taken. This lowers the amount of outside air needed for ventilation purposes and so lessens a building's overall energy consumption while providing efficiently for naturally purified air. Fundamentally, the object of this invention is to specify devices, systems and methods to house/enclose plant purifiers in such a way that they can readily be deployed on a wide scale.

66 Claims, 49 Drawing Sheets

(56) References Cited

U.S. PATENT DOCUMENTS

| | | | |
|---|---|---|---|
| 3,991,514 A | | 11/1976 | Finck |
| 4,262,656 A | * | 4/1981 | Esposito ............... 126/620 |
| 4,315,599 A | | 2/1982 | Biancardi |
| 4,784,835 A | | 11/1988 | Fritz |
| 4,844,874 A | | 7/1989 | deVries |
| 4,852,806 A | | 8/1989 | Zeman |
| 4,961,763 A | | 10/1990 | Thompson et al. |
| 4,975,251 A | | 12/1990 | Saceman |
| 5,044,120 A | | 9/1991 | Couch |
| 5,078,972 A | | 1/1992 | Saceman |
| 5,089,036 A | * | 2/1992 | Hawes ............... 96/108 |
| 5,130,091 A | | 7/1992 | Saceman |
| 5,217,696 A | | 6/1993 | Wolverton et al. |
| 5,269,094 A | | 12/1993 | Wolverton et al. |
| 5,277,877 A | | 1/1994 | Jeffrey et al. |
| 5,315,834 A | * | 5/1994 | Garunts et al. ............... 62/78 |
| 5,397,382 A | | 3/1995 | Anderson |
| 5,407,470 A | | 4/1995 | Jutzi |
| 5,430,972 A | | 7/1995 | Wianecki |
| 5,433,923 A | | 7/1995 | Wolverton et al. |
| 5,756,047 A | | 5/1998 | West et al. |
| 5,833,293 A | | 11/1998 | Ludwig |
| 5,934,017 A | | 8/1999 | Ho |
| 6,000,559 A | | 12/1999 | Stopyra et al. |
| 6,006,471 A | * | 12/1999 | Sun ............... 47/69 |
| 6,197,094 B1 | * | 3/2001 | Thofelt ............... 95/211 |
| 6,230,437 B1 | | 5/2001 | Wolverton et al. |
| 6,616,736 B2 | | 9/2003 | Massey et al. |
| 6,663,769 B2 | | 12/2003 | Hosoya |
| 6,727,091 B2 | * | 4/2004 | Darlington ............... 435/299.1 |
| 6,921,182 B2 | | 7/2005 | Anderson et al. |
| 8,083,835 B2 | | 12/2011 | Mittelmark et al. |
| 8,707,619 B2 | * | 4/2014 | Edwards et al. ............... 47/66.7 |
| 2002/0073613 A1 | | 6/2002 | Wijbenga |
| 2004/0230102 A1 | | 11/2004 | Anderson et al. |
| 2005/0186108 A1 | | 8/2005 | Fields |
| 2007/0058368 A1 | | 3/2007 | Partee |
| 2009/0064858 A1 | * | 3/2009 | Mazzanti et al. ............... 95/149 |
| 2011/0094156 A1 | * | 4/2011 | Edwards et al. ............... 47/66.7 |
| 2011/0162273 A1 | * | 7/2011 | Mittelmark et al. ............... 47/66.7 |

FOREIGN PATENT DOCUMENTS

| | | | |
|---|---|---|---|
| DE | 19739060 A1 | 9/2000 | |
| EP | 478203 A1 | 4/1992 | |
| EP | 2042813 A1 | 4/2004 | |
| EP | 1416229 A2 | 5/2004 | |
| EP | 1563891 A1 | 8/2005 | |
| GB | 2297087 A | 7/1996 | |
| GB | 2307162 A | 5/1997 | |
| WO | WO 9321755 A1 * | 11/1993 | ............... A01G 9/00 |
| WO | 2009048925 A2 | 4/2009 | |
| WO | 2009131008 A1 | 10/2009 | |
| WO | 2010/033423 A1 | 3/2010 | |
| WO | 2010/033752 A1 | 3/2010 | |
| WO | 2010/033752 A4 | 3/2010 | |

* cited by examiner

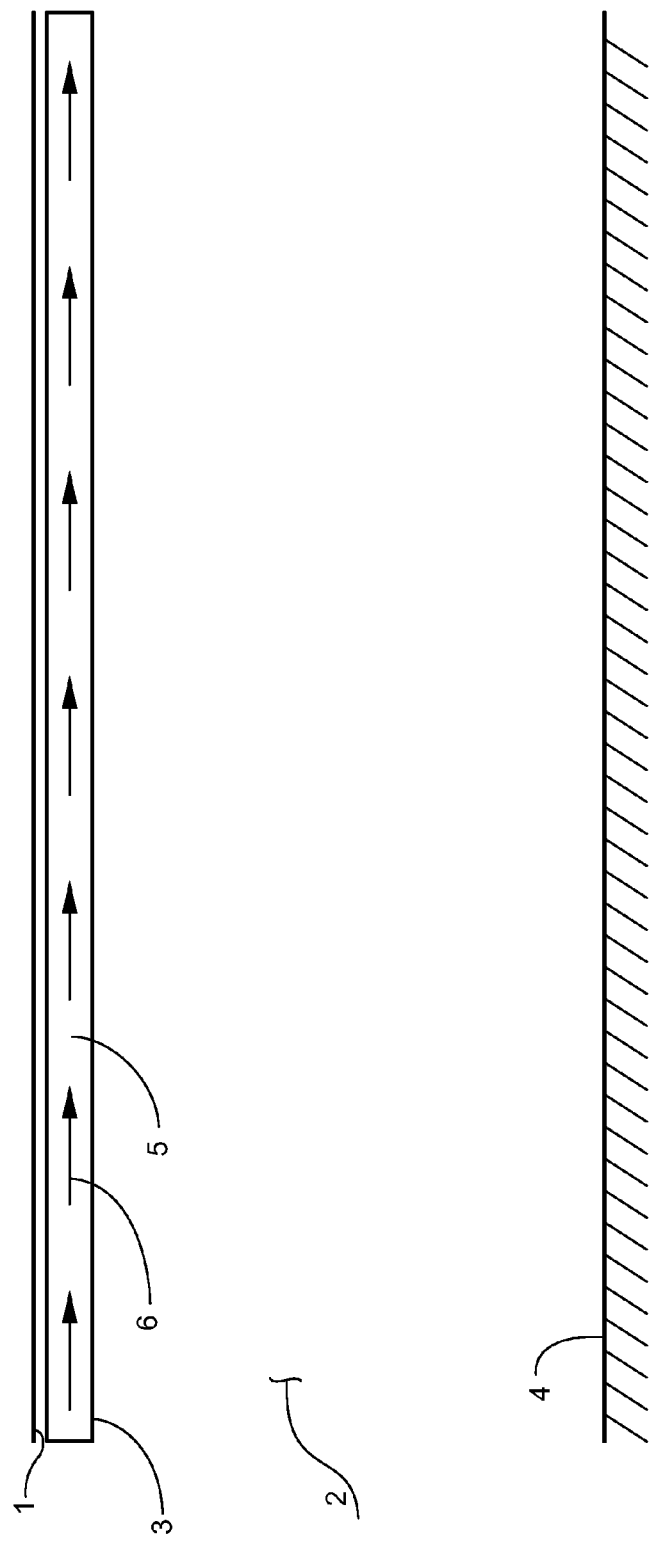

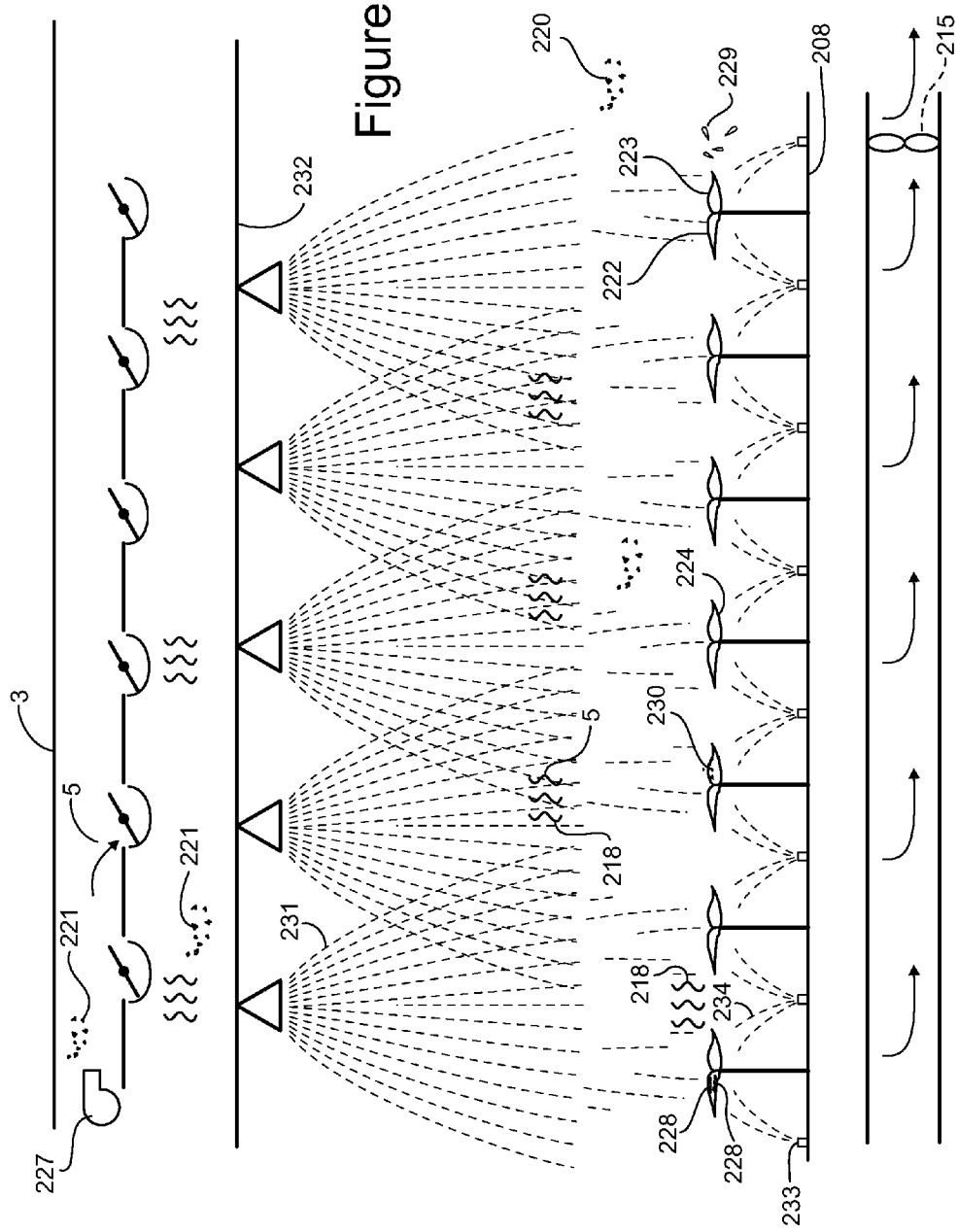

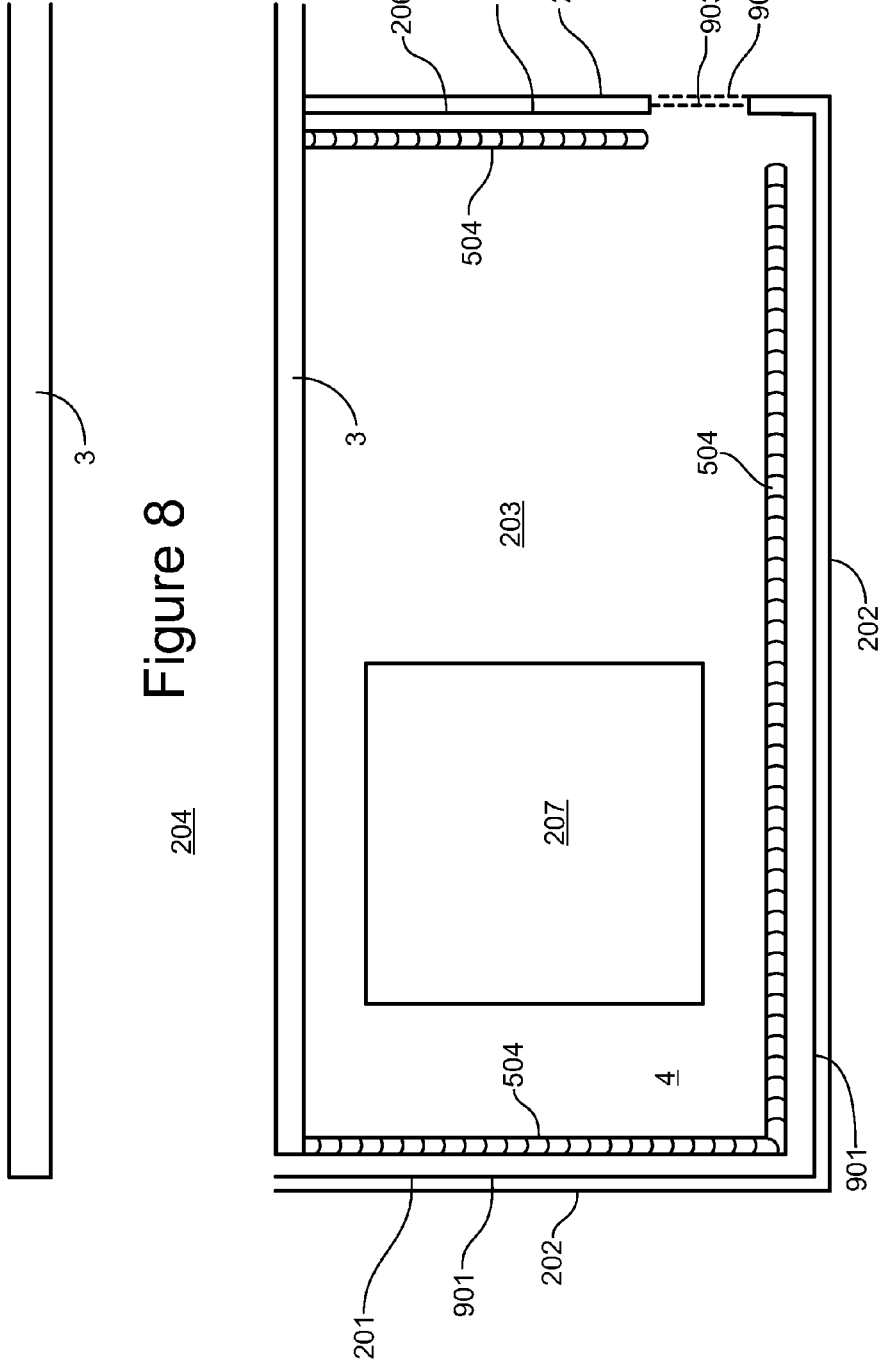

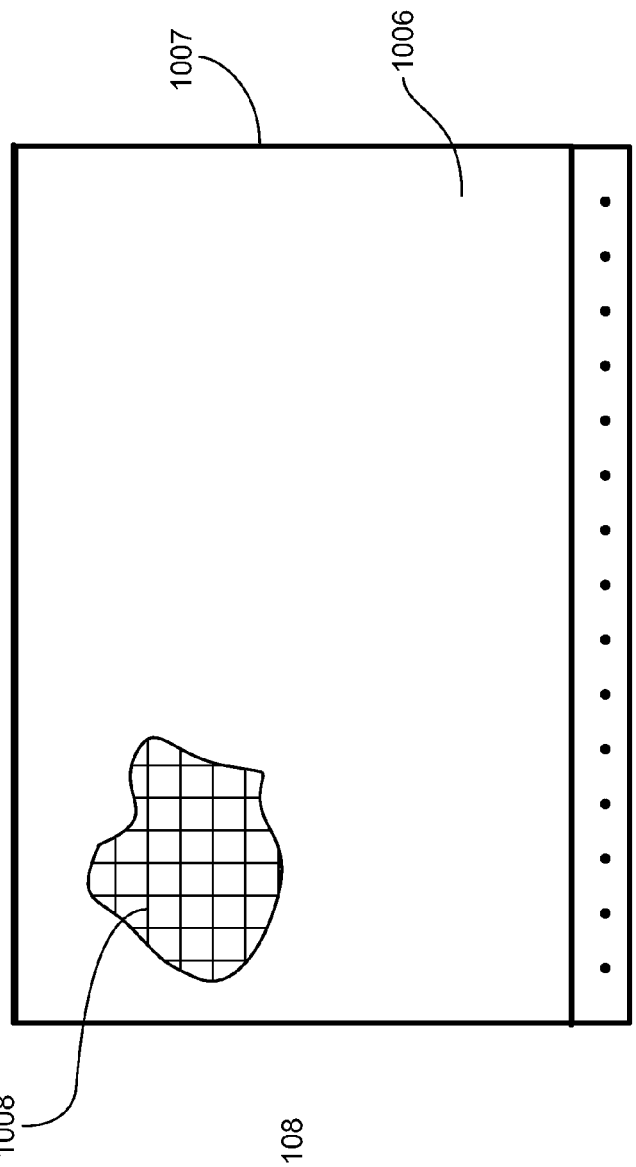
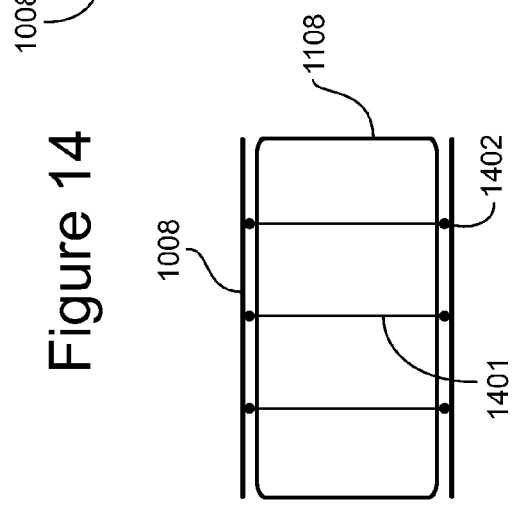

PLANT AIR PURIFICATION ENCLOSURE APPARATUS AND METHOD

BACKGROUND OF THE INVENTION

For millions of years plants have been cleaning the air, taking in airborne toxins through their stomata, breaking some of these toxins down and transporting the rest down to their roots where they excrete them, whereupon microbes that congregate close by a plant's root system, digest them and transform them into a food source for higher forms of life. For thousands of years humans have taken plants into their homes and unwittingly purified indoor air. Yet it has only been since the early nineteen eighties that plants have purposely been grown in an artificial soil, where air movement mechanisms pull poor indoor quality air directly down into that soil, and where air purifying microbes within that soil break down the impurities contained within indoor air and more efficiently, thereby purify a building's air supply. Such science, much of it developed by NASA, has eliminated the need for plants to act as a transport mechanism of impure air and as a result a single plant can now do what hundreds of plants had done previously with regard to indoor air purification. Consequently, there is now sufficient room within a building or within an enclosure attached to a building, to purify almost all of a building's indoor air supply without the need of anything beyond the smallest amounts of outdoor ventilation.

Presently ventilation is the main way to deal with indoor air quality, and since such ventilation often results in additional heating and cooling expense, not to mention higher equipment costs, the use of plant air purification is a welcome alternative which lowers operating costs for a habitable structure and make its indoor environment healthier.

However, up to this time, the use of plant air purification has been limited, often because plant air purification takes up more habitable space than building owners or managers are willing to give up and because ASHRAE, which governs the requirements for heating and ventilation of buildings within the United States, has been concerned with what would happen if plant air purifying apparatus were to malfunction. But if space which is not considered habitable were used to install house plant air purifiers, and if there were a means for a building to automatically return to outdoor ventilation if the plant air purification apparatus were to fail, then such a new technology might be more widely accepted. The invention disclosed here, overcomes these two major concerns.

ASHRAE 62 states that a ventilation system must provide minimum quantities of outdoor air (OA) per building square foot or, alternatively, achieve certain minimum standards for indoor air quality (IAQ). By neutralizing bacteria, VOCs, and smoke particulates, alternative air treatment can enable an HVAC system to achieve sufficient IAQ while requiring lower outdoor air volumes, thus reducing the air conditioning capacity to condition outside make-up air, simultaneously reducing supply, return and exhaust fan energy consumption, as well as the energy needed to condition the OA.

Recent studies at Syracuse University's Center of Excellence, as stated in BEESL-RO1-09-09-COE-TAD-Final Report, sponsored both by the Environmental Protection Agency and the New York State Energy Research and Development Authority, showed that just 8 low level light-requiring plants, grown within a plant air purifier of just 12 square feet, hooked up to a building's HVAC system were able to purify the air within a 1900 square foot space and lower ventilation levels to 5%, thus saving 26% on heating costs. In this study the filter bed size of a plant air purifier used only 0.006315 (0.6%) of the floor space of the area whose air it cleaned. That would amount to the need for only 631.5 square feet of filter bed space for a building with a 100,000 square feet of habitable space. This can be very easily accomplished where new construction is envisioned, but is not always easily achieved when an already existing building had to be retrofitted and its space reallocated. This invention, however, has overcome that problem, by housing a decent sized plant air purifier within an enclosure/housing known as a Plant Air Purification Enclosure (PAPE), and by placing it in unconditioned space within the building which is little used and of marginal value, space which is often unfinished and which does not meet code requirements for habitable space. A PAPE can even be located outside a building, or installed in a mobile unit which can be driven up to the building and simply hooked into its HVAC system. PAPEs can even be utilized to purify incoming outside air (OA) as well, even in a smog laden environments.

To do so, however, certain requirements must be met:

The enclosure must have suitable light for so many hours each day.

Air and water, supplied to the enclosure, should stay within a temperature range of 60 to 85 degrees Fahrenheit in the most ideal circumstances.

Water used in the plant air purifier in the enclosure should be pure—free of chlorine, fluorides and high levels of acidity.

Humidity within the enclosure should be kept within a certain range which the plants within the enclosure prefer, or adequate water must be supplied to the plants therein so that they may provide humidity of their own through transpiration.

An additional blower or air movement mechanism should be installed to make up for pressure loss which will certainly occur were a PAPE to be attached to an already existing HVAC system of an existing building.

Other air purification methods, such as the passing of incoming air through ultraviolet light, should also be available.

Adequate sink and counter space for easy maintenance of the filter beds and the plants therein should be part of the layout.

An easy means of conveyance of plants and trays which contain the filter beds of the plant air purifiers must be available since the trays themselves might be quite heavy and bulky.

The enclosure should be well insulated, neither gaining nor losing great quantities of thermal energy at any time during the year when ambient air temperature outside the enclosure either exceeds or is less than the ideal temperature range suitable for the plants within to live.

The enclosure should have emergency backup for heat, electricity, water and light.

An emergency source of outside air to the enclosure should be available for intake or exhaust in emergency situations.

A mechanism should be installed so that were a malfunction to occur, management would be notified immediately.

Were a malfunction to persist, or if air from the conditioned space failed to pass through the enclosure for any length of time, then the outside air damper to the structure itself would have to reset automatically to provide more outside air for ventilation purposes since the plant air purification enclosure was no longer operable.

Such needs have all been dealt with by the invention to be disclosed herein, while also allowing for easy installation of a PAPE at minimum cost.

Prior art does not appear to disclose or suggest a plant air purification enclosure, providing the needed infrastructure to make use of plant air purification on a wide scale. However there do exist other types of specialized, environmentally controlled utilitarian enclosures such as clean rooms, deep freezers, green houses, etc. But none of these could be effectively utilized as a plant air purifier enclosure, especially since the enclosure is so tied to the workings of the conditioned space whose air it is purifying.

Some documents defining the general state of the art include the following:

U.S. Pat. No. 5,833,293 appears to disclose a portable greenhouse on wheels where the frame of the greenhouse is welded to a conventional flatbed car trailer. However this invention relies on natural sunlight while the present invention has the ability to be fully enclosed with no sunlight entering whatsoever, and lacks many of the other desirable features of a PAPE as disclosed herein.

U.S. Pat. No. 4,961,763 discloses only a single tier of plants. The microbes necessary for purification needed to be replaced from time because the plant air purifier needed to be in close proximity to the roots of certain plants. By placing plants in a plurality of tiers, there is no need for replacement of the microbes.

U.S. Pat. No. 3,717,953 appears to disclose the growing of mushrooms in specific areas in wheeled trays stacked one on top of another. Growing of plants is not the same as using plants for air purification. There are additional factors that have to be dealt with for a stacked tray arrangement to work with plant air purification. All trays must be within a container that allows the impure air to flow through the filter beds and not escape around the sides. Then the purified air must be ducted away to the desired location without it being lost during transit, or without the purified air's temperature changing dramatically. Water must be supplied to those trays in the stacked arrangement and supplied quite often, usually more than once per hour. Moisture sensors must be set into the trays to automatically turn on the irrigation when moisture levels drop below a certain point. The irrigation mechanisms must be capable of being easily detached if a tray is taken from the tiered arrangement. An airtight seal must be had between the lowest tier of plant trays and the plenum which ducts the air out. Plus lighting requirements of the plants within the tiered structure will be quite a bit greater than for mushrooms. Lighting must be set to a timer and the bulbs protected from moisture during the irrigation process when water spray might come from both above and below.

U.S. Pat. No. 3,991,514 appears to disclose a method of growing plants in a tiered arrangement where the lights are protected from moisture. Again this patent falls well short of a multi tiered plant air purifier such as shown in this invention.

U.S. Pat. No. 6,663,769 appears to deal with having a multi source of supply of pure water for plants. This disclosure utilizes rainwater and tap water to supply water to a structure and includes the watering of plants. However, while it buffers the rain water with CaCo3 of which limestone is a source, it does not treat the tap water by allowing chlorine to leave it prior to entry into an area where plants grow as in this invention. Further, it does not acclimate the water's temperature to that which the plants desire by placing it in an acclimation tank. It does not use humidifiers or air conditions as a source of water supply, nor well water. It does not provide all the information necessary to make the system applicable to a plant air purifier or take care of additional sources of supply of pure water for the plants, and microbes within the filter bed.

Lastly, as relates to a wet scrubber used to clean outside air entering a building, no information appears to be available. Wet scrubbers have been used for industrial situations or to remove certain gases found in a furnace but none have been patented to this inventor's knowledge for indoor application within a building where human occupancy is the primary purpose of the space where the air will be utilized.

It is commonplace these days to start with an existing HVAC and ducting system, and add such things as humidifiers or dehumidifiers, electromechanical air filters and purifiers, etc., because there devices can be made modular and readily retrofitted into a preexisting system, or included from the outset in the installation of a new system. While the basic science of plant air purification is well known, as exemplified for example by National Aeronautics and Space Administration, Spinoff 2007, Plants Clean Air and Water for Indoor Environments, accessible at http://www.sti.nasa.gov/tto/Spinoff2007/PDF/basic_version_07.pdf, pages 60-61, there are at present significant barriers to entry against using plant air on a widespread commercial scale because the technology to systematically integrate plant air purifiers into preexisting or even new buildings and HVAC systems has not been properly and systematically developed. This deficit needs to be addressed.

Fundamentally, the object of this invention is to specify devices, systems and methods to house/enclose plant purifiers in such a way that they can readily be deployed on a wide scale. The sorts of plant air purifier housing devices, systems and methods to be disclosed herein—which can be thought of as the supporting infrastructure which will enable the practical and effective use of plant air purifiers to take root on a wide commercial scale—are what are referred to herein by the shorthand PAPE. The widespread deployment of plant air purification systems, using the disclosures developed herein, will yield significant benefits in terms not only of cleaner, more healthful indoor environments, but also, more efficient energy usage.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below FIG. 1 illustrates a side view of empty unconditioned space with overhead air duct.

FIG. 2B illustrates a front view of plant air purification enclosure with washing capability of plants in the air purifier.

FIG. 8 illustrates a top down view of an empty unconditioned space with overhead air duct.

FIG. 9 illustrates a top down view of the empty unconditioned space of FIG. 8 with PAPE placed therein, showing walls, gutter and air purifier location.

FIG. 14 illustrates a top down view of a straw bale in wall construction with grid placement on either side and wire fasteners through a bale to keep the grid membrane in place.

FIG. 15 illustrates a side view of unfinished but mostly plastered straw bales in wall construction.

SUMMARY OF THE INVENTION

Figure 2A:
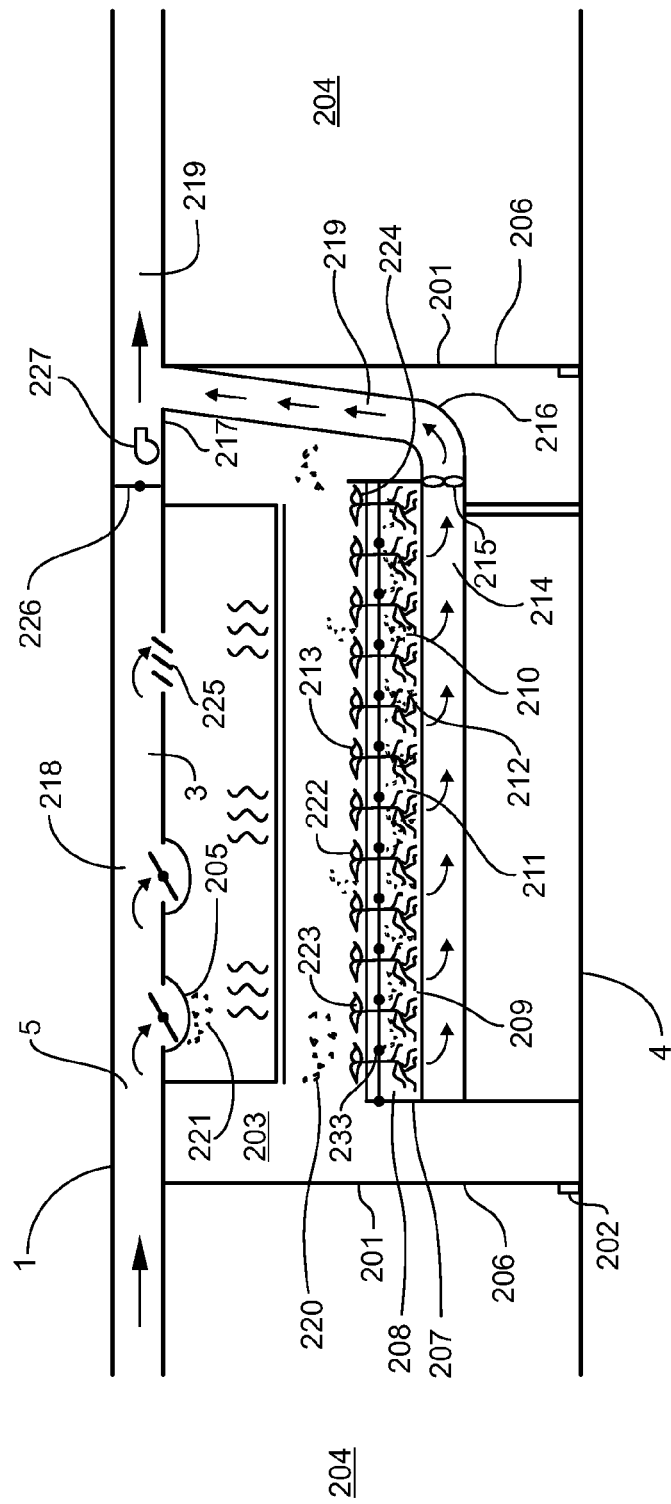
FIG. 2A illustrates a plant air purifier enclosure placed in empty space of FIG. 1.

Disclosed herein is a plant air purifying enclosure, or "PAPE," and related method, contained within an unconditioned space, either within or outside a building, containing therein a plant air purifier, which is used to purify air using plants and microbes growing therein. The PAPE enclosure itself receives poor indoor quality air from within structure where the PAPE is located or from a structure close by along with thermal energy which keeps the plant air purifier enclosure at a suitable temperature for the plants and air cleaning microbes within the air purifier. Poor air enters the enclosure, is purified by the plants and microbes, and returns in purified form back to the habitable space from which it was taken.

This lowers the amount of outside air needed for ventilation purposes and so lessens a building's overall energy consumption while providing efficiently for naturally purified air. Fundamentally, the object of this invention is to specify devices, systems and methods to house/enclose plant purifiers in such a way that they can readily be deployed on a wide scale.

In particular, disclosed herein is a plant air purification enclosure and related method for enabling a plant air purifier to purify air in a building structure, comprising: an enclosure separating an interior space therein from an exterior space external thereto, the enclosure providing thermal insulation and substantially preventing moisture and air flow, between the interior and exterior spaces; incoming and outgoing air conduits connecting the interior space with the exterior space, configured such that—exclusive of any emergency source of air which may optionally be provided—substantially all exchange of thermal energy and air between the interior and exterior spaces transpire through the conduits; a plant air purifier containment within the interior space, the containment configured for containing at least one filter bed of a plant air purifier and plants growing within the at least one filter bed; at least one water source, situated relative to the plant air purifier containment to deliver water for plant growth to a plant air purifier, when the plant air purifier is contained within the containment; at least one source of growing light, situated relative to the plant air purifier containment to deliver light for plant growth to a plant air purifier, when the plant air purifier is contained within the containment; at least one air movement apparatus for causing impure air arriving from the exterior space via the incoming air conduit to move from the incoming air conduit, through a filter bed containment region of the containment, to the outgoing air conduit, and be returned via the outgoing air conduit as purified air to the exterior space; and the thermal insulation in combination with thermal energy from the impure air arriving from the exterior space via the incoming air conduit maintaining the temperature within the interior space within a range suitable for plant growth.

DETAILED DESCRIPTION

For the sake of this disclosure:

Conditioned space shall be defined as indoor space which is both heated and cooled by a conditioning apparatus (e.g., a heater and an air conditioner/cooler). It is a space which remains relatively constant in temperature in a range preferred by humans. Plus it is space whose main function is to accommodate human endeavor. If space is not primarily intended for human habitation but for some other process, as in this case plant air purification, than it shall not be defined as conditioned space, even though humans may occasionally occupy the space so as to maintain the system.

Unconditioned space shall be defined as space not both heated and cooled by conditioning apparatus which allows temperatures to remain relatively constant, in a range preferred by humans and/or where the main function of the space in question is not suitable intended for human habitation except for limited periods of time.

Habitable space shall be defined as space in a structure where humans may live, eat, sleep, cook, play or work. Such space conforms to building code regulations for what is called habitable space. Bathroom toilet compartments, closets, halls or utility spaces, and similar areas are not considered habitable space.

Space which does not meet habitable standards shall be defined as space which would fail to meet the strictest interpretation of any one code regulation having to do with building, fire, plumbing, or sewage disposal code regulations specifically formulated for habitable space within a newly built mixed occupancy commercial structure of six stories or more. The regulations governing will be those from the most heavily populated location within the country where the building whose air is to be purified is located, or in the alternative, from the exact location where the building actually is. If different, regulations from both areas will apply and the stricter of the two will have to be met for the space to be considered habitable.

Conditioned air is herein defined as air both heated and cooled by a conditioning apparatus which causes that air to remain relatively constant in temperature in a range preferred by humans for indoor habitation. It is air taken directly or indirectly from habitable space in a building where human habitation is of primary concern and is air directly or indirectly returned to such category of space.

Plant air purifiers take in air, usually by means of a mechanical air movement device, pass that air through a filter bed wherein are contained: moisture, plants, micro organisms and more often than not activated carbon, though other materials may be placed there as well. There, airborne microbes, volatile organic chemicals, particulates and odors are either trapped, broken down or destroyed.

Science has found that the most effective plants which purify air and the most effective air cleaning microbes have a symbiotic relationship with one another. These microbes congregate close to the root systems of the most effective air cleaning plants. These most effective plants come from the tropical rain forest where weather conditions are both warm and moist year round, where temperatures ordinarily range between 65 and 85 degrees Fahrenheit. If these same plants are to be grown in a plant air purifier, along with those same microbes which have a symbiotic relationship with them, then the area around the plant air purifier should mimic the same temperatures and moisture conditions on a year round basis as these plants would find in the wild. Most unconditioned space, in which a plant air purification enclosure might be stationed, does not mimic the conditions these particular plants and microbes would find if grown in the wild, whether the space is outdoor space, basement or warehouse space. Further, if the space where they are located does mimic such conditions, it does so for only a short period of time but not on a continual basis. If a plant air purifier is installed wherein these plants and microbes might grow, the area around the plant air purifier must be enclosed in what is here referred to as a plant air purifying enclosure, or PAPE, an enclosure which maintains a temperature range close to 65-85 degrees Fahrenheit most of the time. Such an enclosure can be within an already existing structure. It can be a structure structurally attached to another structure, or it can be a self supporting structure of its own. A plant air purifying enclosure can even be a containerized unit placed in close proximity to the building whose air it is intended to purify and may even be mobile and be equipped with wheels so that it could travel upon a highway or roadway.

Since plant air purifiers dealt within in this disclosure are placed in unconditioned space as herein defined and since the plant air purifier is meant to purify air from a conditioned space, the unit or the space in which it is enclosed must be connected in some fashion to the space whose air is to be purified. This is usually accomplished by means of one or more ducts. However, if a plant air purifying enclosure is stationed against a wall which is in common contact with conditioned space whose air is to be purified, than all that is necessary is that an opening be made between the two spaces, whereupon a duct becomes unnecessary.

Plant air purifying enclosures (PAPEs) are necessary for reasons other than just to maintain a particular temperature range for the plants therein, especially when an area chosen for location of the plant air purifier is much larger than necessary. In such a case, if the plant air purifier has no enclosure around it, air pressure will drop more than needed or desired. This will result in the need for added unnecessary air movement capacity which will further result in energy waste. In addition, when conditioned air enters a space where the plant air purifier is, there would be additional gain or loss of thermal energy and added heating or cooling capacity would be required to bring that air back to a human comfort level once this now-purified air is to be returned from whence it came. In addition, there would be an unnecessary stirring up of dust in areas often little used for human habitation, where the plant air purifier was placed, which areas are often dusty to begin with. This could cause further pollution problems throughout the building as additional quantities of dust were sucked back into the HVAC system. Were this to occur and dusty conditions to prevail, this would require that the leaves of the plants located in the plant air purifier would have to be cleaned and washed far more often than if the plant air purifier were placed in an airtight enclosure. If not the result would be additional particulate waste being trapped in the filter bed which would have to be dealt with, and the water used to both moisten the filter bed and clean off the leaves of the plants would not be able to be reused again for rewatering and dust removing purposes. For all of the above reasons an enclosure of the plant air purifier is a necessity when the plant air purifier is placed in a location other than in habitable space.

How To Build The Enclosure—How the enclosure is built or contained depends on what conditions there prevail. Are there already existing walls that can be used to make up part of the enclosure? If so, are the existing walls on the outer perimeter of a building, or are they interior walls? Is the space open outside space or enclosed space? Is it, below grade, grade level, or even above grade, perhaps on the roof? Is the space close to the space from which conditioned air is to be taken or adjacent thereto? If the space is already inside an existing enclosure, how high are the ceilings of the structure in which the plant air purifying enclosure is to be housed? What is the temperature of the already existing floor where the PAPE is to be placed?. How wide are the temperature swings where the enclosure might be placed? Is there an air duct close at hand or does ducting have to be supplied. All these determine what needs to be done, and how the PAPE needs to be configured.

Placing the Plant Air Purifying Enclosure Below Grade— Often components of an HVAC system are placed below grade, within a part of a structure where human habitation is not the main use set for the space. Furnaces, boilers, air conditioners, ducts have been placed below grade for almost a hundred years. The fact that air ducts from conditioned space are there makes it a desirable place to locate a PAPE, especially since retrofit of the space can often be done easily, given that the space is often unfinished and air ducts are readily accessible. By tapping into a supply or exhaust duct which leads to or from conditioned space, and by allowing air from that duct to enter the plant air purifying enclosure, the air itself is able to warm and cool the PAPE to a level the plants and microbes within the enclosure require. Because below grade space usually has less of a temperature swing than unconditioned space above grade, less insulation may be necessary, and if the space is close to a furnace, temperatures may well be within the range plants in a plant air purifier would like or desire.

Because below grade spaces rarely have ceilings higher than 12 feet, the actual ceiling of the structure itself can be used for the plant air purifying enclosure as well. And as long as there is conditioned space directly above the ceiling itself, the ceiling does not need added insulation. If the floor is at the lowest level in the building, however, there may well be a loss of thermal energy through the floor and if temperatures of the ground fall below 65 degrees Fahrenheit, which they often do in many parts of the world, than the floor for the enclosure will have to be insulated as well. If one or more of the walls is an outer wall to the structure, it too will have to be insulated with one or more types of insulation to be discussed later in this disclosure.

Attaching a PAPE to an existing air duct usually is an easy task. Often one finds HVAC ducts down in parts of a building which are below grade, especially in older buildings. Thus if the plant air purifying enclosure has a supply or return air duct going through it, it is an easy matter to simply cut out a section of that duct or place a vent or diffuser into that duct so that air from it will fill the PAPE. Thereafter one can connect a return duct from the end of the plant air purifier, to the return duct, downstream from which air was originally. By doing this simple task and enclosing the space around the plant air purifier, the plant air purifying enclosure now constructed is afforded proper heating and cooling year round and is supplied with needed air to purify as well. Utilization of the impure air and the thermal energy within that impure air makes for a novel approach to plant air purification and allows a PAPE to function more efficiently and less expensively.

Placing The Enclosure at or above Ground Level Within a Structure—Often the enclosure will have to be built at ground level or above within a structure. Many times that space is not even heated or cooled, or if it is, the space in which the PAPE will be located has satisfactory temperature conditions only on a rare occasion. Temperatures in such space might well require workers to wear heavy clothing in winter and little clothing in summer. Often the space for the enclosure may well be against the outer wall, in for instance a box store or supermarket while the commercial space is often situated in the center, or the space could be warehouse space where truck bays open continually and outdoor air temperatures prevail. Such space may even have 18 to 24 foot ceilings. In such circumstances not only walls have to be built to house the PAPE, but a ceiling constructed as well. In such space a translucent wall or window may be installed, being cut into the outer wall of the structure, so natural light may provide at least part of the plant's lighting needs. In other cases it may be easier to just install a mobile PAPE within the building and place it in the designated space chosen, rather than construct a stationary enclosure of its own. A mobile PAPE is already insulated, though added insulation may be placed against its sides and upon its roof, as well as under the undercarriage. When a PAPE is built inside an already existing structure, added insulation may be nothing more than straw bales placed about its outer perimeter, bales which require no plastering since the overhead roof protects them from rain and snow.

Construction or Placement of a Plant Air Purifying Enclosure in an Area where there are High Ceilings—Plant air purifier enclosures may sometimes placed in an area where there are high ceilings. In certain circumstances they may be constructed or placed within a warehouse setting where the ceilings are 18 or 22 feet high. Whereupon a lower ceiling will be necessary. Under those circumstances both ceiling and floor insulation will be necessary in addition to wall insulation. One way of providing ceiling insulation is to create a post and beam structure with overhead rafters. Then, one attaches plywood over the rafters and places bales of straw on top of the plywood for insulation. Alternatively, one may simply bring into the structure a containerized unit into the building and then place it where the desired plant air purifier enclosure would be. Thereafter straw bales are placed on its roof, under its undercarriage and along its sides. Other forms of insulation could be used other than straw bales, but none can be so easily added or removed, nor provide such a high R value of insulation.

Placing Of a Plant Air Purifying Enclosure Up Against the Building Whose Air is to be Purified or Driving up a Mobil Unit and Parking it Close by—Perhaps one of the simplest ways to connect a PAPE to a structure so that conditioned space within that building may have its air purified by the PAPE is to simply park a mobile PAPE by the side of the building and to connect a supply and exhaust duct between the unit and the building's HVAC system, or place the mobile unit flush up against the buildings where vents can connect the two spaces. In another embodiment, a shed containing the PAPE might be built right up against the wall of the main structure itself, a shed which will house the plant air purifier therein.

Placing the Plant Air Purifying Enclosure in a Container on the Roof Itself—Much the way air handlers are installed in a container and placed on the roof, so too can a PAPE be a containerized unit, whereupon this unit can be lifted onto the roof and installed thereon. Such a unit could even be coupled to the roof air handler so that outside air can be purified even before entering the building. Or in the alternative the PAPE can have an outside air intake of its own which will take in outside air, scrub it of nitrous oxides, sulfur dioxide and particulates and mix the scrubbed air with recirculated inside air; whereupon a mixture of both air streams would then pass through the plant air purifier simultaneously. By mixing the two air streams together, the air passing through the plant air purifier, even if containing outside air of minus ten or twenty Fahrenheit, will not cause undue stress upon the plants within the enclosure.

To be more specific on this point.

If OA requirements using the IAQ procedure set by ASHRAE required only a 5% intake of outside air and if that air were −10 degrees Fahrenheit, while recirculating indoor air was 68 degrees Fahrenheit, then a mixing of the two air streams would result in the combined air stream having a 64 degree temperature. By the same token if a heat exchanger were attached to the PAPE which had 80% efficiency, then the temperature of the mixed air going into the plant air purifier would be 67.1 degrees Fahrenheit. This is a totally acceptable temperature for the plants growing in the plant air purifier. Thus one can see that outdoor temperatures will not be a problem. Plus placing a heat exchanger on the PAPE may often make up for not having a heat exchanger on the building itself, since now OA can go through it, rather than through the normal entry place it now utilizes.

Another advantage to mixing outside air and recirculated air, prior to air going through the plant air purifier within the PAPE is that now even smog laden OA can be purified well before it entered the building, a tremendous advantage in places where buildings are located in heavily polluted environments like in densely populated cities such as China or India, or even in cities like Los Angeles. This is a distinct benefit to buildings which now use replacement filters to screen out particulate matter from outside air. With the use of a PAPE, the regular outside air intake on the building itself could be disabled and all outside air could enter through the plant air purifier enclosure where purification of outside air would take place and all impurities would be broken down by the microbes in the plant air purification filter bed, or they would be washed down the drain as water passes through the filter bed, thus eliminating the need for filter bag replacement or in a last alternative outside air can pass through a wet scrubber even prior to reaching the plant air purifier itself.

Of course PAPEs with this capability need not only be situated on the roof of a building whose air is to be purified. They could be situated at ground level. They could be a unit which was mobile in character and parked by the building itself. They could be a shed like unit, or even a unit placed in a basement or below grade.

Materials with which to Enclose the Plant Air Purification Enclosure: Plastic Sheeting—As mentioned earlier, the type of material used for enclosing a plant air purification enclosure is dependent upon the amount of insulation required. In the case of a below grade installation, where in some cases temperatures are fairly constant and fit within the range favored by plants in the enclosure, no wall insulation may be necessary. In such a case, because the space is usually unfinished and because the walls merely have to be functional, even heavy plastic might serve to enclose the space. In this situation, heavy plastic sheeting with weights placed at the bottom might be used so air does not escape or enter. Alternatively, the sheeting may be attached to 2×4s nailed to the floor, or an industrial curtain may be used, set securely between floor and ceiling. All this can be erected quickly and at very low cost. Plastic sheeting is very much recommended for the first partition in a PAPE, so that moisture loss will be limited in the area where the plants reside, especially since plants in the plant air purifier prefer a moist environment. Plus the plastic will provide a vapor barrier which protects walls beyond it from having moisture enter them and so affect their insulation capabilities. Such a vapor barrier, however, should never be placed directly against other types of walling which is used for insulation purposes as even plastic sheeting will not totally prevent moisture from entering the insulation it is touching and it is very much desired that such insulation remain dry, otherwise the R value of the insulation will suffer.

Straw Bales—Straw bale construction uses baled straw from wheat, oats, barley, rye, rice and other plants. Straw is the dry plant material or stalk left in the field after a plant has matured, been harvested for seed, and is no longer alive. Hay bales, in contrast, are made from short species of livestock feed grass that is green/alive and not suitable for construction applications. Hay is not to be mistaken with straw. Hay bales also typically cost twice the price of straw.

Straw is traditionally a waste product which farmers do not till under the soil, but sell as animal bedding or landscape supply due to its durable nature. In many areas of the country straw is burned, causing severe air quality problems. This results in greenhouse gas emissions. The stability and lack of weathering of straw is quite desirable in construction. When straw is used for construction the carbon therein becomes sequestered and the carbon absorbed during the straw's growing cycle is contained in the wall rather than released into the air through burning. Presently more than two hundred million tons of straw are burned annually in the US alone, enough straw to build 2-3 million energy efficient homes.

Straw bale wall construction has been recently revived as a low cost alternative for building highly insulating walls. The technique was practiced in the plains states in the latter 1800's and early 1900's. Many of the early structures are still standing and being used. The technique has been applied to homes, farm buildings, schools, commercial buildings, churches, community centers, government buildings, airplane hangars, well houses, and more, and is being incorporated into this invention as a way to create an insulated space where plant air purifiers may be installed whether inside an already existing structure, or as an add on to an already existing structure, or in construction of a separate structure all together. In addition, it is here being used as insulation for a mobile PAPE wherein a plant air purifier is located. Straw walls can be built with unskilled labor, and the low costs of the bales which make up the wall make this form of construction economically attractive.

Bales may be anchored to each other for stability while under construction using stakes of wood (1H2H36), rebar (#3 or #4) or bamboo that penetrate through at least two bales. Another less popular method uses mortar or clay between bales. A new method uses bamboo (or similar) stakes on both sides of the bales, tied with wire or twine, "corseting" the bales. Such anchoring is generally accepted to be primarily necessary to keep walls from toppling during construction. Well-applied plaster will usually provide sufficient stability once complete, though by that time, whatever pinning method was used is embedded in the walls. Bales can be used flat or on edge.

Bale Size—Bales come with two-wires or three-wires (or strings) holding them together. Two-wire bales weigh about 50 pounds and three-wire bales, 75-100 pounds. Two-wire bales are usually 14 inches high, 18 inches wide, and 32-40 inches long (typical in Texas). Three-wire bales are 16-17 inches high, 23-24 inches wide, and 42-47 inches long (typical in western states). For most construction purposes straw bales will have a Height Width Length Edge Stack of 18" 14" 36" and a Regular Flat Stack of 14" 18" 36". Bales should be firm and strung tightly with either baling wire or twine. Half bales and whole bales are needed so the bales are staggered when stacked.

Poultry netting can be mounted on both sides of the walls for plastering, though it is no longer considered mandatory by many bale builders. Bales typically are covered with concrete mortar/stucco or earthen/lime plaster. Stucco lathe is used around windows, doors, and corners for added strength. The wire netting and lathe are typically held against the bales by wire ties through the bales or "U" shaped pins into the bales.

A good rule of thumb is to not exceed unsupported wall runs (no intersecting walls) for more than 20-25 feet in load bearing construction. If a longer run is desired, one should install a buttress wall perpendicular to the bales or support the wall by some other means. In this invention poles and posts are often used or 2×4s are stationed securely between floor and ceiling.

The Qualities of Straw Bales:

Fireproof—Tests have confirmed that straw bale walls are naturally fire resistant. When straw is compacted into bales, there's not enough air for the straw to burn well. The plaster coating seals the bales in a noncombustible casing. North Canadian and U.S. materials laboratories have found that: "The straw bale/mortar structure wall has proven to be exceptionally resistant to fire." In these tests, the flames took more than two hours to penetrate the plastered bale walls. Conventional framing built to commercial standards took only 30 minutes to one hour to burn. Walls should be plastered as early as possible to increase their fire resistance. Dense bales mean limited oxygen which in turn means no flames. Plaster straw bale walls have a Class A fire rating and offer a 2 hour fire wall, the same level of protection required by codes for stairwells in public buildings. As mentioned previously the bales are typically covered with concrete mortar/stucco or earthen/lime plaster, achieving a high degree of fire resistance.

One can spray, brush, dip or trowel the mortar on and repairs can be made in the same way. For added strength or sticking together plaster solid fibers can be added to the mix.

Moisture—The plaster coating on straw bale walls prevents moisture migration through walls, and proper construction techniques, such as raising the bale walls off the foundation and onto a wooden or concrete curb, will ensure that any spills or floods inside the structure or nearby do not soak into the straw bale walls.

Pests—The ideal homes for pests offer openings, nests and food, all of which are not found in properly maintained straw bale walls. Plaster seals the bales with a protective barrier against pests. Should a gap be left open, the densely packed bales discourage rodents from making it their home. Stick-frame walls make a much more inviting space for pests, especially when the walls are packed with soft batt insulation. In addition, straw in straw bale structures have not shown evidence of termite infestations.

Building Costs—Because bales are more user friendly than other wall systems, building costs are quite low. In addition, work can be done by unskilled labor.

Vapor Barrier Elimination—Vapor barriers are not used in straw bale construction other than to protect the bottom courses from rain splash. Other than this one use, they are ordinarily eliminated entirely from the building process as they have been shown to cause more damage than they prevent. Were a vapor barrier added, it is possible that the walls would not be able to sufficiently dry out and would therefore be mined and need replacing. In some embodiments of this invention sheet plastic is used as a vapor barrier, but it is kept far away from a straw bale wall so that the wall and the straw within may breathe. Water pipes are never placed in bale walls and straw bales never sit directly on the ground.

For additional protection from water damage, a minimum, 3½" "toe-up" is used for the bales to sit on. The toe-up provides a break in the sub straight so that no water can possibly wick into the bales. In other instances cement blocks with weep holes or pallets are used as the first course.

The Insulation of Straw—There is actually more insulating value when one uses straw bales than air alone. Conventional insulation often makes use of fiberglass, cellulose bats or blown "fluff." These actually have less voids (air pockets) than a straw bale. The thicker they are, the higher the R value. Straw is the stalk from a grain-bearing plant. The stalk is hollow (filled with air) and thousands of these are compressed into each bale. Depending on how one orients the bale in the wall, it will be 12"+/− thick. Plaster straw bale walls have an insulation of R35-50.

Strawboard Panels—Strawboard panels can also be used for insulation purposes in constructing a plant air purifier enclosure. Strawboard panels are made of solid core, compressed wheat or rice straw. High pressure and temperatures (240EC) forces the straw to release a natural resin that binds the fibers together. The compressed panels are then covered with 100% recycled 69# or 85# paper liners and adhered to both sides with water based non-toxic glue. The standard panel measures 4 feet by 8 feet by 2¼ inches and weighs 140 lbs. Custom panel sizes are available ranging from 1 inch to 3 inches thick and 3 feet to 12 feet long. The panel's high density and low oxygen content does not support combustion. Since the panels do not contain added resins, alcohol, or other chemicals, no flammable vapors are produced. The standard 2¼ inch panel has a one-hour fire rating, R-value of 3, and noise level reductions from one side to the other of 32 dB (NTC 0.10). For permanent protection against insects and fungal decay and additional fire resistance, the boron compound polybor can be factory added to the core. Straw panels just drop into steel runners and the making of a wall is easy and quick.

Other Materials to use for Construction of a Plant Air Purifier Enclosure Inside or Out—As mentioned earlier a structure could be attached to an already-existing structure as a shed. This too could easily be made out of straw bales, or it could use normal construction materials. However since support and insulation are clearly tied together, any material which does not offer good thermal energy containment should be avoid. Sheetrock could be used, lumber, brick or stone, polycarbon, etc. But their R value is limited. Straw bales are the material of choice with post and beam construction for support, especially since the PAPE unit will only be one story or less. The second building material of choice is polyurethane (PU) or phenol cored sandwich panels with facing layers of steel or aluminum sheet or PU-cored sandwich panels with one side of color steel and the other side of flexible sheet. This type of sandwiched foam paneling is moisture resistant and can come in thicknesses up to 150 mm. It provides very good insulation and can easily be attached to framing which can be built on cement blocks to prevent water penetration close to the ground. Inside or outside construction would make this an ideal material for walls or ceiling in a plant air purification enclosure.

Insulative Flooring—There will be circumstances where the PAPE, mobile PAPE, PAPE shed or PAPE container needs insulative heavy duty flooring. This is because a heavy load will be placed upon the unit's floor caused by baker's carts which have a multiplicity of stacked plant air purification trays located one on top of another in a unit with wheels. These will place a heavy load on only a few square inches of space. Therefore the flooring must be both strong and well insulated. This can be accomplished by first putting down sandwiched foam insulation of whatever R factor required, followed by polycarbon or insulated polycarbon on top of that, or some other load bearing resistant material. In this way there will be no major loss of thermal energy to the ground or ambient air below and no injury to the floor itself.

The Plant Air Purifier within a Plant Air Purifying Enclosure—The key element in a plant air purifying enclosure or PAPE is the plant air purifier. For the most part the plant air purifier is a platform or series of platforms composed of a filter bed or a number of filter beds wherein there is light weight aggregate, or light weight clay, along with activated carbon and in some cases other material. All such materials are usually situated in a porous tray, pot or other type of open container. Within this filter bed and within this porous artificial soil grow certain plants known for their air purifying capabilities. Close to their roots live certain microbes which have a symbiotic relationship with the plants that grow there. These particular microbes also help to break down poor quality air. Moisture is provided to the filter bed so that it is kept damp and the moisture within the filter bed helps to trap certain types of volatile organic chemicals which are moisture attracted, such as formaldehyde. Poor quality air passes through the filter bed and is purified, being forced through by some form of a mechanical air moving device. The size of the filter bed is determined by the number of cubic feet of air that are to be purified, the level of contamination and the size of the conditioned space within a building. A simple rule of thumb is that the filter bed size should be roughly ⅔rds of one percent of the overall square footage of a building whose air is to be purified. Filter beds may be at a single level or stacked. In most cases air enters the chamber in which the plants are located, passes through the plant air purifier and then is ducted to another location where pure quality air is desired. Plant air purifiers can be either single level or multi leveled devices.

Hooking into the Ducting System—For a plant air purifier to be effective in helping to condition the air for an entire structure or for a section of a structure, air must enter the space where the plant air purifier is located, pass through the filter bed of the plant air purifier and either enter the ducting system of the HVAC system of the building or enter into an area where the purified air will then be drawn into the HVAC system of the building for which the air is to be purified. If possible it is preferred that the air which enters the space where the plant air purifier is located receive return air from the HVAC system of a particular structure and so be upstream of the air handler. This is because that air will usually be dirtier and if upstream of the air handler will not be too hot for the plants in the plant air purifier. Given that the heating coils in the air handler can heat air to a 140 degrees Fahrenheit and given that the plants in the plant air purifier are most comfortable when air temperatures do not exceed 85 degrees Fahrenheit, any air above that temperature might well cause undue stress upon the plants, and if the temperature far exceed this level, they well might die. By the same token, if supply air downstream of the air handler had already been mixed with outdoor air and was now at a temperature between 65-85 degrees Fahrenheit, which is the comfort level of the plants used in the plant air purifier, than this would be a good place for air to be drawn from. Or of course air could just be drawn from a central atrium of a building in which exhaust air entered, or, say, from air within a large box store, preferably close to the ceilings, since pollutants within the air of such a building would in many cases rise with the warmer air therein. In the case where there is no duct which feeds air from the building into the space where the plant air purifier is located, than either the structure housing the plant air purifier will have to be located along or on top of the building where air is to be taken from to be purified, or a duct will have to be connected to that space, and another will have to exit therefrom as well. If ducting has to cover any length of space outside, flexible fiberglass ducting is probably preferable or ducting that has both insulation and a vapor barrier. Flexibility is also an advantage. Duct insulation liners may also be considered. Where changes of direction or reduction occur in ductwork, a transition fitting is desirable to minimize air friction and turbulence within the duct system.

Pressure And The Specific Needs Of Having Additional Blower Or Air Movement Capacity As A Result Of The Plant Air Purifying Enclosure—Pressure drop will occur when air from a duct enters a plant air purifying enclosure. The duct from which the air is taken may be one foot, a foot and a half, three feet even four feet wide. Air may be passing through this duct at anywhere between 1000 and 5000 cubic feet per minute. But as soon as it enters a larger space where the plant air purifier is located, flow speed will drop dramatically. Example. If for instance it was determined that the amount of filter bed size for a particular structure was determined to be 800 square feet, than it ordinarily take a space 50 by 20 feet to house a single level filter bed system. And if it were placed in a subterranean enclosure of a commercial building, with ducts hanging down from a 12 foot ceiling, the enclosure would be considerable. Thus if the ducts entering this space were 3 ft by 3 ft, and a 3 ft opening in the duct was made, what had 27 cubic feet of space where air was traveling at 2000 cubic feet per minute would rush out into an area of 12000 ft. This would slow air speed down dramatically to little better than 4.5 cubic feet per minute. After that it would than pass through the filter bed of 800 square feet and then through the plenums below the filter beds into ducts which were connected to the main duct, where the air had been removed originally from, where it would encounter further resistance as the duct twists and turns and become constricted. What with all this activity and resistance an auxiliary air movement mechanism would be needed to accelerate the speed of the air returning once again to 2000 cfm when it enters the same duct from which it left, though further downstream otherwise rooms at the far end of the duct runs would not have the same ventilation rate and would suffer as a result. Thus an auxiliary air movement mechanism is a necessity if a plant air purifying enclosure is retrofitted into a structure, or attached to an already existing HVAC system.

Lighting for the Plants in a Plant Air Purifying Enclosure—The plants which function within the plant air purifier are primarily low level light requiring plants. If they were to receive indirect sunlight, the plants themselves should be placed eight feet or more from a large window and should not receive direct sunlight to meet their daily lighting requirements. Such light can come from opaque or clear poly carbon where it can be used as a window. This can form the walls of the structure or can act as a skylight. If natural light is supplementing artificial light to meet the plants' light requirements, openings that let in that light must have good insulation built therein. But the more there insulative powers, the less light will enter. Luckily low light-requiring plants need very little light, since most light-requiring plants come from the tropical rainforest and exist under a thick leaf canopy. In fact their lighting requirements are about one hundredth of the intensity of direct sunlight shining down at noon in the summer. Low light requiring plants, which are the ideal plants for plant air purifiers, require about 100 to 150 foot candles of light. Such low levels of light can easily be met by artificial means. Presently the least expensive light which will satisfy their needs comes from florescent bulbs, taking into account the cost of fixtures, replacement bulbs and usage of energy. These work very well for the purpose. Golden pathos, one type of low light requiring plant, with excellent plant air purifying capabilities was well supplied with light from fluorescents placed on the ceiling in a windowless laboratory for almost a year. Since the fixture costs of florescent lights are moderate and the replacement bulbs inexpensive, at the present time, the optimum present day choice to supply the lighting needs of the plants in the plant air purifier is florescent and a cool white. T12 is the least expensive choice. T8's also can be used and offer as much as a 40% savings on energy. Cool-white lights produce mostly blue light and are low in red light; they are cool enough to be positioned quite close to plants if that is desired. Foliage plants grow well under cool-white fluorescent lights.

In the alternative artificial light from LEDs (light emitting diodes) could supply such light. Either type of artificial lighting, or even more expensive artificial light, could be placed on the walls, overhead or they could be attached to the sides of the baker tray carts, or under each level of plant tray. Certain LEDs are placed in waterproof housings and so will not be disrupted when water from the overhead sprinkler or from water draining from an overhead filter bed touches them. The drawback presently to LED lighting is its initial cost. Presently they are more expensive than other forms of lighting. However, it is hoped within a few years that when fixture costs drop and LEDs themselves cost less that they will become the artificial light of choice in supplying the lighting needs of plants within plant air purifiers for all of the reasons shown below:

LEDS lights (light emitting diodes) are the best remedy to handle lightning for plants in a plant air purifier because:
  They save 80% to 90% in energy consumption compared to fluorescent tubes, HPS or MHS.
  95% of the light of LEDs can be absorbed by plants, but only 10% by HPS or MHS.
  They can reduce grow room temperature compared to HPS or MHS.
  High power LED are estimated to last 50,000 hours. This equates to an expected bulb life of 10-12 years of 24/7 operation.
  High power LED has only minor light decay of about 5%.
  They need little or no maintaining.
  Their wide angle projection insures uniform leaf coverage.
  NASA is using LEDs to grow plants in space right now with great success!
  With LED technology no reflector is needed! This is because LEDs are already directional lights. LED lights produce very little heat. This means one can safely forgo energy-consuming fans and other exotic cooling solutions.
  With LEDs the reflectors are built right into the LEDs themselves.
  Almost all of the light generated by LEDs is directed straight at the plants.
  Typically LEDs have less than twenty volts at the bulb. This greatly reduces risk of fire, or injury, especially in wet growing environments.
  Lower Burn and Fire Risk—The high heat generated by a typical metal halide or high pressure sodium lamp is more than enough to ignite nearby combustible objects such as paper or cloth. Their reflectors often get very hot as well and can cause severe burns if they are accidentally touched. LED Grow Lights operate at just a few degrees above room temperature, in fact their operating temperature is less than fifteen degrees above ambient temperature. Just slightly warm to the touch while running.
  Light Weight—LED Grow Lights have no bulky reflector or heavy ballast, and weigh only a few ounces. The ballast of a standard metallic vapor lamp, on the other hand, can weigh up to fifty pounds requiring special consideration when fitted to a reflector and hung from a ceiling.
  Less Fragile—The glass bulbs of other plant lighting is very fragile. LED plant lighting has no glass parts, and is much harder to break.
  Less Environmental Hazard—Metallic vapor and fluorescent lamps all contain mercury, a heavy metal identified by the U.S. Government as hazardous to the environment. LED plant lighting contains no mercury and represent an environmentally friendly lighting choice.
  LED plant lighting delivers light that is very bright to plants, but relatively dim to people. Plants get what they need without the "white light" glare humans do not like. Plus they speed new root growth.
  Lower the Chance of Heat Induced Root Damage—Plant roots don't like to be hot, and potted plants left in direct sun are prone to root damage where sunlight heats the surface of the pot. The same damage can occur in closed rooms with hot, HID lights and inadequate ventilation. LED grow lights operate at such a low temperature that incidental root damage is unlikely.
  With LED grow lights plants will transpire less, and will result in fewer watering cycles.

When florescent lights are used in the PAPE they can hang from the ceiling, be attached to the walls or even be attached to the baker's carts. Florescent lights should be within a five foot distance of the plants surface for the most beneficial effect. LEDs should be placed much closer.

Number of Hours of Light Plants should Receive—Lighting within the enclosure where the plants are located should not be longer than 16 to 18 hours a day and no less than 12. Timers hooked to the system or the building automated system should shut off the lights at least six to eight hours a day.

Watering Needs of Plants in the Plant Air Purifier—Both plants and microbes in a filter bed in a plant air purifier require far more water than would plants grown in normal soil. This is mainly due to the tremendous volume of air passing through the filter bed which absorbs much of the moisture found therein. Therefore special means have to be found to resupply that water whenever the filter bed's moisture level goes below a certain point. A moisture sensor located within the filter bed directs a micro irrigation system to emit water from a watering reserve system onto the filter bed whenever necessary, and that can be as often as every few minutes, or every hour.

Dust Removal Of The Plant Leaves In The Plant Air Purifier Or Cleaning Of The Stomata On A Plant's Leaves Within The System—Plants are complex beings which have the unique ability to manufacture their own sugar or energy through the process of photosynthesis. During this process they take in light, absorb carbon dioxide from the atmosphere through tiny openings in the leaves called stomata, absorb moisture through their roots, and split water molecules into oxygen and hydrogen, whereby oxygen is released into the atmosphere through other stomata on the leaf's surface. During the process of photosynthesis, complex chemical reactions occur and the plant uses hydrogen and carbon dioxide to form sugars. These sugars not only provide food for the plant, but also serve as a source of energy to synthesize chemicals found in the atmosphere, some of which are components of poor indoor quality air. Certain stomata on the leaf's surface absorb these hazardous chemicals so that the plants own biological processes can destroy a given quantity of these toxins while the rest are transported down to the plant's roots where they are excreted. Microbes which congregate near the plant's roots then complete the breakdown process.

The leaves of a plant and the stomata or tiny openings found on both upper and lower surfaces of leaves perform many other vital functions including the giving off of moisture when humidity levels in the air are too low. When moisture is given off, the stomata help to create convection currents which draw nitrogen and oxygen down into the soil which help to break down debris close to the roots. In addition the stomata give off various chemicals which protect both plant and humans from airborne microbes and mold spores in the air.

For all of these reasons it is imperative that a leaf's surface remains clean, and that the stomata or opening on a leaf's surface do not become clogged with dust or oily residue. If plants cannot transpire because their stomata are clogged, humidity levels in the surrounding air will be low, dust will accumulate on the leaves' surfaces, and insects which are found even indoors, will attack the plant. For example, spider mites lay their eggs in the accumulated dust on a plant's leaves, and when their offspring are born, they voraciously devour the plant until it is finally destroyed. Such mites proliferate in warm, dry temperatures, something often found in parts of a building near its boiler or near heating coils within air handlers.

In nature rainwater and dew provide a means of cleaning a leaf's surface, as does wind. But within a building these do not occur, especially within unconditioned space. In fact more often than not the air in unconditioned space is stagnant. Thus an alternative means of cleaning the stomata on a leaf's surface must be found. This invention attends to this difficulty by providing the means for washing away, dust, dirt and debris from both the upper and lower surfaces of the plant leaves automatically.

The under surfaces of the leaves within the plant air purifier, are washed and cleaned by means of a micro irrigation system which sprays water up and onto the under surface of the leaf canopy, while saturating the filter bed as well. The upper surface of the leaves are rained down upon by means of an overhead sprinkler system. In addition wind currents created from fans and blowers in the HVAC system, as well as induction fans attached to the plant air purifier, make up for natural gusts of wind from out of doors. Thus a combination of all three wash and wisp dirt and dust particles from off the leaves themselves, and so the stomata are left free to function as nature intended, and danger from insect infestation is limited. Such a triple cleaning method is unique only to this invention as compared to other plant air purifiers.

Lest one think that the wind or air flow caused by an HVAC ventilation system may be sufficient to address the situation, keep in mind that air coming through such a system is not always dust free and that the ducting system itself may often become a breeding ground for dust mites. As a result dust from such systems will often accumulate on the plant's leaves. Also plants sometimes give off an oily residue on their own, or certain types of indoor smoke or fumes contain oils which will coat a plant's leaves; and when such a coating occurs, the dust in the air tends to stick to the leaves and will not be dislodged, except through some form of washing. By utilizing such a method as this invention uses, leaves of the plants within the plant air purification enclosure are kept clean, as well as the stomata on the leaves' surface.

The Need for Chemical Free Water—Plants and microbes within the filter beds of the plant air purifier require water. The plants need the water so as to break that water down into hydrogen and oxygen, and thus complete the process of photosynthesis. Plus they use water to help humidify the air about them, if conditions become too dry. The microbes within the filter bed need water so that they can move about within the filter bed itself and clean out the impurities therein. But unfortunately many of the water systems supplying water in both cities and towns is often laced with toxins such as chlorine and fluoride. In fact in the United States 60% of the drinking water contains fluorine, so as to restrict microbial action. Chlorine too is added to the water to kill pathogens. Unfortunately these chemicals harm friendly microbes as well as harmful ones, and the plant air purifier is loaded with friendly microbes. In addition these chemicals are harmful to plants. Studies have found that organisms that take in some of these chemicals are not capable of ridding themselves of them and so they concentrate them. Plants accumulate them in their leaves and aquatic organisms accumulate them in their exoskeleton or bone tissue whereupon it leads to stunted growth. It is therefore advisable to have a water source for the plant air purifier which does not have these toxins within them.

The Water Supply System—A water supply for the plant air purifier should make use of water vapor which condenses from dehumidifiers and air conditioners. As air cools it loses its ability to hold water. It condenses on the cooling coils of the air conditioner or dehumidifier, drips into a water pan or container, and then goes down a drain. This source of pure water can be utilized by the plant air purifier. A second source of water for the plant air purifier is rain water. Plants love soft, chemical-free rain water. Unfortunately thought, certain parts of the country have acid rain, which is often caused by the burning of coal. If rainwater has a high degree of acidity, this acidity must be buffered or neutralized. This is usually accomplished by running it through a limestone base. Failure to do so can harm both plants and microbes alike. A third possible water supply is from a well drilled alongside of the building and then piped into the structure where it connects with the initial reservoir. This well can supply year round water, free of chlorine and fluorides. However, owners and managers of structures already connected to a municipal water supply, are in many cases unwilling to go through the expense of drilling a well specifically for a plant air purifying system. However, if the well also takes care of outdoor shrubbery and lawns, they will consider it, what with the increasing cost of water. It is understood though that certain building owners may not even have the option of digging a well, even if they so chose; for instance, if the building were in the midst of a city.

The fourth source of water for the plant air purifier is the public water supply, which is only to be used if the other three sources are unavailable. Forgetting the possibility of having a well, availability of the first two sources of water might be somewhat limited in the depths of winter, when air-conditioning and dehumidifying are greatly restricted and when precipitation has turned to snow or ice. This limitation should occur only a few months of the year, however, even in the most northerly of climates. Rainwater or atmospheric precipitation can be continued year round by using heat tape around the drain opening from the roof. However, this should only occur if the drain pipe runs within the building, otherwise water might accumulate in the drain pipe, re-freeze and crack the pipe. A heat tape might be run down an outside drain pipe to limit freezing therein.

When normal tap water from a municipal water supply is used, since it will undoubtedly contain fluorides and chlorine, it should be allowed to sit for at least 24 hours in a tank with the water exposed to the air. Inflatable plastic tanks are available for just such a purpose and should be used to store the water and allow it to de-chlorinate. By leaving the water exposed to the air, chorine will leave the water and vaporize.

It is also advisable that water from any of these sources be stored within a space where the temperature is between 65 and 85 degrees Fahrenheit so that the water therein adjusts to the ambient temperature within the building and causes no shock to the plants as a result of it being too cold. These so called acclamation tanks can be of any size and can be made of plastic or even be a bladder. Some of them are inflatable and can be moved into the desired space with little trouble, whereupon, water from the desired source can be piped in to fill them. Water pumps may be utilized to move the water from one part of the structure to another where the tanks are located, if the source of the water is far removed from where the tanks will be placed. In the event the water storage tanks are housed in the structure and an auxiliary plant air purifier unit is housed outside the building, all pipes leading to the auxiliary structure should be insulated or wrapped in heat tape.

The Arrangement of Water Storage Tanks and their Mechanism—Given that the acclamation tank has only a certain capacity, if rainwater is coming down from the roof and all but fills it, a level sensor within the tank must close off entry and so divert water to another location. So too for water coming from a de-humidifier, air conditioner or chiller. Diverting of water can also be accomplished by attaching a float onto the underside of a stopper so that when water reaches a certain level in the reservoir, it closes off the tank; whereupon water backs up and escapes through an overflow drain and goes somewhere else. That other place could be a backup reservoir, or it could just go down a drain into the sewer system, or to a retaining pond.

When storing water for plant air purification, it is advisable to have at least three reservoirs: one for acclamation, one for refill of the recirculation tank, and one for the recirculation tank itself which actually irrigates the filter bed. In addition if there is a direct water feed from a municipal supply there should be an open faced de-chlorination chamber. The de-chlorination chamber also acts as an acclamation tank at the same time, when placed in a location which has an ambient air temperature of 65-85 degrees Fahrenheit. But if the de-chlorination tank is placed on the floor where the temperature is below 65 degrees, than water from the de-chlorination tank will have to pass into the acclamation tank before it can be used. By placing insulation below any tank, one can hasten acclamation if the temperature below the tank is less than 65 degrees.

A Limestone Filter for Rainwater—It is advisable that rainwater, if acidic, should pass through a limestone base. This can be accomplished simply by having a barrel with limestone in it. As water comes down the drainpipe, it passes through the barrel or other container filled with limestone and then continues to the reservoir. In this way the water is sufficiently buffered. If the area where rainwater is being used has no danger of acid rain, than the buffering barrel, tank, or container need not be used.

Watering, Salt Build Up and the Water Going to the Reservoir or Down the Drain—Watering of the filter bed will wash out all excess salts and fertilizer residue. A problem might arise if the water is continually recirculated as salt could build up in the water. Therefore it would be better if the recirculation reservoir and perhaps all reservoirs or tanks upstream of the recirculation tank have the capability of being backwashed, or if they all are equipped with sand filters which filter any water entering a reservoir. After backwashing the backwashed water should go down a drain. This procedure should occur periodically. Overhead sprinklers could also add dust to the mix and to a reservoir, had that water which runs out of the filter bed when the overhead sprinklers run been allowed to enter a reservoir. It is very much advisable that anytime the overhead sprinkler runs, that all water coming from the sprinkler and draining down through the filter bed go down a drain.

Determining when to have water go down the drain is a question of salt build up and the amount of dirt therein. Soluble salts are minerals dissolved in water. Fertilizer dissolved in water becomes a soluble salt. When water evaporates from the soil, the minerals or salts stay behind. As the salts in the soil become more and more concentrated, plants find it harder and harder to take up water. If salts build up to an extremely high level, water can be taken out of the root tips of the plants in the filter bed, causing them to die. High soluble salts damage the roots directly, and because the plant is weakened, it is more susceptible to attack from insects and disease. One of the most common problems associated with high salt levels is root rot. The best way to prevent soluble salt injury is to prevent soluble salt build up. If one allows the drained water to be absorbed by the soil, the salts that were washed out are taken back into the soil. Failure to wash out the reservoir every so often will lead to a salt residue therein which will dissolve into the water and so go back into the filter bed once more.

Cleaning out the Reservoirs—Every so often the reservoir will have to be cleaned out so salt and muck do not accumulate and get reintroduced into the filter bed. Failure to do so will cause problems for the plants.

The Plant Air Purifier Enclosure Area should Have Counters and Sink—The plant air purifier enclosure areal should have adequate space so that personal can work on the plants therein when and if they require it. PAPEs should have space within to make minor repairs to the plant air purifiers or any equipment within the PAPE itself. Plus there should be within the ability to substitute alternate plant trays if that becomes necessary. Plant trays with the material therein can be kept in a hydro culture condition where no air is going through them and where water wicks up from below, so as to sustain water levels, so that plants and microbes could survive when air is not traveling through. Enough substitute or replacement trays should be available which can be substituted for those being utilized within the plant air purifier which need replacement so there is no interruption of service, even if 15-20% of the trays and their contents had to be replaced. While it is preferred if such workspace, counters and sinks were available in the actual enclosure, such space could be in a separate room if necessary, but that space would still have to have a temperature range of from 65-85 degrees F.

Emergency Generator Back Up in Case of Power Outages, Baseboard or Furnace Heating, a Propane Fuel Source, Back Up Batteries, and a Water Tank Within the Enclosure for Emergency Water to Water the Plants—Given that the plants and microbes within the filter bed are living entities, and given that electrical systems do malfunction from time to time, or that there might be a power outages, the plant air purification enclosure should have an emergency backup generator, an emergency heating source such as a furnace or baseboard electrical heat, a propane tank to run the furnace, and a water tank from which water can be drawn manually to water the plants if necessary. Such equipment should be able to sustain the enclosure at a comfortable temperature of 65-85 degrees for at least a week.

Needless to say during such a period the plant air purifier would be on survival mode and not purifying air. The PAPE should also have an emergency source of outside air and a vent by which to rid the enclosure of excess heat, were an outage to occur in the middle of summer or if temperatures rose above 85 degree Fahrenheit within the enclosure itself. Plus there should be the ability to manually close the dampers to the other parts of the structure, if the main structure were without power or light.

Having Ultra Violet Light within some of the Ducting of the Plant Air Purification Enclosure—Ultra-violet light which spans a range of 100-280 nm has germicidal properties. This range of light known as Ultraviolet C (UVC) damages the DNA of microorganisms, destroying their ability to replicate and thus rendering them non-infectious.

Studies reveal a spectrum of microorganism susceptibility, dependent primarily upon the presence or absence of a cell wall and the thickness of the cell wall. Since viruses such as smallpox, influenza and adenovirus lack a cell wall they are more easily inactivated. Common forms of vegetative bacteria are generally intermediate in susceptibility. Spores such as B Anthancis in its usual state outside the body, are more difficult to penetrate.

The following are incident energies of germicidal ultraviolet radiation at 253.7 nanometers wavelength necessary to inhibit colony formation in microorganisms (90%) and for 2-log reduction (99%):

| Organisms: | Energy Dosage of Ultraviolet radiation (UV dose) in ΦWs/cm$^2$ needed for kill factor | |
|---|---|---|
| Bacteria | 90% (1 log reduction) | 99% (2 log reduction) |
| *Bacillus anthracis* - Anthrax | 4,520 | 8,700 |
| *Bacillus anthracis* spores - Anthrax spores | 24,320 | 46,200 |
| *Bacillus magaterium* sp. (spores) | 2,730 | 5,200 |
| *Bacillus magaterium* sp. (veg.) | 1,300 | 2,500 |
| *Bacillus paratyphusus* | 3,200 | 6,100 |
| *Bacillus subtilis* spores | 11,600 | 22,000 |
| *Bacillus subtilis* | 5,800 | 11,000 |
| *Clostridium tetani* | 13,000 | 22,000 |
| *Corynebacterium diphtheriae* | 3,370 | 6,510 |
| *Ebertelia typhosa* | 2,140 | 4,100 |
| *Escherichia coli* | 3,000 | 6,600 |
| *Leptospira canicola* - infectious Jaundice | 3,150 | 6,000 |
| *Microccocus candidus* | 6,050 | 12,300 |
| *Microccocus sphaeroides* | 1,000 | 15,400 |
| *Mycobacterium tuberculosis* | 6,200 | 10,000 |
| *Neisseria catarrhalis* | 4,400 | 8,500 |
| *Phytomonas tumefaciens* | 4,400 | 8,000 |
| *Proteus vulgaris* | 3,000 | 6,600 |
| *Pseudomonas aeruginosa* | 5,500 | 10,500 |
| *Pseudomonas fluorescens* | 3,500 | 6,600 |
| *Salmonella enteritidis* | 4,000 | 7,600 |
| *Salmonela paratyphi* - Enteric fever | 3,200 | 6,100 |
| *Salmonella typhosa* - Typhoid fever | 2,150 | 4,100 |
| *Salmonella typhimurium* | 8,000 | 15,200 |
| *Sarcina lutea* | 19,700 | 26,400 |
| *Serratia marcescens* | 2,420 | 6,160 |
| *Shigella dyseteriae* - Dysentery | 2,200 | 4,200 |
| *Shigella flexneri* - Dysentery | 1,700 | 3,400 |
| *Shigella paradysenteriae* | 1,680 | 3,400 |
| *Spirillum rubrum* | 4,400 | 6,160 |
| *Staphylococcus albus* | 1,840 | 5,720 |
| *Staphylococcus aerius* | 2,600 | 6,600 |
| *Staphylococcus hemolyticus* | 2,160 | 5,500 |
| *Staphylococcus lactis* | 6,150 | 8,800 |
| *Streptococcus viridans* | 2,000 | 3,800 |
| *Vibrio* comma - *Cholera* | 3,375 | 6,500 |
| Molds | 90% | 99% |
| *Aspergillius flavus* | 60,000 | 99,000 |
| *Aspergillius glaucus* | 44,000 | 88,000 |
| *Aspergillius niger* | 132,000 | 330,000 |
| *Mucor racemosus* A | 17,000 | 35,200 |
| *Mucor racemosus* B | 17,000 | 35,200 |
| *Oospora lactis* | 5,000 | 11,000 |
| *Penicillium expansum* | 13,000 | 22,000 |
| *Penicillium roqueforti* | 13,000 | 26,400 |
| *Penicillium digitatum* | 44,000 | 88,000 |
| *Rhisopus nigricans* | 111,000 | 220,000 |
| Protozoa | 90% | 99% |
| *Chlorella Vulgaris* | 13,000 | 22,000 |
| Nematode Eggs | 45,000 | 92,000 |
| *Paramecium* | 11,000 | 20,000 |
| Virus | 90% | 99% |
| Bacteriopfage - *E. Coli* | 2,600 | 6,600 |
| Infectious Hepatitis | 5,800 | 8,000 |
| Influenza | 3,400 | 6,600 |
| Poliovirus - Poliomyelitis | 3,150 | 6,600 |
| Tobacco mosaic | 240,000 | 440,000 |

Current data indicate that the incidental UVGI radiant quantity required to inactivate infectious particles relates to the microbial species and its ability to recover from damage induced by UV radiation and the presence of sufficiently high radiant exposure over time and the degree of humidity.

UV light will kill any DNA-based microorganism given enough UV dosage. UV breaks down DNA on a cumulative basis. Therefore, as air circulates through the ductwork of an HVAC system containing a UV light, or series of UV lights set at different locations within the system, the UV light continuously disinfects the air. If a microorganism is not effectively deactivated on the first pass through the ductwork, the UV light will continue to break its DNA down on subsequent passes. But the ability to kill some of these microorganisms will take many passes and so to look at UV light as the sole means of pathogen removal is impracticable. rather, it is best suited to supplement the work of plants housed in the PAPE.

Tests conducted by Light Sources Inc—Orange, Conn. and verified by American Ultraviolet Company—Lebanon, Ind. revealed that an American-Lights® lamp which produces 800 $\Omega W/cm^2@1'$ with 534FPM air flow at 55° F. UV dose=UV intensity×time in seconds. To compute time needed to inactivate germs in the above chart at 1' distance divide the UV dose by 800. Example: for 90% kill factor of *Bacillus subtilis* spores: 11,600 divided by 800=14.5 seconds In other words those particular *Bacillus* spores would need to be under that light for 14.5 seconds but since the spores contained in the air are traveling at a speed of approximately five miles an hour using the above calculation, it is going to take quite a few passes to completely destroy them.

Often UV lamps are mounted in the duct right next to the condensation pan or near the cooling coil within the air handler. Since the moisture and warmth found in and around air conditioning coils and within ductwork create an excellent host environment for any number of bacteria and disease, most notably *Legionella*, UV lights are installed next to the drip pans along A/C coils. These lamps can help destroy and prevent some of the mold and other microorganism growth there. Plus they can also help reduce foul odors that often come from an HVAC system's air supply as well. But placing UV lights in this location alone simply is not enough. Therefore UV light should be installed in other parts of a building or looked upon as a supplemental method for the removal of pathogens. This is especially so when humans are constantly adding to the pathogen problem and spreading airborne diseases every time they cough or sneeze.

For this reason it is advisable to install additional lamps in other locations within the system, and to do so where air speed flow is markedly reduced, rather than in certain ducts within an HVAC system where air can be traveling through at speeds of as high as 20,000 cubic feet per minute which is well over a hundred miles an hour. This invention places a UVC light array at the entryway to the plant air purification enclosure, where air can be traveling at only 4.5 feet per minute, in a location where eye contact with UVC light rays is slight. Because humans are rarely in the enclosure itself and because the UVC bulbs themselves have reflector light shade covering the lower 180 degrees of the bulb, so that light only shines upwards toward the ceiling from fixtures stationed no lower than 7 feet from the floor, pathogens within the air will get a more serious dose than they might elsewhere.

UVC lights are stationed in a second location within the plant air purification enclosure downstream of the plant air purifiers in a duct leading off from it, where air is traveling at only about 400 to 500 cfm. By placing UVC lights in the tapered plenum and downstream of the plant air purifiers, none of the UVC light's harmful radiation will hurt the friendly microbes within the plant air purifying system, nor will it be a health risk to humans where the retina of the eye can be damaged through UV light exposure. Finally UVC lights are placed in the location where the de-chlorination tank is stationed so there is no mold or mildew buildup within the open faced tank.

These added locations are in addition to the UVC light placed near the cooling coils in the air handler. Temperature has an effect on a UVC's effectiveness. Because the temperature level of air passing through the enclosure and near the de-chlorination tank is higher than near the cooling coils, UVC light exposure upon pathogens at these points will even be more effective than that placed near the cooling coils of the air conditioning unit.

Connection of the Building Automation System to the Plant Air Purification Enclosure and to its Many Functions therein—Building Automation Systems (BAS) optimize the start-up and performance of the heating, ventilating air conditioning equipment and of the alarm systems of a building. They greatly increase the interaction of mechanical subsystems within a building, improve occupant comfort, lower energy use and allow off-site building control. BAS use computer-based monitoring coordinates, organizes and optimizes building control sub systems such as security, fire/life safety, elevators, etc. It includes:

1. Equipment scheduling (turning equipment off and on as required).
2. Optimum start/stop (turning heating and cooling equipment on in advance to ensure the building is at a required temperature during occupancy).
3. Operator adjustment (accessing operator set-points that tune each system to changing conditions).
4. Monitoring (logging of temperature, energy use, equipment start times, operator logon, etc.).
5. Alarm reporting (notifying the operator of failed equipment, out of limit temperature/pressure conditions or need for maintenance).

BAS includes a collection of sensors that determine the condition or status of parameters to be controlled, such as temperature, relative humidity and pressure. Similarly, output devices impart electronic signals or physical action to the control devices. Examples include electric relays or dampers and valve actuators. The sensors and output devices are connected either to a unitary controller or to a distributed processor. Unitary controllers are limited to the needs of an intended function and have limited capabilities, such as memory size. Distributed processors can accommodate the needs of several unitary controllers as well as connect directly to input and output devices.

BAS reduces energy consumption from HVAC equipment, reduces cost and time required to monitor and manage building operation.

By having various components of the Plant Air Purification Enclosure hooked into the BAS for the building, components such as the emergency furnace, baseboard heating, the emergency generator, the plant lights, ultraviolet lighting, water supply valves, air vents, outside air dampers, moisture sensors, overhead dust removing sprinklers, irrigation sprinklers and humidity sensors now become part of the BAS so it is aware of how the plant air purification system is functioning, what the temperature is within the enclosure, etc. Thus it can institute appropriate measures if conditions go outside acceptable ranges. Plus it can monitor and control when things within the enclosure and outside should function. By having the BAS monitor temperature, air flow, humidity and other conditions within the enclosure and out, within the acclimation tank, the de-chlorination tank, the irrigation tank and the recirculation tank, it can activate and deactivate certain controls. It can shift from one source of water to another for instance when dehumidifiers and air conditioning equipment fail to supply enough necessary water. By having the BAS hooked up to blowers and induction fans, it can shut off or turn on those air movement devices when conditions warrant. It can monitor and control the length of time water sits in the de-chlorination tank and whether the building's electrical power is on or off. Plus it can warn building managers and operators of the overall system's condition when subsystems within the building and the enclosure are not functioning; when new measures should be instituted, and when repair crews should be alerted to take appropriate action. The BAS is the eyes and ears of the various systems within the enclosure and outside of it, and the initiator of various actions which may be so repetitive that only a machine, a computer, or microprocessor could do them efficiently. By hooking the BAS up to the various components within the PAPE, it can automate what might be a very complex operation and make it simple, so giving peace of mind to owners and managers alike. In this invention, in certain of its embodiments, various components within the system are hooked up to the BAS and the BAS controls what goes on.

Some of the functions the BAS both monitors and controls are those listed below:
1. If the overhead sprinkler are on, it closes all air dampers from the supply air duct leading into and out of the plant air purification enclosure.
2. If the moisture sensor signals moisture in the filter bed is above a predetermined level or a predetermined time has elapsed since the irrigation emitters were on, it then opens the air dampers leading to and from the plant air purification enclosure.
3. If the micro irrigation system is emitting moisture into the filter bed it closes the air dampers leading into the enclosure.
4. At a predetermined time of day, it turn the lights on which supply light to the plants.
5. At a predetermined time, it turns the lights off.
6. If there are windows or translucent material on the walls of the enclosure for outside illumination of plants and if the temperature outside of the enclosure is below or above a certain point, it closes up the movable insulation.
7. If the temperature within the PAPE, where the plant air purifier is located hits, say, 64 degrees and stays there for a predetermined time period (e.g., ten minutes), it activates the baseboard electrical heating system within the enclosure and closes the outside dampers to, and the dampers out of, the enclosure.
8. If the emergency electrical heating is on, and the temperature within the enclosure is above, say, 65 degrees, for at least, say, 10 minutes, and if the thermometer shows incoming air from the induction duct would be able to enter at higher than, say, 64 degrees, but less than, say, 86 degrees F., it shuts off the emergency electrical baseboard heating.
9. If temperature within the enclosure is, say, 64 degrees F. or lower and the electrical emergency heater not on, and no electrical power is flowing, it activates the emergency generator.
10. If temperature within the enclosure are above, say, 65 degrees F. and the emergency generator is on and power which was off now shows power on, it turn off the emergency generator.
11. If temperature is above, say, 85 degrees in the enclosure and if the ambient air temperature outside is less than said, for example, 85 degrees, it opens the emergency outside air damper and closes all other air dampers to the location, activating the emergency air intake fan.
12. If the emergency outside air damper is open to the enclosure and temperatures within are less than, say, 85 degrees within the enclosure, it closes the outside air emergency damper and shuts off the emergency air intake fan.
13. If the micro irrigation system is supposed to activate the sprinklers but no micro irrigation occurs, than it shuts off the induction fan connected to the plant air purifier and closes the air damper leading into the enclosure from the building's HVAC system, and sends an alarm that the micro irrigation system is malfunctioning.
14. If lights don't turn on when they should, it activates an alarm within the BAS system.

In case of malfunction of the plant air purification system, a cut off of electricity, or temperatures rising above or falling below the acceptable preferred range of 65 to 85 degrees F., it cuts off air intake from the HVAC system and sends an alarm to the BAS of a malfunction occurring.

In case the electricity is off, and dampers open to the plant air purification enclosure, and temperature above or below acceptable range, and HVAC system not functioning for a certain period of time, the enclosure must become self contained, so dampers are closed off to the building's HVAC system.

The Plant Air Purification Enclosure and its Ability to Deal with Heavily Polluted Outside Air—Buildings situated in heavily polluted areas utilize HEPA filters and other types of filter to strain out the particulate matter from heavily polluted air coming into the building. These constantly must be replaced. A PAPE has the ability to take in outside air and mix that air with recirculating air, then run the mixture through the plant air purifier within the enclosure. Often, however, heavily polluted outdoor air has within it sulfur dioxide and nitrous oxide. When these come in contact with water, they form sulfuric and nitric acid. These acids may be harmful both to plants and to microbes within the plant air purifier. Therefore the incoming outside air which has such pollutants within it should be buffered prior to entering the plant air purifier or at least buffering should occur as soon as that polluted air comes in contact with moisture, otherwise it will form an acid. One way to prevent harmful effects to plants and microbes is to pass the air through a water curtain where the water has previously traveled through a limestone bed. Another is to aerate the outside air through the limewater tank itself. Another is to place limestone aggregate on the top of the filter bed in the plant air purifier. A fourth way is to mix limestone aggregate within the filter bed. A fifth way is to have limestone aggregate in the plenum below the filter bed, so that excess water dropping down through the filter bed must seep through it before going down the drain, and thereafter it returned as recycled water for future saturation of the filter bed. A final way is to have a container below the drain filled with limestone in it through which water dropping down the drain will have to pass through the limestone prior to entering the recirculation tank. These various approaches are not mutually exclusive and can be combined as desired.

Buffering agents other than limestone may be used. Limestone simply happens to be the buffering agent of choice. Once the air comes in contact with moisture and the moisture is buffered then what is left are sulfates and nitrates. These are fertilizers so if they remain in the filter bed or are within the water passing through the emitters of the micro irrigation system, they will furnish nutrients for the plants and make them thrive. In such an embodiment of the invention polluted outdoor air actually has beneficial consequences for the plants and microbes in the plant air purification system and may well eliminate the need to add other types of nutrients into the artificial soil, where plants and microbes grow, and so eliminate the need for costly particulate filters which have to be replaced.

Humidity, Airborne Microbes and Most Forced Air Systems—Most forced air systems, especially in winter, tend to dry out indoor air as the air passes through the furnace or by the heating coils in the air handler. Low humidity results in the need to set the temperature at a higher level for human comfort purposes. This is because low humidity levels cause body moisture to evaporate more quickly so that a person feels chilled.

Warm air holds more water vapor than cold air. When air at a certain temperature contains all the water vapor it can hold at that temperature, its relative humidity is 100 percent. If it contains only half the water vapor it is capable of holding at that temperature, its relative humidity is 50 percent.

If outside air temperature in winter is 0 F and its relative humidity is 75 percent, that same air inside at 70 F will have a 4 percent relative humidity level! To understand just how dry that is, compare that indoor air to air in the Sahara Desert, which has an average relative humidity level of 25 percent.

Human comfort dictates that relative humidity should be somewhere between 20-60%, especially in winter. 30-50% humidity in indoor air is recommended.

Lack of adequate humidity in indoor air can cause static electricity, dry skin and hair, itching and chapping. Mucous membranes in the nose and throat dry out, increasing a person's discomfort and causing susceptibility to colds and respiratory illness. With low humidity levels, body moisture evaporates so quickly that one feels chilled even at a higher thermostat setting. Lack of a humidifier in a building in winter will require that thermostats be set at a higher temperature, especially if outdoor air is being brought in great quantities, which is an ASHRAE requirement, except if one follows the alternate IAQ procedure where a plant air purifier can be used to purify indoor air. If thermostats are kept at a higher setting than they have to be, this will result in higher energy usages. Therefore the adding of a humidifier to a forced air system in winter is a must. One added advantage to a plant air purifier is that it acts as a humidifier as well as a purifier.

Conversely in summer, or in climates where the weather is warm and humid, when outside air enters the building at a higher temperature it contains more moisture than it can hold when the air cools. This leads to condensation. Condensation in a confined space ordinarily gives rise to mold, mildew, and an increase of airborne microbes, all of which are harmful to a building's inhabitants. Thus bringing vast quantities of outside air into a building either in winter or summer can be harmful to the health of the inhabitants unless other pieces of equipment are added to the HVAC system which will cause additional expense. Some of this expense may be unnecessary if a plant air purification enclosure with a plant air purifier is installed within a building. By having such an enclosure there will be less outdoor air ventilation which means there is less of a humidity problem and less of a mold and mildew problem than would otherwise be the case.

Plant Air Purification Enclosures Eliminate the Need for other Types Of Humidifiers in a Building which are a Necessity with a Forced Air System. And they Suppress Mold, Mildew and Airborne Microbes. They are Safer for the Inhabitants and will Eliminate the Need for Maintenance and Replaceable Parts of Other Humidifying Systems in Use which can be Disconnected—Having a plant air purifier within a plant air purification enclosure is superior to having many other types of humidifiers, ordinarily used in buildings, because chambers where water is stored within humidifiers can become a breeding ground for mold and mildew. Drum style humidifiers create such a danger. In such a system a pipe brings water directly to a reservoir (a pan) attached to the furnace. The pan contain water which lies stagnant and is a breeding ground in which mold can grow. The water level in the pan is controlled by a float valve. A wick is typically a foam pad mounted on a drum and attached to a small motor. Hot air enters the drum at one end and is forced to leave through the sides of the drum. When the hygrostat calls for humidity, the motor is turned on causing the drum to rotate slowly through the pan of water, preventing the foam pad from drying out. As it does so it picks up some of the mold spores and forced air from the forced air system blows mold spores throughout the building.

Plant air purifiers have friendly microbes within their filter bed, which are hostile to mold, mildew and airborne microbes. When dry air passes through the filter bed of the plant air purifier, it acquires moisture which adds to the humidity within the building, without having to take in mold spores, harmful bacteria or viruses, which are suppressed by friendly microbes in the filter bed.

Dr. B. C. Wolverton has shown that research conducted with a plant air purifier placed in a sunroom resulted in humidity levels 21% higher than a control room and that there were 65% less airborne microbes. He also states in a research article printed in 1993 entitled "Interior Plants, Their Influence On Airborne Microbes and Relative Humidity Levels Inside Energy-Efficient Buildings "Research Report No. WES/100/05-93/011; pp 1-19 Plants for Clean Air Council, 10210 Bald Hill Road, Mitchellville, Md. 20721 that certain houseplants can suppress levels of airborne microbes and add water vapor to rooms in which they are maintained. Having a plant air purification enclosure which filters the air within a building will suppress mold, mildew and airborne microbes. Plus having such a system should result in building owners and managers actually shutting down already existing-humidification systems which will merely become redundant.

Increasing or Decreasing Humidity in the Conditioned Space of a Building—In winter time there rarely should be a problem of there being too much humidity in the air caused by the plant air purifier within the plant air purification enclosure. Air filtration through the envelope of the building, the opening of outside doors, and the movement of the elevators in the elevator shafts, for example, all draw outside air into the building which will be extremely low in humidity when it heats up in winter time. But in the summer time, humidity generated by the plant air purifier could conceivably be a problem. One embodiment of this invention has a fog filter or fog screen, placed at the exit duct from the plant air purifier, just prior to where air is reentering the building's ducting system, or entering into another area of the building.

This so called component is similar in nature to a fog fence or fog collector. A fog fence or fog collector is an apparatus for collecting liquid water from fog, using a fine mesh or array of parallel wires. Proposed geometries include linear, similar to a fence and cylindrical. It has the advantage of being passive, requiring no external energy source to perform its collection The water droplets in the fog deposit on the mesh. A second mesh rubbing against the first causes the droplets to coalesce and run to the bottom of the meshes, where the water may be collected.

By placing the fog screen across the air exit opening from the plant air purifier, excess moisture within the purified air will coalesce and run down into the plenum and down the drain where it will add to water in the recirculation reservoir, to be pumped through the micro irrigation system and its emitters, which moisturize the filter bed. Meanwhile, in winter time, if additional levels of humidity are required for the building at large, the fog filter can simply be removed and air with a greater humidity level can simply flow to the conditioned space.

Experience with normal fog fences has shown that vertical fibers are more important than horizontal ones- and wind-driven motion is considered to be good. Thus, where air is being pulled down from the air duct, and an induction fan is pulling air through the fog filter, these will prove to be equivalent to wind. Experiments using three different materials for fog collectors with different mesh materials namely: air conditioner filter (AC; 6 m H 2.8 m), green shade mesh (12 m H 3 m), and aluminum shade mesh (12 m H 3 m), gave the following results. Among all of these, the AC filter proved to be the most effective. The total fog water collected during the period of 77 days by AC filter, green shade mesh, and aluminum shade mesh was 995, 880, and 753 L/m2, respectively. Other studies have shown that the best fog removal effect of all tests was achieved with aluminum mosquito net, while the plastic green-house mesh performed worst. Reduction in humidity was 6.7% and the cooler the surface of the mesh relative to the environment the more moisture it was able to collect.

Another embodiment of the invention has the fog collector being stationed in a place outside the plant air purification enclosure where temperatures are cooler than in the enclosure itself. A cooling coil within the air handler unit is in fact a fog filter. Often its fins are no more than $\frac{1}{16}$th of an inch apart. By having the cooling coil downstream of the plant air purifier excess moisture is removed from the building's air stream and that process is increased still further when the cooling coil has cold liquid or gas passing through.

A third embodiment of the invention increases humidity by having the furnace, heating coil or cooling coil of the HVAC upstream of the plant air purifier enclosure.

Lastly a fourth embodiment of the invention increases humidity by increasing the percentage of overall air going through the filter bed.

Tests conducted at Syracuse University in 2008 at the Center of Excellence which were funded both by NYSERDA and the EPA found that when air was passed through a plant air purifier, the amount of relative humidity increases by 15.8%. However since only $\frac{1}{14}$ of the total air supply passed through the filter bed the total increase in overall relative humidity for the building's total air supply came to only 1.82%. To increase humidity in the air in the conditioned space all that is necessary is to increase the percentage of overall air going through the filter bed, or to have the furnace, or heating coil and the cooling coil of the HVAC stationed upstream of the plant air purifier enclosure.

A second method is simply to place the plant air purification enclosure upstream of a location where the air coming out of the enclosure will be cooled either by a dehumidifier or by an air conditioning unit. The moisture that the air is then able to hold will decrease significantly and the moisture will drop into a pan and drain down into a reservoir where it will eventfully be used for re-moisturizing the filter bed of the plant air purifier.

Finding the Best Location for the Plant Air Purification Enclosure so as to Deal With its Humidifying Aspects—As air passes through the filter bed of the plant air purifier it will ordinarily pick up moisture. This moisture is of benefit when the air humidity in the conditioned space is low. In summer the humidity of the air in the building may well be higher, in which case extra humidity may not be as much desired. (This statement is of course dependant on where the building is located, whether in the northeast, the south, the west, etc. and what outside air conditions are.) So where is the best place to situate the plant air purification enclosure? If the enclosure is upstream of the furnace or heating coils, moisture within the air will decrease when the air is heated. If the enclosure is immediately downstream of the heating instruments air may be too hot for the plants in the plant air purifier. By the same token if the enclosure is downstream of the de-humidifier or cooling coils of the HVAC system, it will not be able to make use of these devices to dehumidify the extra moisture the plant air purifier may well supply. Therefore in the most ideal of all situations it would be best to place the plant air purification enclosure downstream of the heating units within the HVAC system but not too close to them so that air coming into the enclosure is not above 85 degrees F. and yet the enclosure should be placed before the cooling aspects of the HVAC system so that excess moisture in the air could be reduced as the air became cooler.

But often placement of the enclosure cannot be so accommodated, especially when both heating and cooling aspects of the system are placed in an air handler in one unit. Another way to deal with the situation is to see that air coming into the enclosure can be shifted depending on the desired effect. If the air from the enclosure is to be allowed to stay moist, one should make sure that neither the heating units nor the cooling units strip moisture from it. If air is to be dehumidified, one should place the enclosure upstream of either set of units and be able to change the feed into the enclosure accordingly.

Another method is to have only part of the air of the ducts enter the enclosure so that when the air exits the enclosure and mixes with the remainder of air going to the conditioned space the extra humidity only slightly increases the humidity of the overall air being supplied. This can be accomplished by setting the damper so that a predetermined portion of the air goes into the plant air purifier enclosure and the remainder simply bypasses the space. A third alternative is to have more than one plant air purification enclosure and to situate them in different parts of the building, and so put air into these spaces according to the degree of humidity desired. Were this last situation to be employed, the plants within the plant air purifier, when not used, would need far less moisture since air was not passing through their filter beds, however air would still have to enter these alternate PAPEs so as to heat and cool the space.

Finally, it is preferred that the PAPE insulation be effective enough so as to reduce and even eliminate the need for separate heating and cooling to keep the plants healthy, so that the heating or cooling needs of the plants can be provided in whole or in large part by the indoor air that is being vented into the PAPE to be purified. For example, if the PAPE is situated in a 90 degree F. environment, but the indoor air being purified is 68 degrees Fahrenheit, then the insulation of the PAPE should preferably ensure that the plants are also kept within a few degrees of 68 degrees F. by this air being purified, despite the 90 degree F. environment. Similarly, if the PAPE is situated in a 15 degree F. environment, but the indoor air being purified is 72 degrees F., the insulation should preferably ensure that the plants are also kept within a few degrees of 72 degrees F. by this air being purified. That is, it is preferred that the thermal insulation in combination with thermal energy from the impure air arriving from the space exterior to the PAPE via the incoming air conduit maintain the temperature within the interior space of the PAPE within a range suitable for plant growth. In this way, the air being treated doubles as a source of heat or cooling for the plants, and energy consumption is consequently reduced. As a general rule, air passing through the enclosure should not have its temperature altered by more than five (5) degrees F. between when it enters and when it exits said enclosure, though it is even more preferred for this range to be as low as four (4), three (3), two (2), or even one (1) degree(s) F. Also, as a general rule, this should be achievable irrespective of the particular climate. Obviously, in climates or environments where temperatures vary well above or below temperatures suitable for growing pants, higher insulation effectiveness will be required, and/or or the selected plants will have to be able to tolerated a greater range of temperatures.

Now, we review the Figures in detail:

FIG. 1 illustrates an unconditioned space, in this case below grade. Although not shown in the figure, it is presumed that there is a boiler, air chiller and various other pieces of the HVAC system close by, as is typical for such a space. Temperatures within the enlarged space stay between 65-85 F. year round. In the figure itself we see the ceiling 1, the back wall 2, an overhead duct 3 and the floor 4. Conditioned air 5 is shown to be traveling within the duct in an easterly direction 6.

FIG. 2A shows the same area, now enclosed with heavy grade plastic sheeting 201. Alternatively, or in addition, industrial curtains 206 could be used. The plastic sheeting is attached at the ceiling 1 and attached to 2×4s 202 attached to the floor 4. This confined space makes up the outer boundaries of the plant air purification enclosure (PAPE) 203. On either side of the PAPE is unconditioned space 204. The PAPE receives conditioned air 5 through an opening in the overhead duct 3 where a ceiling vent is located 205. A plant air purifier 207 is located within the PAPE. The plant air purifier has a filter bed 208. Within the filter bed is expanded shale 209 and activated carbon 210. Within the filter bed grow microbes 211 which are situated near the root system 212 of the plants 213. Conditioned air 5 passes out of the overhead duct 3, through the overhead ceiling vent 205 and is sucked down into the plant air purifier 207 where it passes through the filter bed 208 and down into a plenum below 214 where an induction fan 215 pulls the air into a duct 216 connected 217 with the overhead duct 3, but situated further downstream from where the ceiling vents are located. As a result of this process air in the overhead duct now carries purified air 219, whereas previously there was impure air 218. before it entered the plant air purification enclosure.

As air passes from the overhead duct into the PAPE, dust and dirt particles 220 within the PAPE are stirred up. Additional dust and dirt particles 221 come into the space through the overhead ceiling vent 205. The boundaries 201, 206 which separate the PAPE from the unconditioned space 204 on either side prevent dust from outside the enclosure from being stirred up and entering the enclosure itself. Some of these dust particles which are now in the air coat the leaves 222 of the plants 213 in the plant air purifier 207. This dust forms on both the top of the leaves 223 and the bottom of the leaves 224.

When air is passing through the ceiling vents 205 louvers or veins 225 located in the opening are in the open position and the duct vent 226 is shut. A blower 227 downstream of the ceiling vents pulls air out of the reconnecting duct from the plant air purifier and sends the now purified air on its way.

FIG. 2B illustrates the dust removal process. Dirt and dust particles 221 from the overhead duct 3 and dust from about the room 220 have coated the upper 223 and lower 224 surfaces of the leaves 222. These block up the stomata or porous openings 228 on the leaves' surface. In order for the stomata to function—to take in impure air 218 and transpire moisture 229—this dust must be removed. This is accomplished in three ways. Air 5 from the over head duct 3 is propelled by a blower 227 and pulled by an induction fan 215 through the plant leaves 222 and this air blows the dust 230 away. Water 231 from the overhead sprinklers 232 rains down on the upper surface 223 of the leaves and washes dust away, and micro irrigation emitters 233 on the surface of the filter bed 208 spray 234 the undersurface of the leaves and so remove any dust which has clogged the stomata located there. This triple process keeps all surfaces of the leaves free of dust and dirt. It is important to note that the air removal process and the water cleaning process do not occur simultaneously. When air is entering the enclosure, the micro irrigation emitters and the overhead sprinkler are off and when watering devices are on, the blower and the induction fan are off. Otherwise, the water from the overhead sprinklers 232 and micro irrigation emitters 233 would be propelled through the ductwork which is not desirable.

Figure 3:
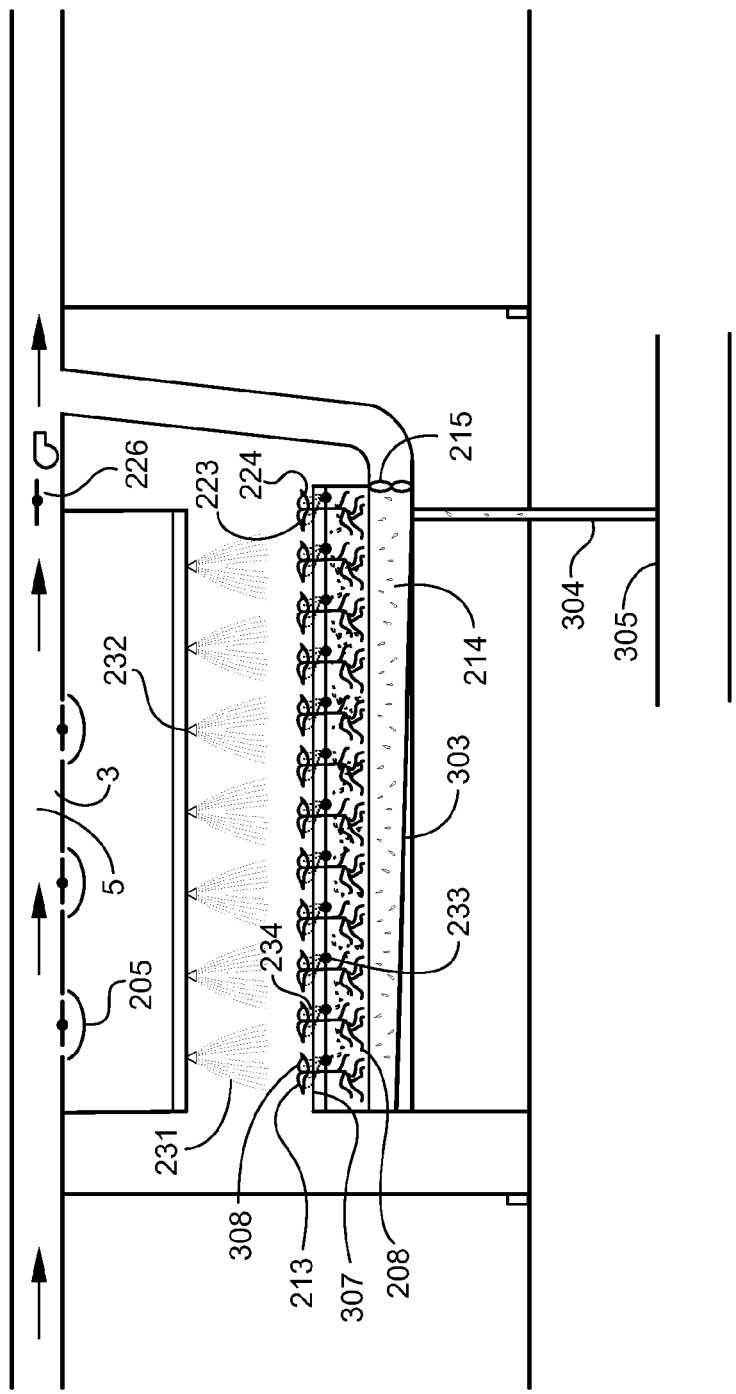
FIG. 3 illustrates a PAPE with an air bypassing enclosure during watering process.

FIG. 3 illustrates the watering and dust removal process when air is not moving about or through the PAPE. Here, the overhead ceiling vents 205 are shut and the duct damper 226 is open allowing air in the overhead duct to pass through the duct without it being diverted and sent through the plant air purifier.

To remove the dust from the top of the leaves an overhead sprinkler 232 sprays water 231 down upon the plants 213 in the plant air purifier 207. The water drops off the upper surface of the leaves 213, drops into the filter bed 208, passes through the filter bed drops into the plenum 214 and flows down the sloping bottom 303 of the plenum. It then passes down the drain 304 and into the sewer 305 below. To remove the dust from the bottom of the leaves 224 micro irrigation emitters 233 spray water up 234 at the underside of the leaves and wash away the dust thereon. This water too drops down through the filter bed falls into the plenum and goes down the drain, thus keeping the leaves free from dust, so that the plants can function more effectively as air purifiers, where they take in some of the air within the room through tiny holes in the leaves and transport it down to the root system. Above the micro irrigation sprinklers or emitters, the leaves of the plants are supported by a trellis 307 so that the leaves stay off the filter bed.

When the overhead sprinkler system and/or the micro irrigation emitters are functioning and for a short time thereafter when water is draining away, the overhead dampers 205 are closed and the induction fan 215 is turned off so that the moisture is not sucked into the overhead duct where it can create mold and mildew within the ducting system as a whole.

Figure 4:
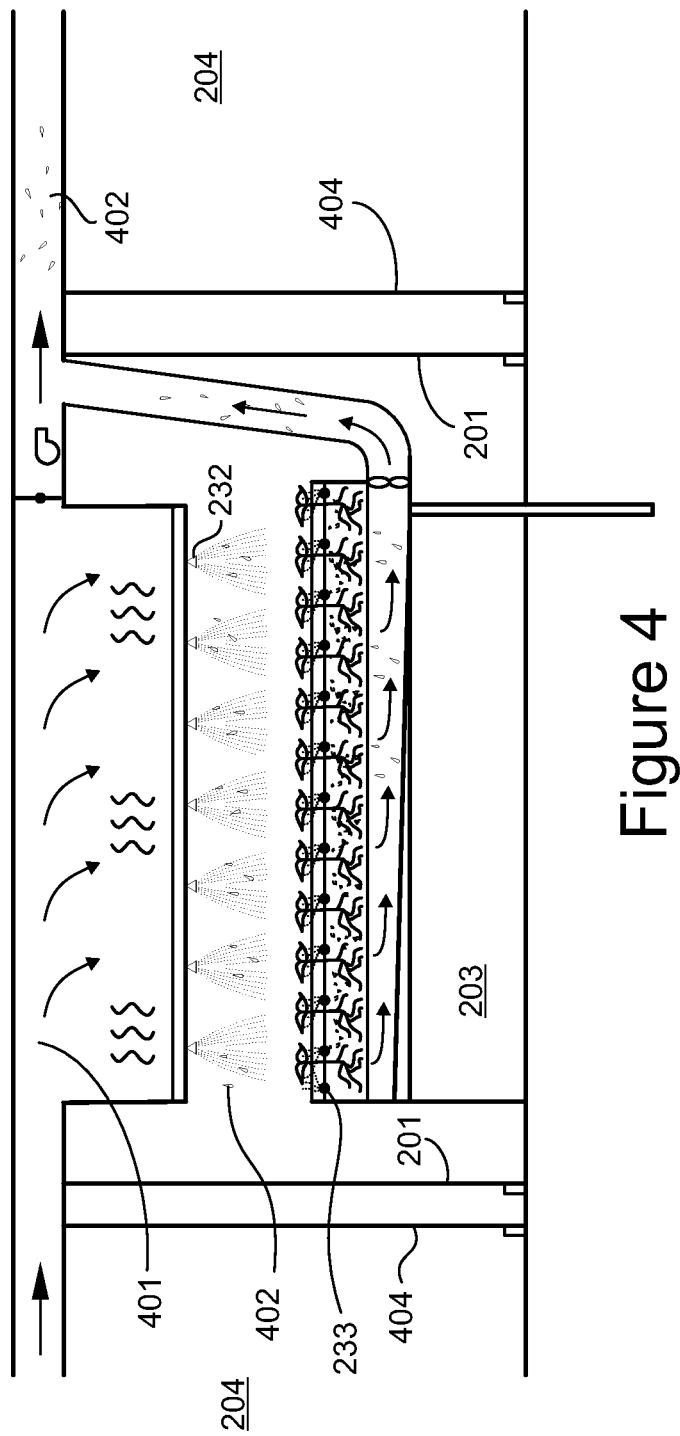
FIG. 4 illustrates a PAPE with cut out of air duct for air entry into PAPE.

FIG. 4 shows another embodiment of the invention where a portion of the overhead duct is simply removed 401 rather than having overhead dampers installed. This is not the most desired method of installation for were such an arrangement to occur moisture droplets 402 would be sucked into the connecting duct to the plant air purifier and be drawn into the overhead duct while the overhead sprinklers 232 and/or micro irrigation system emitters 233 were operating and there would be no way to prevent this except to shut down the entire ventilation system of the building while moisturizing was occurring. Clearly this is not as versatile an embodiment of the invention as was shown previously, because with the previous embodiment, if more moisture was required for the building as a whole, as for instance in the middle of winter, the building management automated system, the BAS, could simply be set to leave the ceiling vents open and duct vent closed while the overhead sprinklers and/or the micro irrigation emitters were operating.

FIG. 4 also portrays a PAPE where added insulation is needed for the enclosing walls because the unconditioned space 204 which surrounds it is hotter or colder than what would be desired within the plant air purifier enclosure 203. As a result an insulated straw panel 404 is put up on either side of the PAPE after the plastic sheeting 201.

Figure 5:
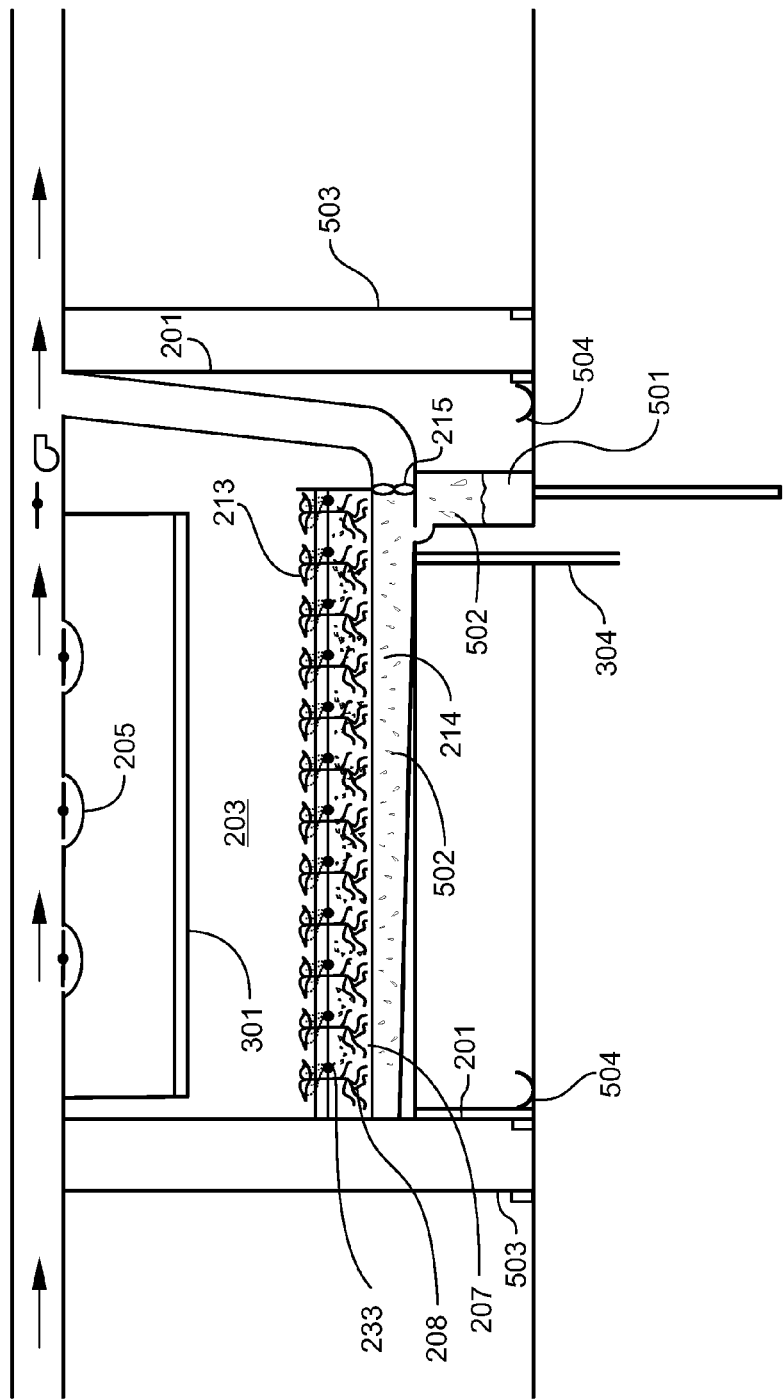
FIG. 5 illustrates a PAPE with water reservoir and additional drain.

FIG. 5 is similar to FIG. 3, except that when water drops down into the plenum and exits therefrom, it enters a recirculation reservoir 501 located alongside the drain 304, rather than the drain itself This occurs when the micro irrigation system emitters 233 are functioning, and not the overhead sprinklers 301. Both are functioning only when dust removal from the leaves of the plants in the filter bed is occurring. At other times when moisturizing of the filter bed is what is to be achieved excess water 502 emitted from the micro irrigation system drains through the filter bed 208, drops into the bottom of the plenum 214 and enters the reservoir 501 for recirculation, thus saving on water.

Because the plants 213 within the plant air purifier 207 are preferably plants that evolved in the tropical rain forest, they require a good deal of humidity. The plastic walls 201 on either side of the PAPE 203 act as a vapor barrier, keeping moisture within where the plants are located and preventing much of the moisture from dissipating into the unconditioned space outside the vapor barrier.

At the bottom of the vapor barrier or plastic wall is a gutter 504 which allows water to drain down off the plastic sheeting where it flows into a reservoir, not shown, and thus limits moisture accumulation on the floor. Were moisture to accumulate on the floor, it could lead to a wet and dangerous situation in which people working in the enclosure could slip.

This figure portrays an enclosure where the temperature range outside the enclosure is higher or lower than desired in the PAPE and so sandwiched foam panels with a thin metal skin 503 are here employed. Since the micro irrigation system emitters 233 are in operation or water is draining down from the filter bed both the induction fan 215 is off and the overhead dampers are closed. In this embodiment the plastic sheeting may be unnecessary since the metal sheeting on the sandwiched foam paneling would have had moisture run down it just as it would have off the plastic sheeting and so the gutter could have been placed at its bottom and the plastic sheeting removed entirely.

Figure 6:
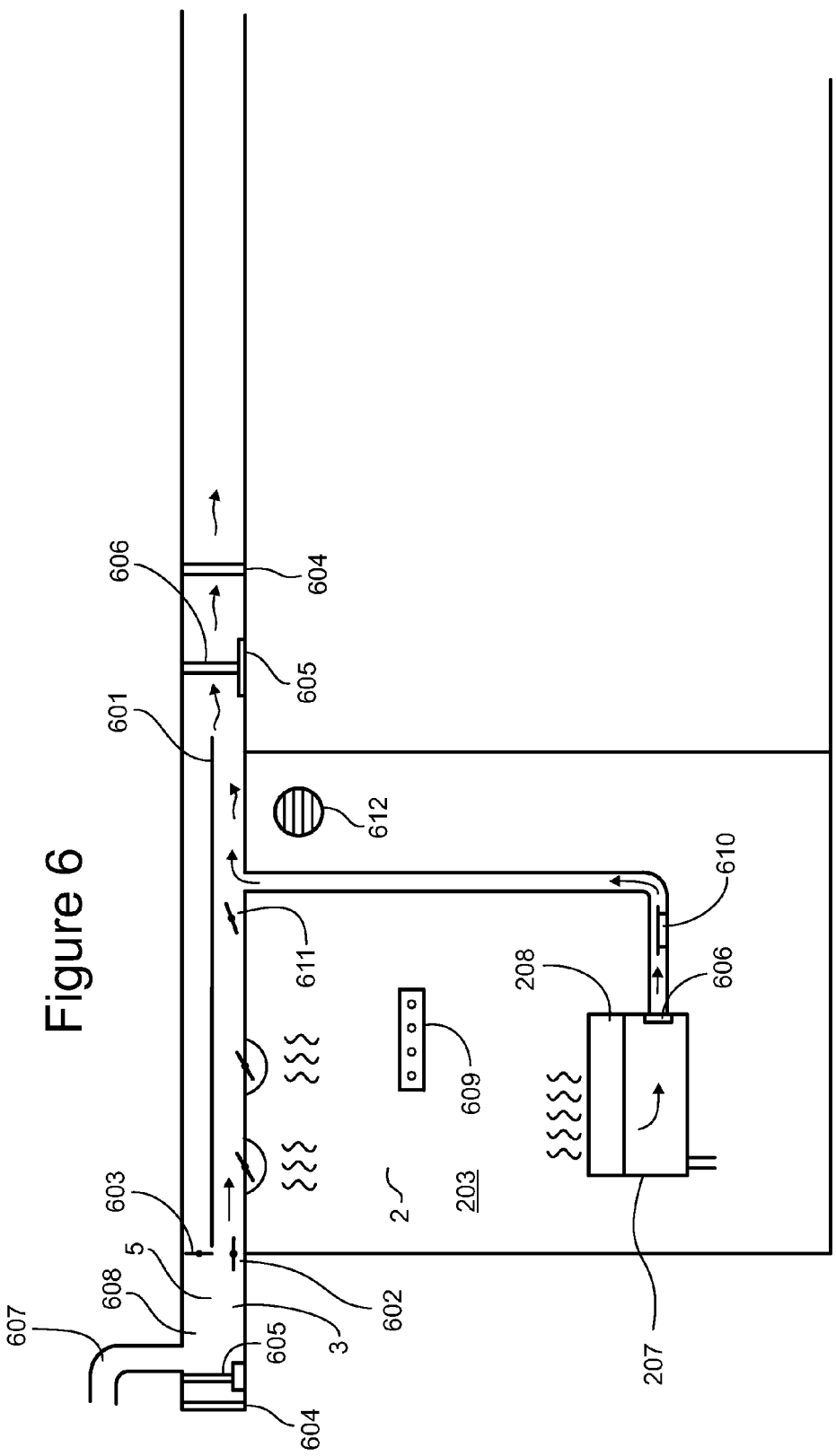
FIG. 6 illustrates a PAPE with heating and cooling coil placement along with outside air intake.

FIG. 6 Shows another embodiment of the invention where the overhead duct 3 within the plant air purifier enclosure 203 has a divided channel 601. By closing off the upper channel damper 603 all conditioned air 5 can enter the PAPE to be purified and moisturized, or by closing the lower channel damper, 602, no conditioned air enters the PAPE, and the conditioned air simply bypasses the PAPE. By partially opening the lower channel damper 602, in conjunction with damper 611, varying percentages of overall air passing through the overhead duct can be made to enter the PAPE. By being able to control the amount of air passing into the PAPE, humidity levels within the conditioned air can be increased or decreased. This is because air passing through the plant air purifier 207 will wind up with more moisture than it had prior to entering the plant air purifier's filter bed 208. In laboratory tests conducted at Syracuse University, it was found that the air leaving the plant air purifier had an increase of 15.4% in relative humidity to air not entering the filter bed. Yet since only ¹⁄₁₄th of total air entered the plant air purifier, overall humidity of the entire air supply only increased by 1.83%. By adjusting the dampers in the overhead ducting, air flow can be finely tuned so as to provide perfect humidity conditions for the conditioned space within the building. This is an advantage since in the winter it is desirable that humidity levels be increased, while in summer just the opposite may be the case.

In the higher left hand part of FIG. 6, heating coils 604 and cooling coils 605 are placed. If these particular parts of the HVAC system are so situated, and if air passes through the plant air purification enclosure after having been heated or cooled, moisture levels within the purified air will not be lessened as they would if such coils were placed in the upper right hand part of the figure. If heating and cooling coils are downstream of the plant air purifier the moisturizing effect of the air coming from the enclosure will be mitigated unless such coils are off, and even then some moisture will be lost as the cooling coil also acts a de-fogging mechanism 606. By having heating and cooling coils situated before and after the PAPE it can be determined which pieces of apparatus should be activated so as to further fine tune humidity levels within the building. Within the figure there is also shown a fog filter 606 situated at the entryway to the duct leading from the plant air purifier. This fog filter is removable and can help to decrease moisture levels of the air leaving the plant air purifier. Air conditioning coils are fog filters in their own right but take far more moisture out of the air if the air conditioner is in operation. Much of the moisture passing through the heating coil will or may evaporate, depending on the temperature set. Again turning to the top left of the figure there is an entry way for outside air 607. If an outside air intake is so situated, it will cool air which has just passed through the heating coil. Heating coils can get to 140 degrees Fahrenheit and if air were at that temperature when it entered the PAPE it could kill the plants therein so the air has to be at a suitable temperature for the safety of plants in the enclosure. Thus the PAPE has to be placed upstream from the heating coils or furnace in a building or far downstream or the heating coil or it has to be downstream of where hot air is mixed 608 with cooler air prior to entry into the PAPE.

Since the plants in the plant air purifier and in the PAPE will require lighting, lighting 609 can be placed upon the wall 2, on the back wall or elsewhere if so desired. It can also be placed overhead. A UVC light 610 is illustrated to be stationed in the duct leading from the plant air purifier. As air leaves the purifier and as it passes over the UVC light, pathogen DNA will be affected and they can be killed off. The UVC light acts as a supplementary means of air purification. An outside emergency air vent 612 can be opened in case temperatures within the PAPE were to rise to unhealthy levels for the plants therein. It could also be opened if no air was entering from the overhead duct and the PAPE were in the basement of a structure where ground temperature can stay at 47-53 degrees in some climates while outside air in summertime might be well into the 70's or 80's. Different pieces of equipment or insulation can be used to protect the plants and keep them in the proper temperature range.

Figure 7:
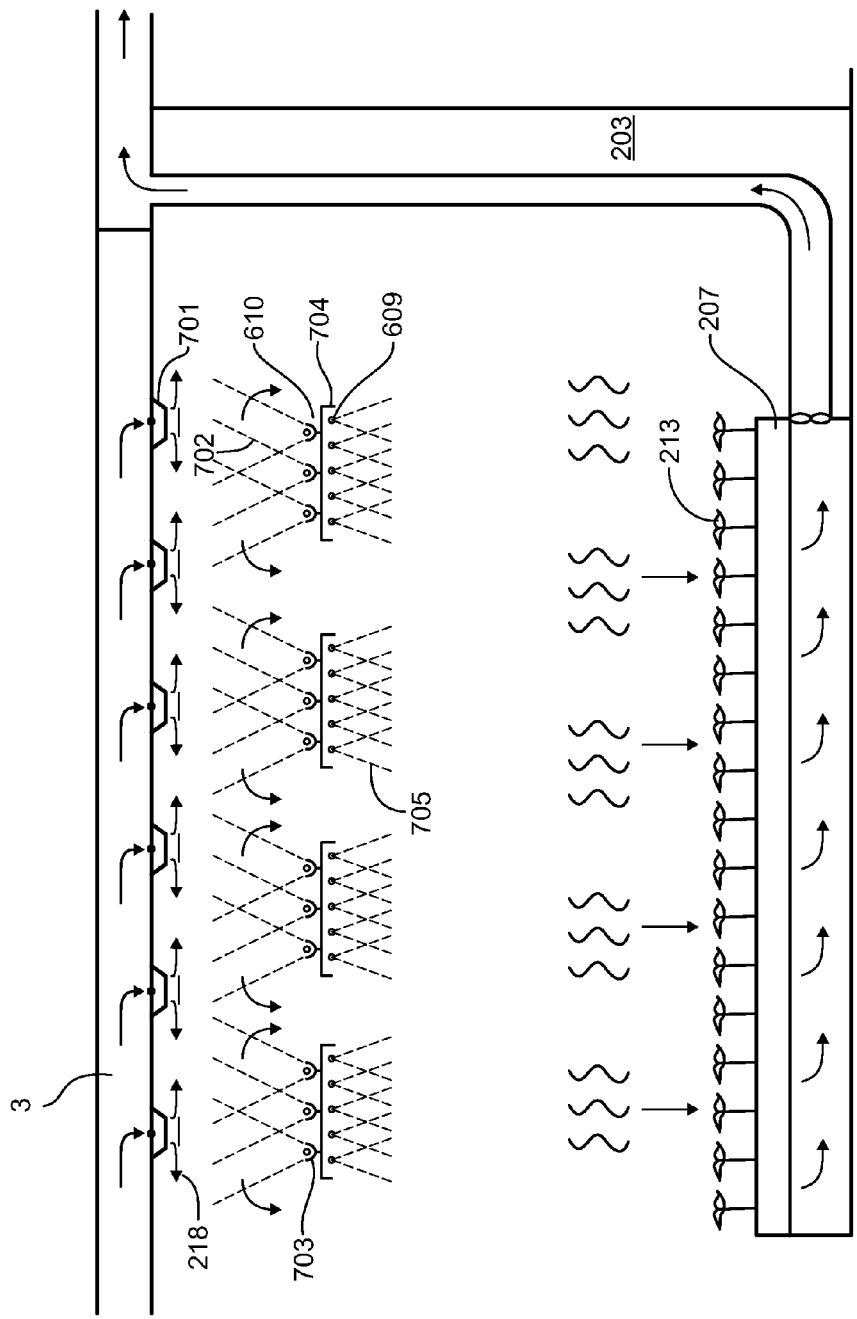
FIG. 7 illustrates a PAPE with dual UVC light and regular downlight fixtures and exposure of incoming air to such lighting.

FIG. 7 Shows air 218 coming from an overhead duct 3 entering the plant air purification enclosure 203 through a series of diffusers 701 with the arrows showing the path of the air itself. First the air enters in a direction parallel with the ceiling where it is bathed in UVC light. rays 702 The UVC lights 610 are suspended from the ceiling and hang down into the space at a height above 7 feet. These UVC lights have reflectors 703 on them so that the UVC light only travels upwards, thus protecting the eyes of those who enter the space from any harmful rays. As soon as the air enters the enclosure, which is much greater in size than the duct, air pressure drops markedly and the speed of the air is slowed to little more than a few feet per second. This allows the air entering the enclosure to get much greater exposure of pathogen killing UVC light than would otherwise be the case if this type of lighting were placed elsewhere and if the air was traveling at a higher speed. The air is then pulled down into the plant air purifier 207 having passed by the dual purpose light fixtures 704 themselves, whereupon it exits the PAPE.

The fixtures have two sets of lights, UVC lights 610 which direct their light rays upwards, and normal fluorescents, or other lights 609 whose light rays 705 the plants need to grow. This last type of light is directed downward, and bathes the plants in the plant air purifier in nourishing, health giving light. Such fixtures thus serve a double purpose.

FIG. 8 is a top down view of FIG. 1 where there is unconditioned space 204 which is turned into a plant air purification enclosure where the plant air purifier will reside. The space itself is in a location where temperatures are satisfactory to both plants and humans, fitting within the human comfort range which is a tighter temperature range than what is acceptable for the plants which will reside within the enclosure.

FIG. 9 shows a top down view of that same space shown in FIG. 2. It is the same space shown in FIG. 8 now enclosed with the plant air purifier 207 within it and with three newly constructed walls 901, a wall to the west, to the south and to the east. The walls themselves are nothing more than industrial curtain 206 or plastic sheeting 201. These materials are attached to 2×4s 202 secured to the floor 4. This space is not thermally insulated as might well be necessary elsewhere, A double strip door 902 made of flexible transparent vinyl plastic acts as an air curtain where the vinyl strips overlap 903. This provides easy access to the space. This type of door is often utilized for small refrigerators and freezers. Within the PAPE 203 is a plant air purifier 207 and an overhead duct 3. Gutters 504 are placed at the bottom of the walls so any moisture dripping down from those walls will not cause dangerous conditions within the enclosure.

Figure 10:
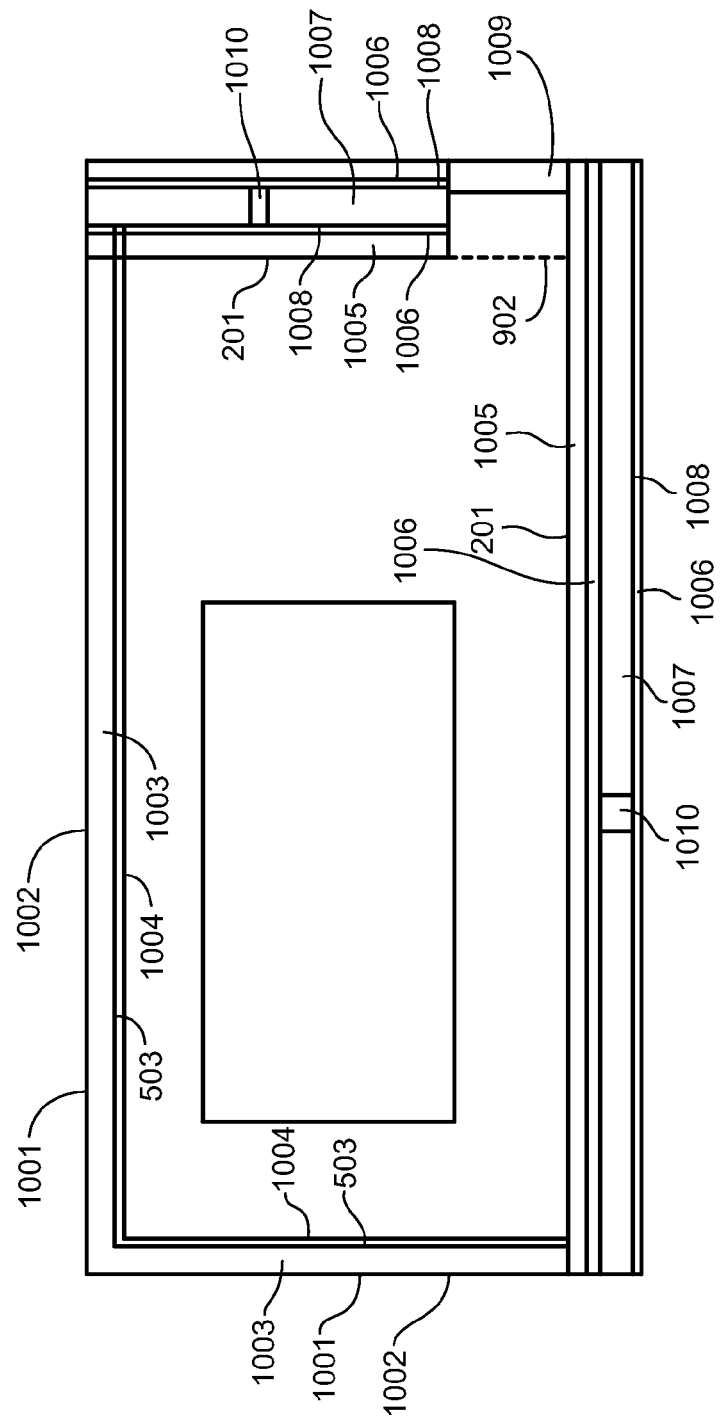
FIG. 10 illustrates a top down view of another embodiment of unconditioned space with PAPE showing straw bale insulated wall and additional door.

FIG. 10 shows another way of enclosing a space which had two preexisting walls 1001 situated on the outer perimeter of a building 1002. In this case thermal insulation is necessary. Sandwiched foam insulation with a thin aluminum skin is used 503, sandwiched polyurethane panel is one form of this type of insulation but the category includes more than sandwiched polyurethane panel and can have an aluminum skin on both sides or just one. For the sake of this figure the material is broken into its components, foam panel 1003 and usually a gray metal skin 1004. This paneling is attached to these preexisting walls. The aluminum skin fulfills the same function as the heavy plastic sheet walls and allows water to drip down to be retrieved and keeps the moisture contained within the PAPE. In this embodiment of the invention there is a plastic wall 201 on the southerly and easterly side, an air space 1005 followed by a plastered or cement 1006 encased straw bale wall 1007. On the outer surface of the straw bale wall there is plaster or cement, then a wire or plastic mesh 1008 stationed against the straw bales themselves. Such a concrete or plastered straw bale wall is extremely easy to construct. It provides an insulation of R35-50, is resistant to pests, and has an A fire rating which would take up to 2 hours to burn through. In this case an insulated door 1009 is available for easy access to the space with a plastic curtain wall 902 also there. A timber or stud 1010 is placed between wall and ceiling so as to provide support for the straw bale wall on longer runs, thus preventing the wall from falling over.

Figure 11B:
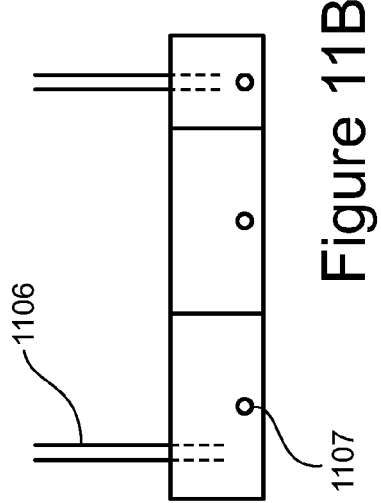
FIG. 11B illustrates a side view of configured concrete blocks ready for straw bale placement with rebar stakes on which bale sits and weep holes in block.
Figure 11A:
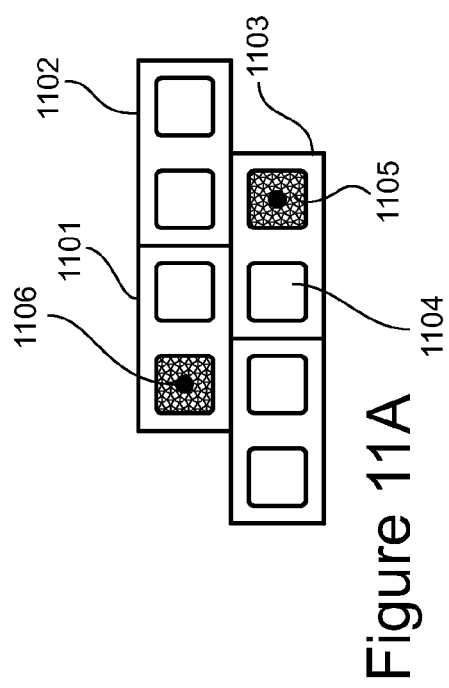
FIG. 11A illustrates a top down view of configured concrete hollow blocks ready for straw bale placement for a wall.

FIG. 11A shows a top down view of cement blocks 1101. All the blocks presented form the support for a straw built wall. There are two rows of these cement blocks with the 2$^{nd}$ row 1102 slightly off center of the first. 1103 Two of the hollow squares 1104 are filled with concrete 1105 and rebar 1106 inserted therein.

FIG. 11B shows a side view of the same blocks with rebar 1106. The blocks are attached to the floor with mortar or by some other means. Weep holes 1107 are drilled into the blocks so that water may drain away. These blocks serve as the first course in the wall in case the floor on which the wall is constructed becomes flooded, whereupon they provide some protection for the bales.

Figure 11C:
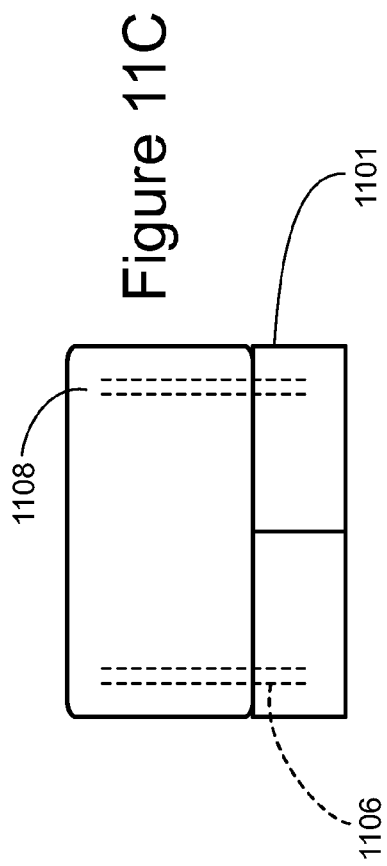
FIG. 11C illustrates a side view of block with bale placed on block and stakes going through interior of straw bale.

FIG. 11C shows a view of the wall under construction with the cement blocks 1101 as the first course and a straw bale 1108 making up the second course. The two stakes or rebar 1106 which are attached to the cement blocks go through the bales and protrude out.

Figure 12:
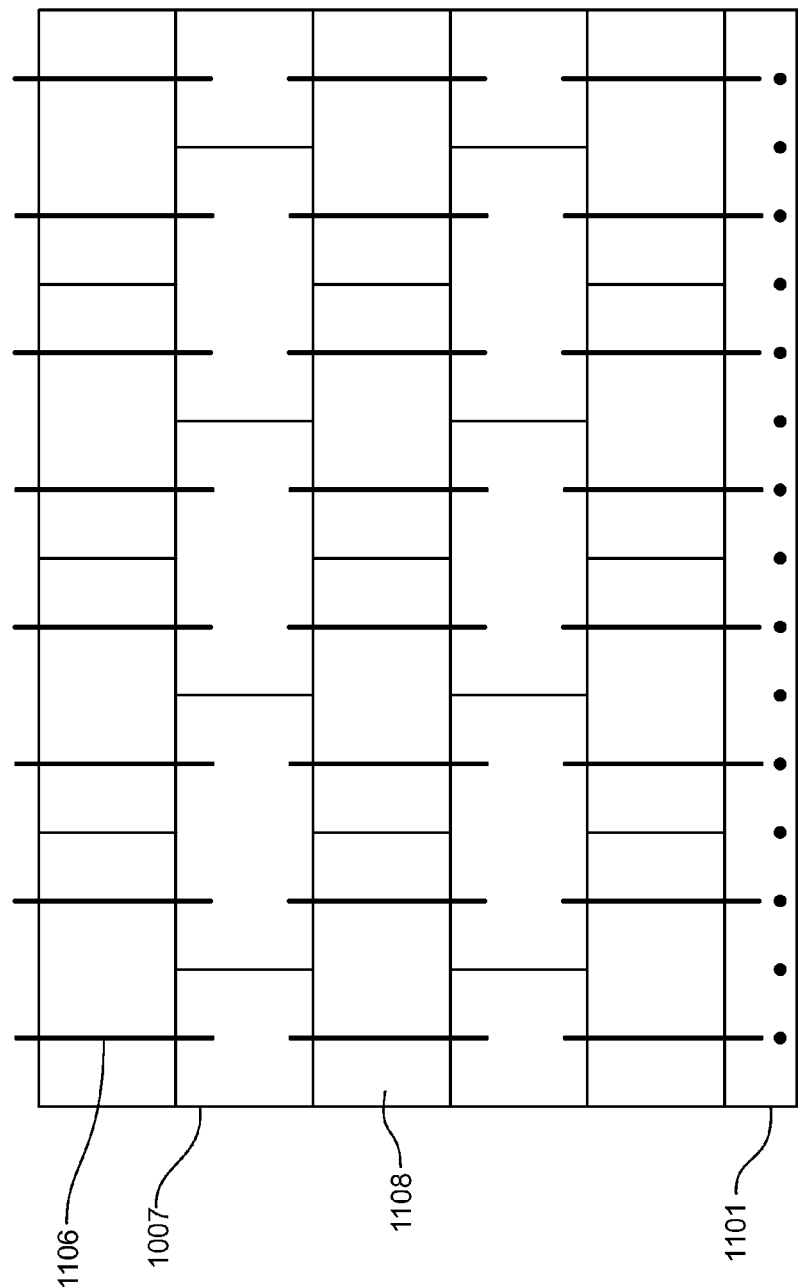
FIG. 12 illustrates a side view of straw bale wall on concrete blocks with stakes connecting straw bale levels.

FIG. 12 shows the wall 1007 itself, with each course of straw bales 1108 off center to the course below and above it in a brick wall like construction. Rebar 1106 connects the different courses together one to the next. The first course is made up of cement blocks 1101 to protect the bales from moisture were the floor to become flooded. This form of construction is very simple to do and can be accomplished with unskilled labor.

Figure 13:
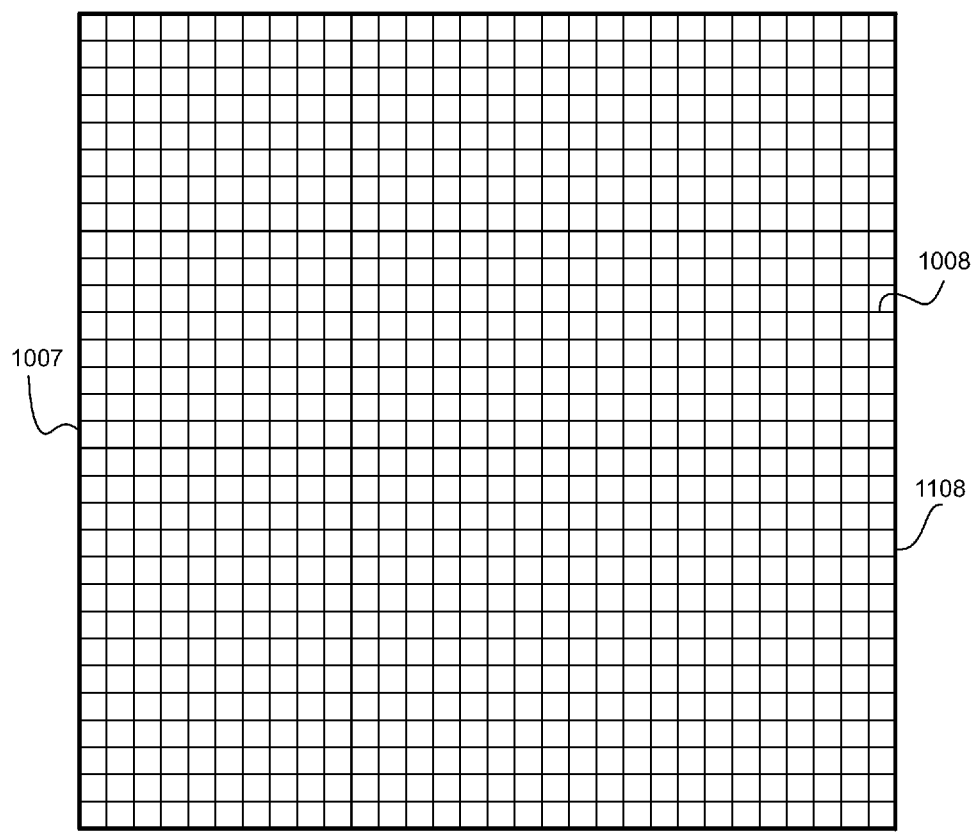
FIG. 13 illustrates a side view of straw bale unfinished wall with grid over straw bales.

FIG. 13 shows the wall 1007 with wire mesh or plastic mesh 1008 placed up tight against the bales 1108.

FIG. 14 provides a top down view of the wire mesh 1008 up against the bale 1108. A number of wire connectors 1401 protrude through the bale from one side to the other and are connected by means of hooks 1402 to the mesh on either side.

FIG. 15 shows the wall 1007 with the first coat of plaster 1006 or cement having been applied. A trowel can be used to work the cement or plaster into the mesh 1008 and so cement it to the bale itself. Usually a first coating of one to two inches is applied. This is allowed to dry and than a second and even a third coat is applied.

Figure 16:
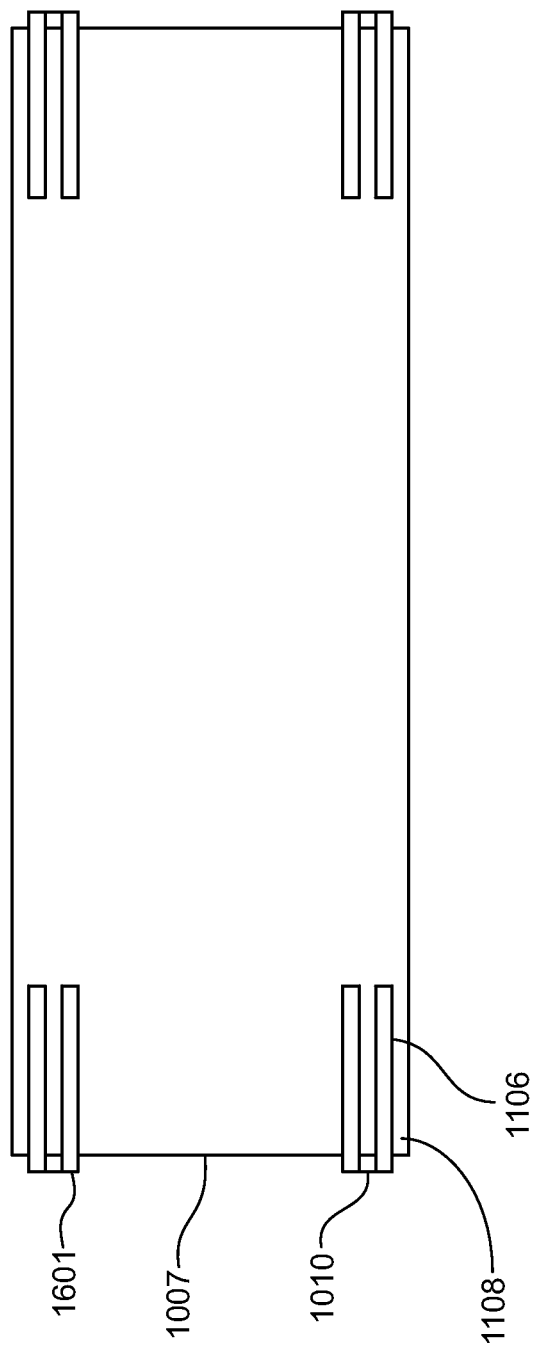
FIG. 16 illustrates a top down view of a straw bale wall with rebar bracing and post support.

FIG. 16 shows a top down view of how the wall 1007 is attached to a series of studs or timbers 1010 with supports on either side so that the wall itself will not fall over. Such bracing should be included when a wall extends beyond 20 feet. Rebar 1106 is driven into the bales 1108 on either side of the stud and than a connector 1601 connects the two with the stud sandwiched in between. By securing the poles or wooden timbers securely between ceiling and floor the wall is now far more stable.

Figure 17:
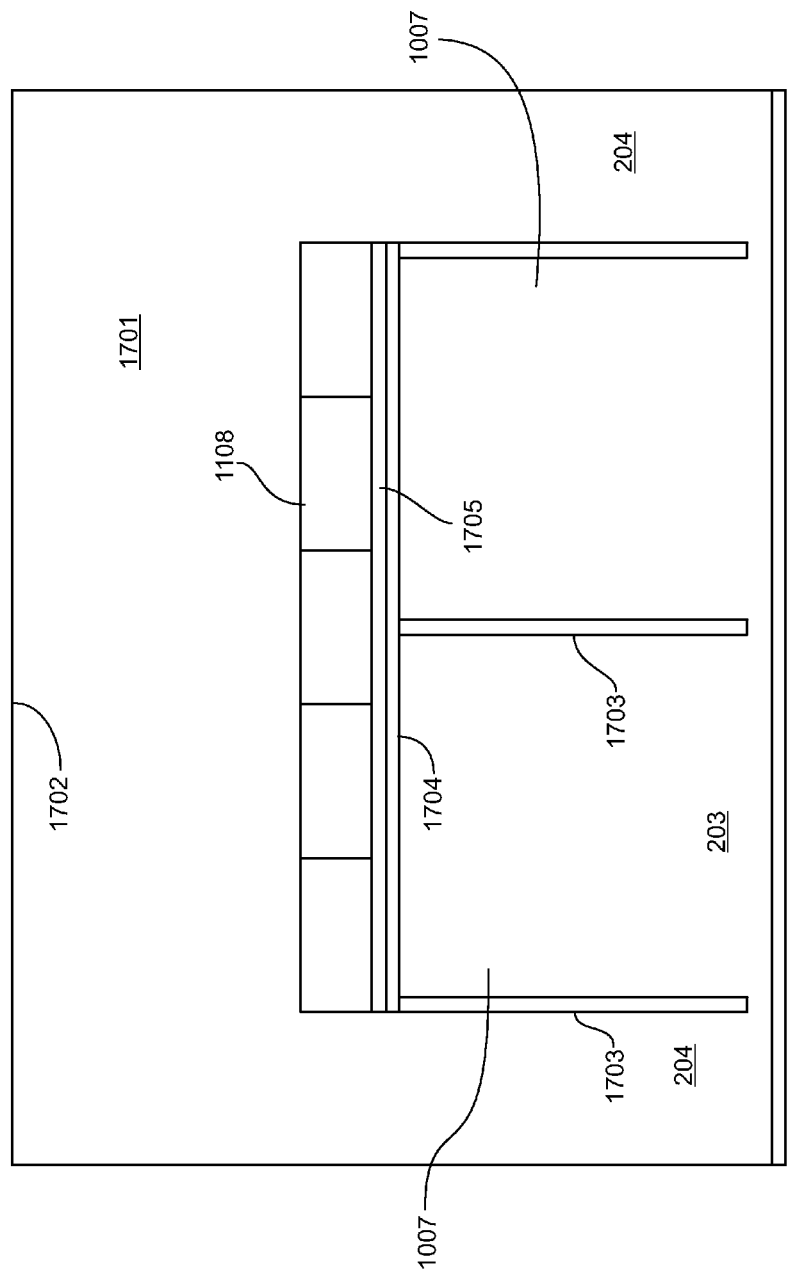
FIG. 17 illustrates a side view of a PAPE located in a warehouse setting with post and beam construction and straw bale insulation placed on roof of PAPE.

FIG. 17 shows a front view of a PAPE 203 with a straw wall 1007 situated in a main structure 1701 with a high ceiling 1702. The straw wall is constructed here with post 1703 and beam 1704 framing, though normal framing can be used as well. The posts help to stabilize the walls themselves. Joists (not here shown) are placed over that between the beams and flooring 1705. On top of the flooring is placed bales of straw. 1108 The straw bales on the flooring can be plastered over or not depending on whether the PAPE is outside or not. The enclosure now has R35-50 insulation. Because of the materials used the enclosure can breathe. This type of structure can be placed within taller structures like warehouses even at grade level and though the larger enclosure is and unconditioned space 204 and might drop in temperature to 20 degrees F., the plant air purification enclosure can easily remain in a 65-85 degree F. temperature range due to air coming into the enclosure from either the structure's HVAC system or from the enclosure being against an adjoining conditioned space and there being an opening between the two. In addition, the PAPE can be attached to a structure in a shed like configuration. If it is outside the straw balled on top will of course require a roof.

Figure 18:
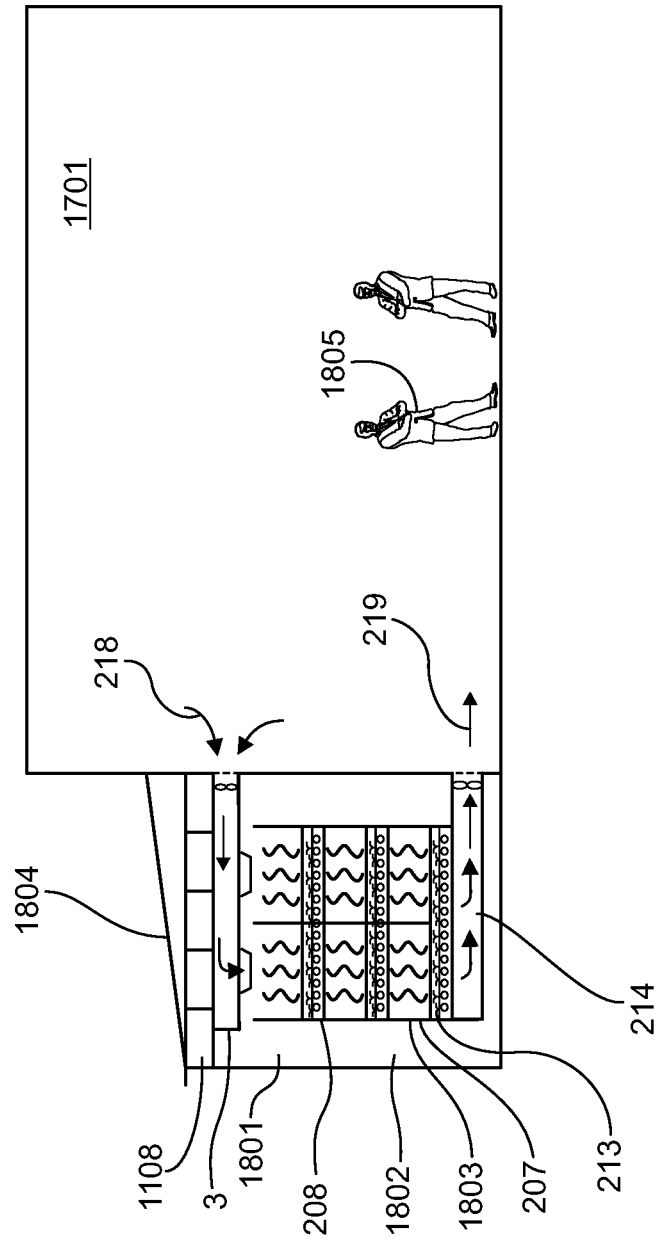
FIG. 18 illustrates a side view of main structure whose air is being purified by PAPE shed with stacked plant air purifier within shed.

FIG. 18 shows a shed 1801 like configuration of a straw baled attached structure 1802. In this case the attached structure simply takes impure air 218 in from the main structure 1701 such as a box store. It then pulls the air through the plant air purifier 207, here a multi leveled plant air purifier 1803, and returns the purified air 219 into the main structure without utilizing any of the ducting from the main structure itself. Straw bales 1108 sit just below the sloping roof 1804 and provide excellent insulation to the conditioned space within. In the multi leveled plant air purifier, filter beds 208 are stacked one on top of another with plants 213 in each tray or filter bed. Conditioned but impure air passes through an overhead duct 3, passing first through one filter bed to another until finally it reaches a plenum 214 below whereupon it is ducted back into the building. Such a stacked arrangement allows for the PAPE to be smaller in size.

Figure 19:
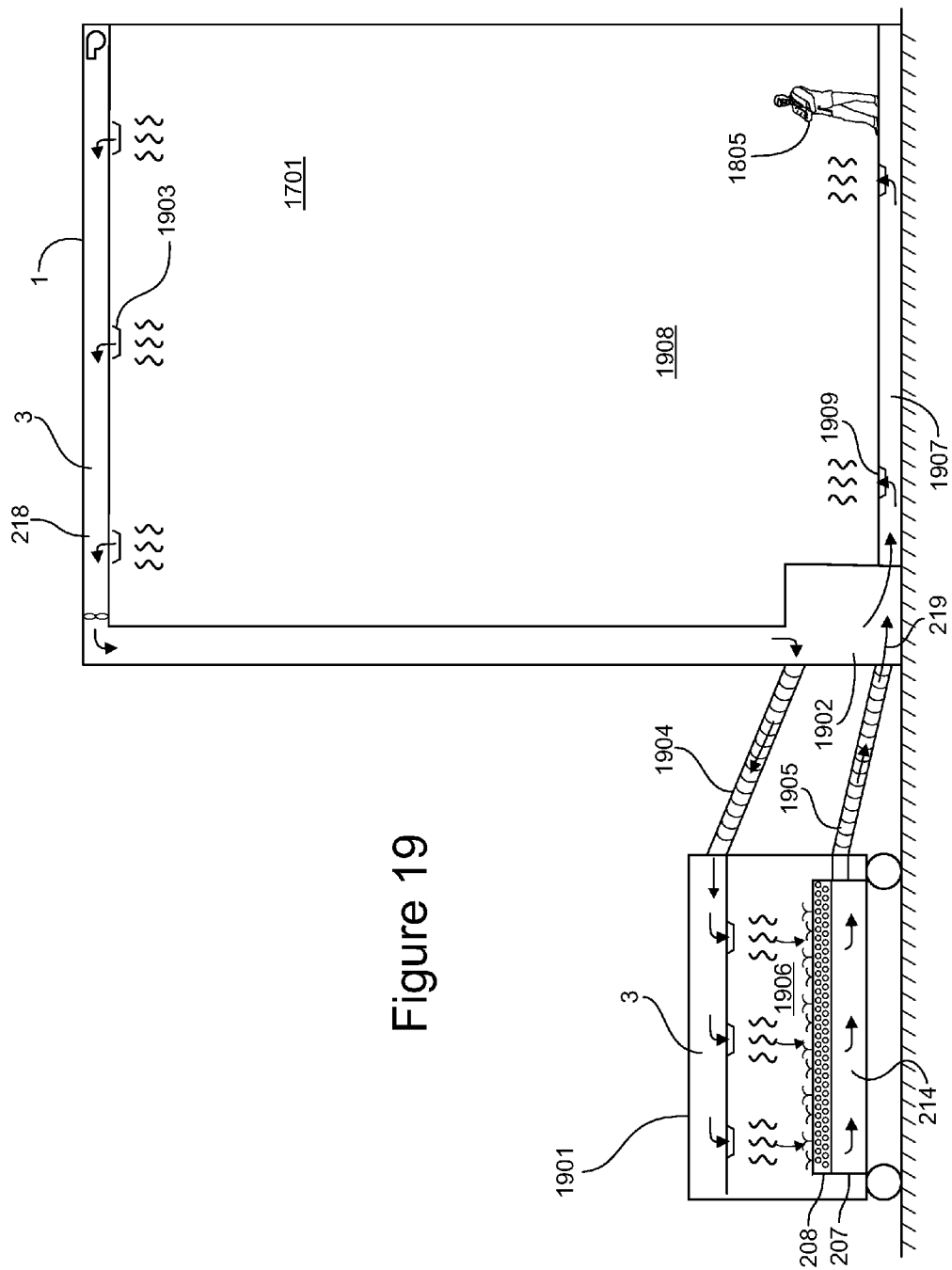
FIG. 19 illustrates a side view of a main structure whose air is being purified attached by ducts to a mobile PAPE which purifies the main structure's air.

FIG. 19 provides a side view of a mobile plant air purification enclosure 1901 with the plant air purifier 207 inside. In this case the mobile PAPE is placed close to a main structure 1701 resembling a box store where it is hooked into an air handler 1902 within that structure. The exhaust or impure air 218 from the main structure is sucked out through exhaust vents 1903 in the ceiling of the building where it enters a duct 3 which leads down to the air handler. From the air handler it is ducted out of the structure and enters an insulated feed duct 1904 that is connected to the mobile unit 1901 or to an auxiliary structure 1906 which is parked or placed close by. The contaminated air goes through an overhead duct 3 in the mobile unit and is pulled down through the plant air purifier's filter beds 208, down into a plenum 214 where it is ducted out of the auxiliary structure or mobile PAPE. It then enters an insulated return duct 1905 which connects to the air handler in the main structure. Having returned to the main structure the now purified air 219 leaves the air handler and passes through a floor duct 1907 which brings the clean purified air into habitable space 1908. It now enters the conditioned space through floor vents 1909. The air than rises to the ceiling 1, gaining impurities on the way and is removed once more through the exhaust vents located in the ceiling above.

Having a mobile unit which can just pull up to a structure and hook into its ventilation system is a definite advantage for now the mobile unit can be assembled at a central location and driven anywhere. It can then be stationed in close proximity to a structure for which the indoor air is to be purified or it can even be driven into the structure and parked in unconditioned space therein. Or it can be placed on a roof and its wheels removed.

However such a unit does require certain additional provisions. It must be fully insulated so that thermal energy is not lost or gained. Otherwise there would be extra expense and the lack of insulation would cause added stress upon the air handler within the main structure whose air is being purified. It must provide the ability for the plants and multi level trays housed within bakers cart (to be discussed in greater detail later on) to be easily removed from the container itself. It must have the ability to provide emergency heat if it is disconnected from the conditioned air of the main structure and even to have a furnace of its own and a generator. Plus it must have a water supply of its own and lighting since the plants within the plant air purifier in the mobile unit need both to exist. And the unit should have the ability to have its wheels removed if one wants to place it firmly on the ground or somewhere else.

Figure 20:
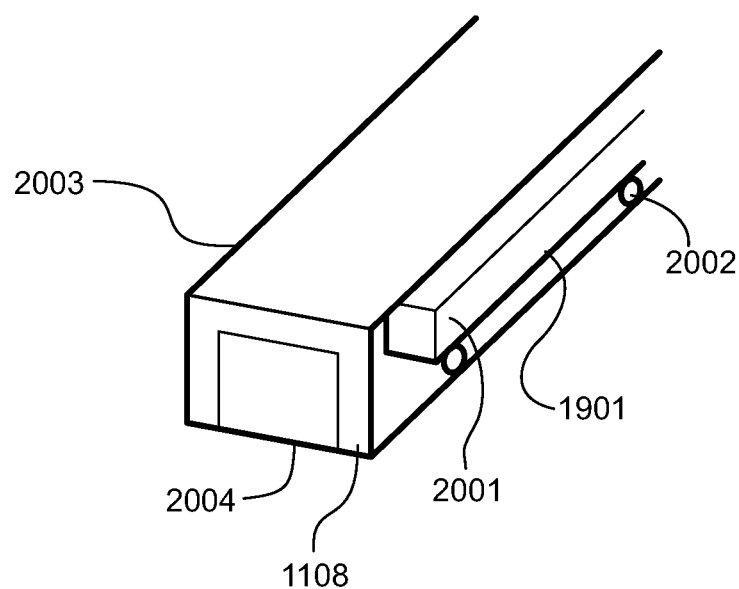
FIG. 20 illustrates a top down angled view of mobile PAPE within an insulated structure or garage.

FIG. 20 shows one way to deal with insulation of a mobile PAPE 1901 or modular PAPE 2001 with wheels 2002 which contains the plant air purifier, that is to create a PAPE garage 2003 to house the trailer. This unit could again be built with the same straw bales 1108 and with an insulated garage door 2004. This garage could either be attached to the main structure or completely independent. Since such a structure can be built very readily and inexpensively with such a high degree of insulation, it is well worth considering.

Figure 21:
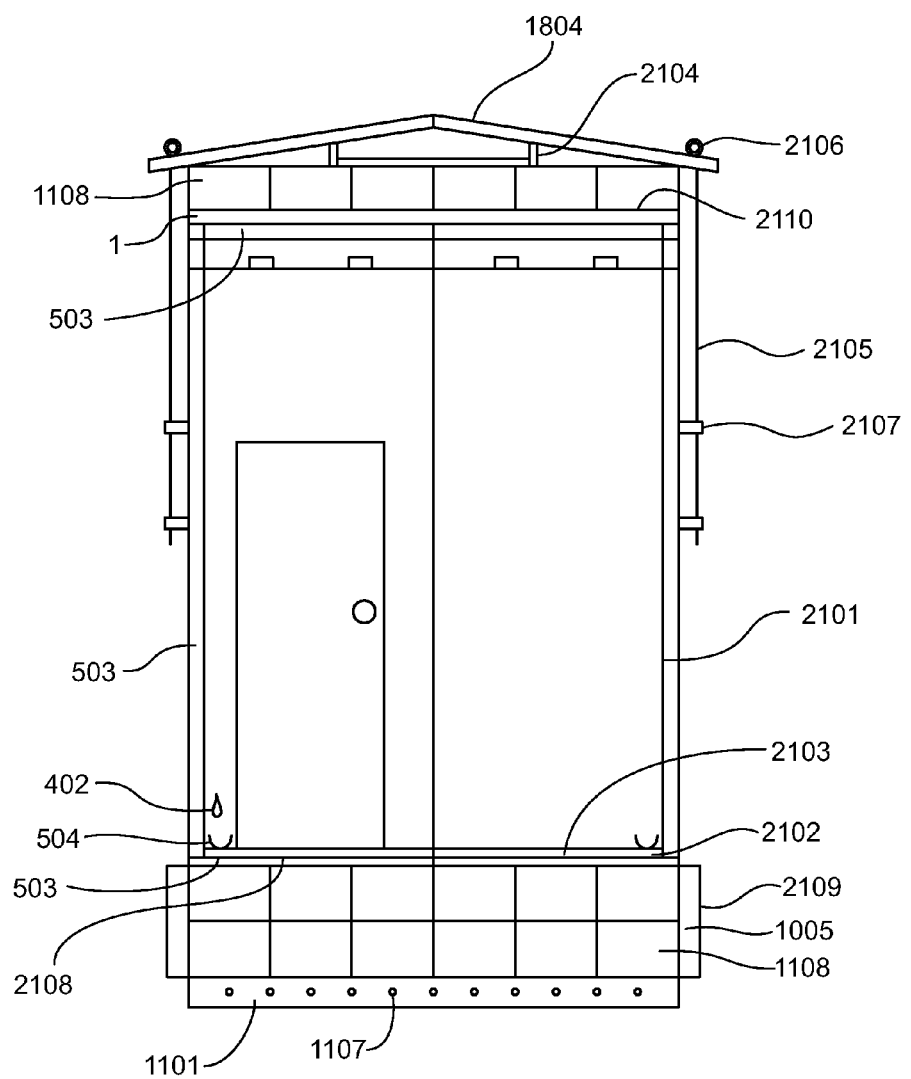
FIG. 21 illustrates a view from behind a MOBILE PAPE trailer with attachable detachable insulated roof and with straw bale insulation below undercarriage.

As is shown in FIG. 21, another way to provide insulation for the mobile PAPE is to heavily insulate the ceiling, floor, and walls with insulated foam or foam panels 503 much like a refrigerated truck.

The walls and ceiling could have this foam covered with a thin aluminum or metal sheet which would allows coalescing moisture 402 to drip down the inner sides 2101 of the unit to the floor where it would travel via gutters 504 into a reservoir not here shown. Above the insulated foam on the floor would be poly carbon sheeting 2102 which both provides insulation on its own and heavy strength to take load bearing equipment within the unit itself. Other load bearing material 2103 could be used in place of poly carbon sheets if so desired. Since most heat is lost through the ceiling 1 it would be easy to further insulate the ceiling by placing straw bales 1108 on the roof 2110 of the mobile PAPE, then placing a triangular support 2104 on the bales and a sloping metal or plastic roof 1804 above that. The roof and bales are put in place after the mobile PAPE had reached its appropriate location. The roof would have holes in it through which roof attaching poles 2105 with rubber grommets 2106 would protrude. The poles would then fit into fittings 2107 located on the sides of the container so anchoring the roof to the container.

In addition straw bales 1108 can be placed under the undercarriage 2108 on a course of cement blocks 1101 so the straw would not get wet and skirting 2109 placed around the trailer itself would protect the bales from rain and snow. There would also be some air space 1005 between the straw bales and the skirting. The skirting could have its end placed under cement blocks so water would not whip in with the wind and so protect the bale. Weep holes 1107 should be provided in the cement block so water from the roadway on which the unit was parked could dissipate. The dry bales and skirting will help to insulate the bottom of the trailer.

Figure 22:
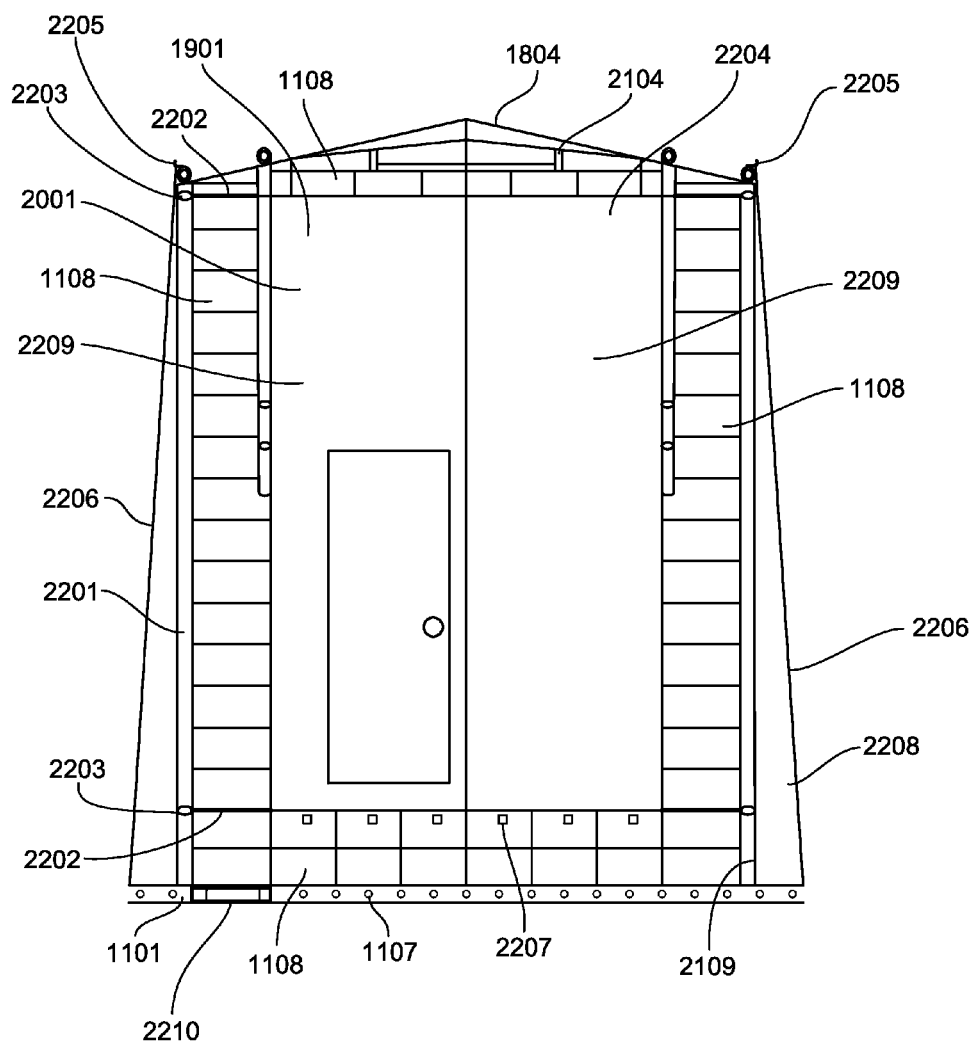
FIG. 22 illustrates a view from behind of MOBILE PAPE from FIG. 21 with additional straw bale insulation along sides of trailer and tarp covering thereover along sides.

FIG. 22 differs somewhat from FIG. 21 in that the roof 1804 extends further out on either side and bales of straw 1108 are able to be stacked up along the sides of the mobile PAPE 1901 or modular PAPE 2001. These bales extend down to a row of pavers 1101 with weep holes 1107 in them set on the ground on which the first row of straw bales are laid. Straw bale supporting poles 2201 extend down on the outer sides of the bales going from the underside of the roof where swivel bars 2202 with a ring hole 2203 swivel out and lock into place from the outer edge of the containerized PAPE 2204 parallel with the ground from both top and undercarriage. Meanwhile there are canvas or tarp hooks 2205 attached to the upper part of the roof close to the edge. From these, side canvas or tarp sheets 2206 are laid which extends down to the ground at a steep angle. Rain, snow or ice will fall off the roof and run or slide down the tarp away from the containerized PAPE. Wind will have nowhere to go. Nor will it be able to get under the roof. The tarp or canvas will keep the bales dry. Bales 1108 are placed on the top of the unit under the roof. A triangular shaped frame 2104 is placed above the bales under the roof for support. Bales of straw are placed under the under carriage of the unit as in FIG. 21 and these are protected by a rain skirt 2109 which can attach to the swivel bracket ring holes 2203 and to attaching protrusions 2207 on the back on the back of the container. Front and back triangular shaped end tarp panels 2208 are attached to the tarp which extends out from the roof to the ground on the sides of the containerized PAPE and to the containerized PAPE itself. These snap onto the side tarps and the container to provide a weatherized seal. For all intents and purposes the unit is encased in straw bales like a bunker which insulate it, on the front, sides, top and underneath. The swinging door 2209 to the mobile PAPE is also insulated inside. Were the unit to be moved the roof tarp, bales and bracing could be easily removed. But while it is stationary and functioning it has great insulation even in the warmest of summers or the coldest of winters. In place of using pavers or concrete blocks on which to keep the straw bales dry, one might choose to use pallets 2210. Using pallets will make it easier to attach the skirt and tarps along the sides, back and front so that the wind does not whip them about.

Figure 23A:
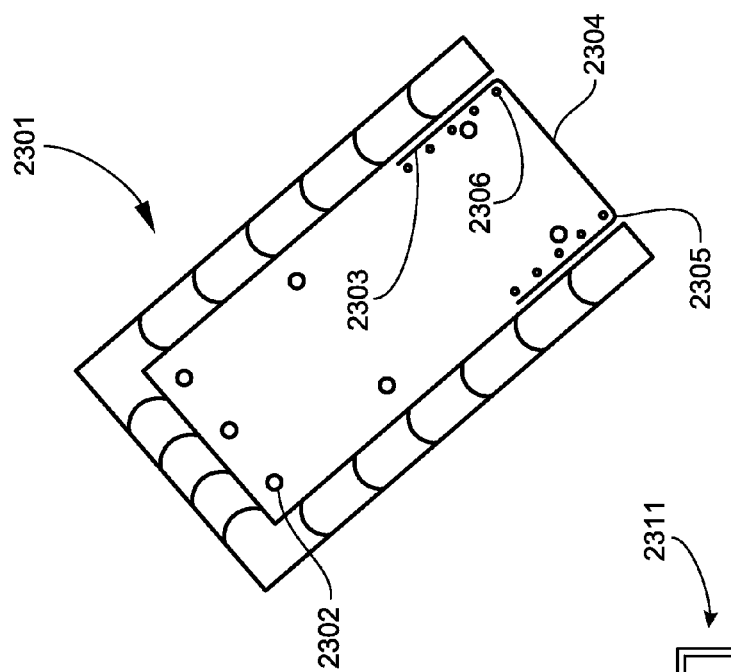
FIG. 23A illustrates a top down view of uncovered 3 sided enclosure for a MOBILE PAPE with straw bale walls.

FIG. 23A shows one embodiment of a plastered or cemented straw baled 3 sided enclosure 2301 with protection posts 2302 embedded into the ground so that when a trailer or mobile modular plant air purifier unit is backed into it the sides of the unit will not break down the walls. This unit has no roof. There is a recessed track 2303 for louvered insulated panels doors which will cover the front entryway 2304. This track extends parallel to the inside side walls of the enclosure. This guide allows the panels which make up the front door to first curve at the ends of the doorway 2305 and then to slide back and be parallel with the wall when the entry way is to be opened. Between the lower track and the barrier posts are placed telescoping poles 2306 with their bottoms securely embedded below ground. An upper track (not shown) or guide cantilevering over the poles to support and guide the insulated panels, prevents them from falling forward or back. This upper guide rises and falls with the door panels.

Figure 23B:
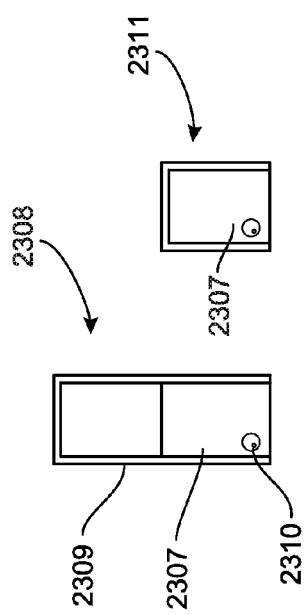
FIG. 23B illustrates a front view of an extending wall panel for 3 sided enclosure in fully extended position.

FIG. 23B shows what each of the hanger panels 2307 looks like in the raised position 2308. Each insulated panel is housed within a frame 2309 which can extend upwards and there is a crank 2310 attached to a pulley and chain or cord (not shown) which allows one to crank the panels up and the upper track as well so increasing or decreasing panels and upper track's height.

Figure 23C:
FIG. 23C illustrates a front view of an extended wall panel for 3 sided enclosure in lowered position.

FIG. 23C shows a panel 2307 in a lowered position 2311. These panels will be slightly below the height of the walls of the enclosure shown in FIG. 23A when in the lowered position so when there is no roof placed on the enclosure they would not be noticeable from outside the structure. These same panels in the down position are able to slide on the track and so act as a gate to the three sided enclosure, thus acting as a protective barrier so that articles or pieces of equipment may be kept in the enclosure and be secure when a mobile PAPE is not within the space.

Figure 24:
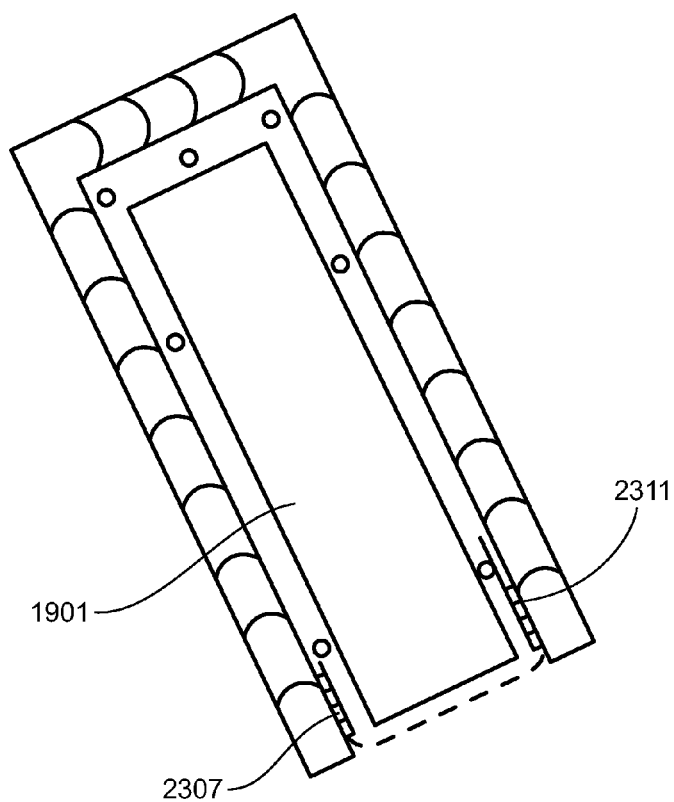
FIG. 24 illustrates a top down view of 3 sided enclosure for MOBILE PAPE with the MOBILE PAPE within.

FIG. 24 is the same structure as that shown in FIG. 23A except that the mobile PAPE 1901 is now within the structure and the insulated hanger panels 2307 which compose the front garage door are in the down position 2311 and along the sides of the enclosure itself.

Figure 25:
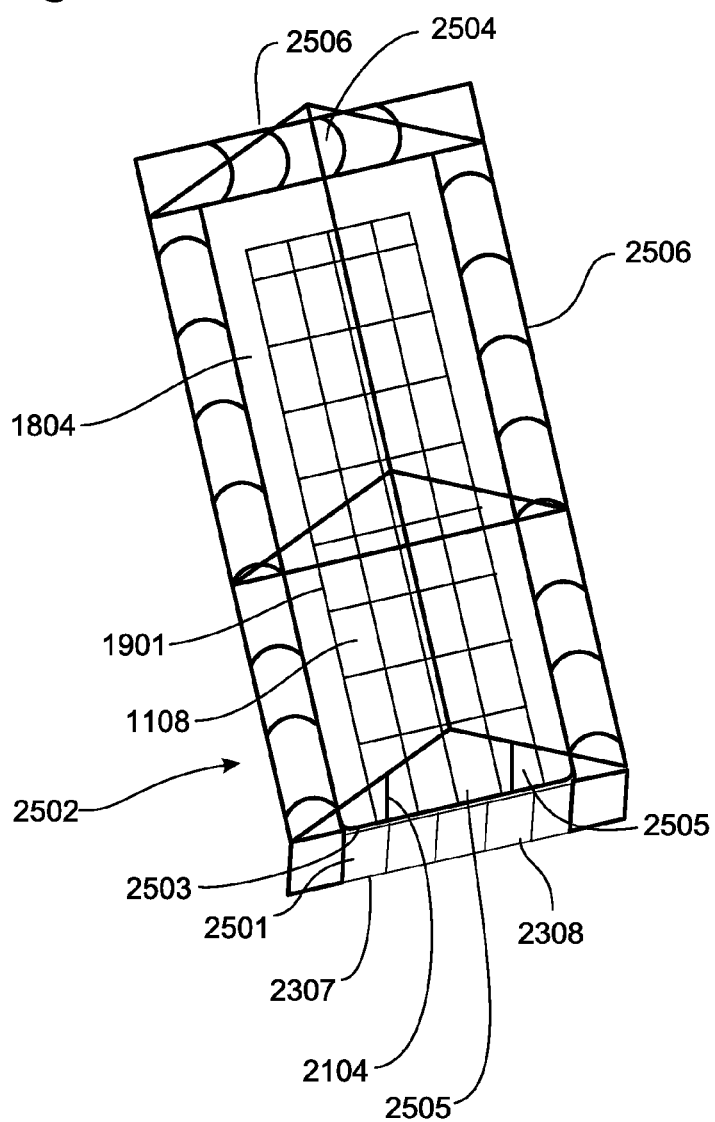
FIG. 25 illustrates a top down view of 3 sided enclosure for MOBILE PAPE now enclosed with roof thereon MOBILE PAPE inside and baled insulation placed on top of MOBILE PAPE roof.

FIG. 25 is the same enclosure as that in FIGS. 23 and 24. The mobile PAPE 1901 is within. The insulated paneled doors 2307 are extended to the upright position 2308 and make up the front hanger door 2501 of the mobile PAPE hanger 2502 which is fully erected. On the top of the mobile PAPE are straw bales 1108. On the top of the bales are triangular supports 2104. These also rest on the walls of the enclosure. The roof 1804 is placed on top of the triangular supports and extends over the walls' edges. On the bottom of the triangular support stationed at the front is a track 2503 in which the insulated panel doors run. This track helps to seal the enclosure and gives added support. Foam insulated back wall panels 2504 attach in the back of the structure to the triangular rear roof support and to the upper edge of the straw bale wall, so sealing the enclosure entirely in R35-R50 insulation. Foam insulated front wall panels 2505 do the same above the hanger doors A PAPE hanger with roof is easily completed and can easily be returned to its former condition were the mobile PAPE to be removed.

In addition holes 2506 can be placed in the walls of the mobile PAPE hanger to allow for entry and exit of insulated ventilation ducting from the main building and for water lines with heat tape wrapped around them.

Figure 26:
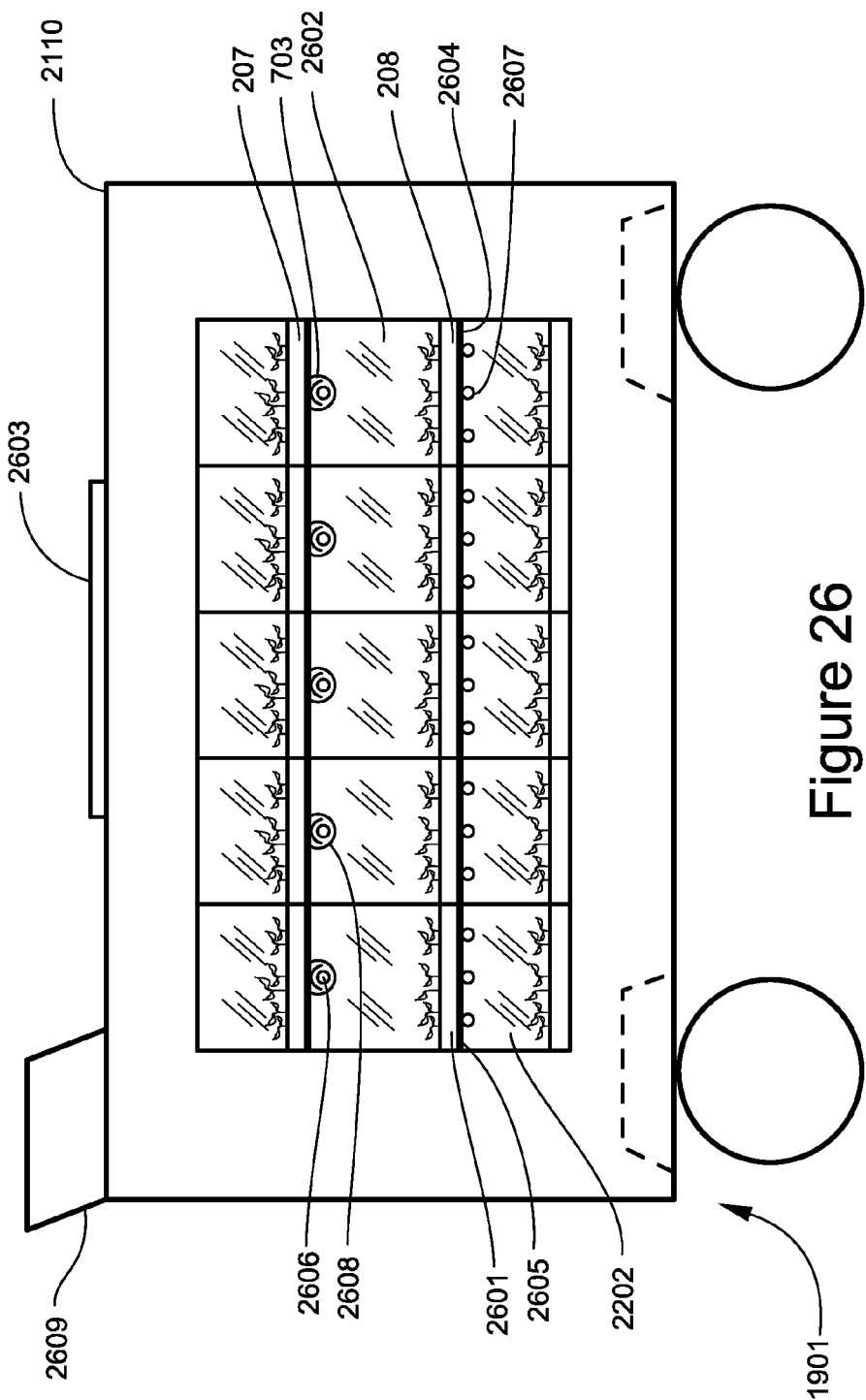
FIG. 26 illustrates a side view of MOBILE PAPE with translucent window and with stacked plant air purifier within. This unit has solar panel and skylight.

FIG. 26 shows a side view of an auxiliary unit. In this case a mobile PAPE 1901 wherein a plant air purifier 207 is located. Various means of illumination for the plants are here displayed. Of course any or all could satisfy the needs of the plant in the plant air purifier but for the sake of brevity they are all incorporated within this one figure. Here the plant air purifier is multi tiered. Its filter beds are set on baker's carts 2601 which are stationed side by side. Illumination is provided both by a large sheet of insulated poly carbon 2202 or polyethylene 2602 stationed on the side of the unit. Since the plants in the plant air purifier are low light requiring plants and are averse to direct sunlight, the shade of the sheet might be a white or opaque, but it could be clear given that the sheet is many walled, sometimes having as many as five or more. With each wall the light passing through the sheet is diminished and so a 25 mm panel with five walls could cut down on light coming through dramatically. Thus even if the sheet were clear the light would be muted. On the roof of the unit 2110 there is a skylight 2603 which could be of glass or more likely is the same type of insulated light introducing material used for the side. Under each tray 2604 which holds the filter beds 208 of the plant air purifier 207 is a brace or frame 2605 and from that brace is suspended a florescent light 2606 which provides more than adequate light for the plants within each tray. Also are provided LEDs 2607 for illumination. The LEDs can be better geared for the specific wavelengths of light which the plants require, though the florescent can be had in cool white which provides more of the blue spectrum which low level plants seem to desire. Some of the florescent are a warm white which provide for more of the reds which the plants should not be entirely without. Grow light florescent could be used as well but they are largely unnecessary. Guards 2608 prevent water from dripping directly on to the fluorescents or their ballast or wiring as water drips down through each tray. Within the guards are light reflectors 703 which reflect illumination down onto the upper surface of the leaves so the light is more focused as to where it should go. The LEDs do not need moisture protection and they can be specifically directed via lens or angled where the light is to be directed. Meanwhile, on the roof is a solar panel 2609 or series of solar panels which supply solar energy to the unit, both for normal use and in times of emergency when electric power from the grid is curtailed.

Figure 27:
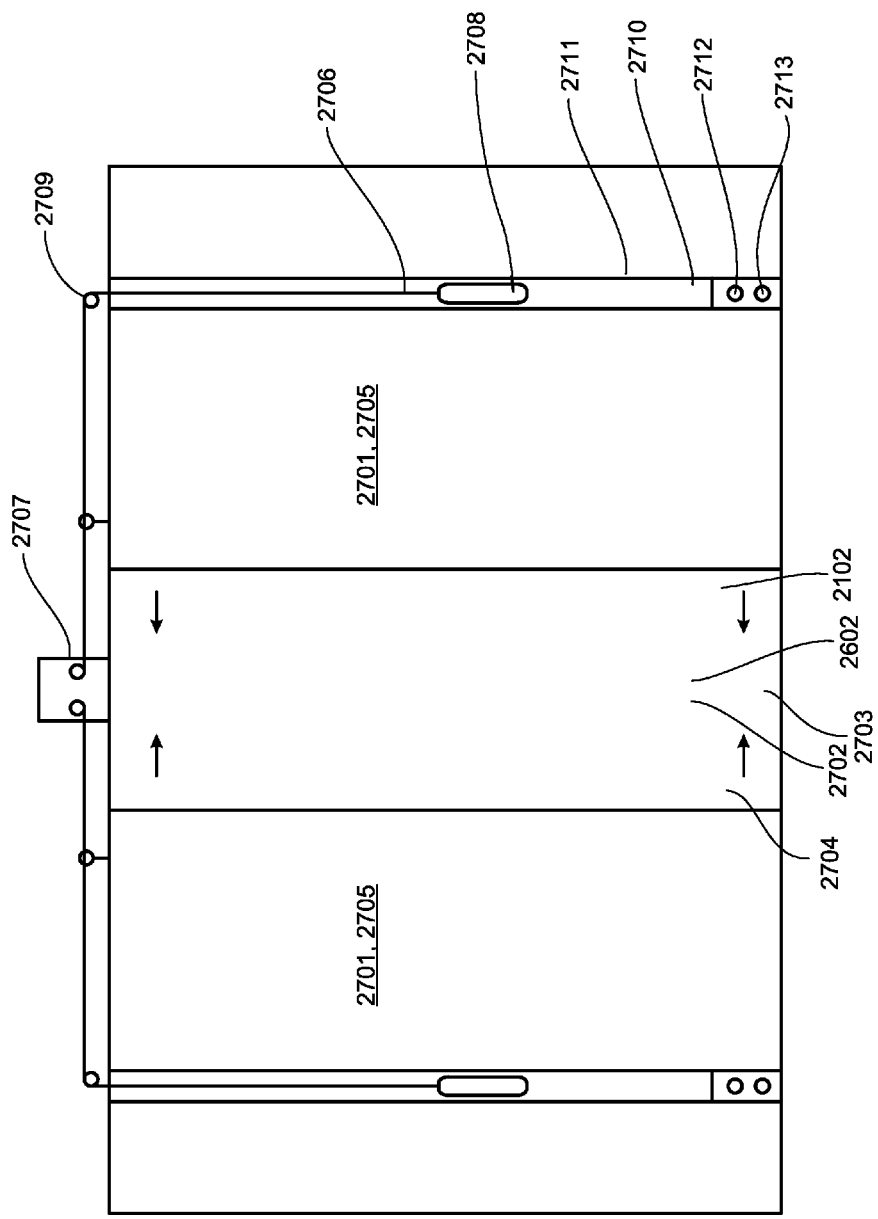
FIG. 27 illustrates a side view of motorized movable insulation for translucent wall or window of MOBILE PAPE.

FIG. 27 is a diagram showing two sliding insulated shutters 2701 which cover over the piece of glass 2702, poly carbon 2102, polyethylene 2602, Plexiglas 2703 or any substance with an ability to allow natural light to pass through 2704. Since any of these translucent substances usually lacks good insulating properties it is best to cover over this light source when light is no longer available or when outside temperatures are radically different than the ambient temperature where the plant air purifier is located. Sliding shutters are just one form of movable insulation 2705 which could be used. In this embodiment the shutters are attached by cables 2706 to a motor 2707 which draws them together. The cables are also attached to counterweights 2708 and run around pulley wheels 2709. As the shutters are being drawn together the counterweights lift, and air 2710 is sucked into the chamber 2711 where the counterweights are located. When the shutters are fully drawn together, the air intake valve 2712 closes trapping the air in which the counterweights are located and thus supporting the weights at the same time. When the shutters are to open, tension is releases on the cables and bleeder valves 2713 open whereupon the counterweights slowly descend and the insulated shutters open.

Figure 28:
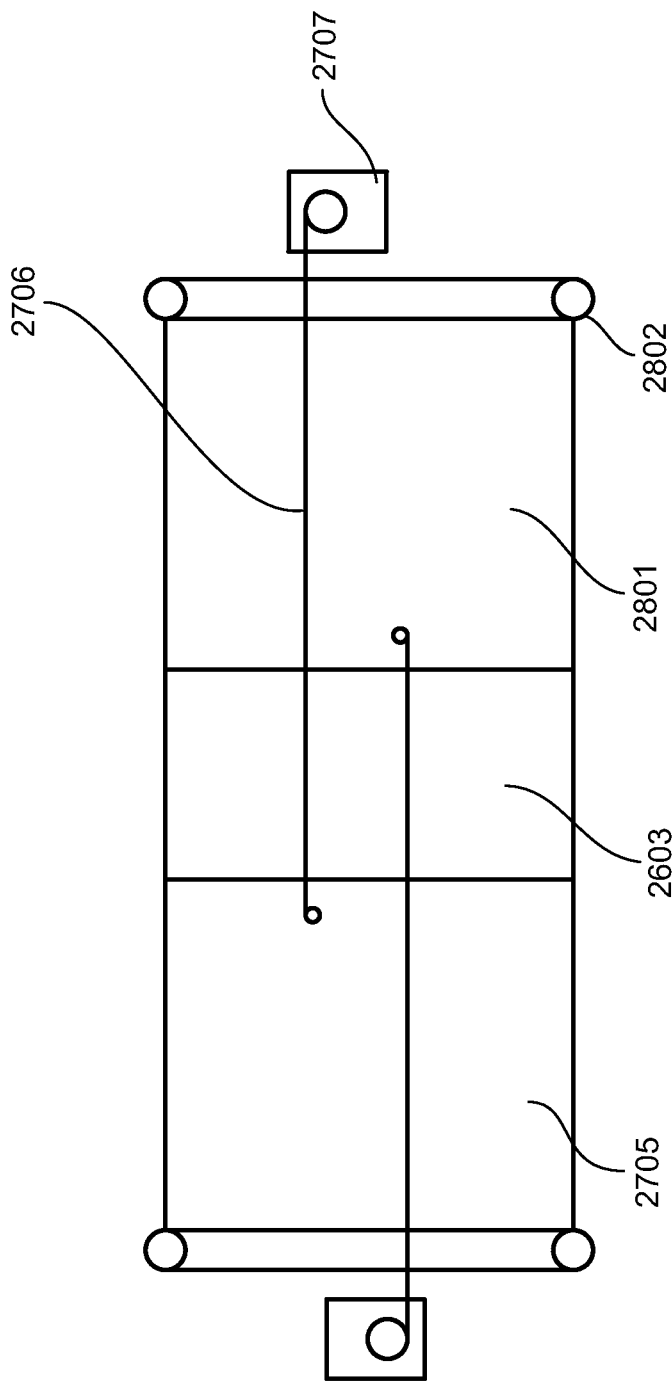
FIG. 28 illustrates a bottom up view of motorized movable insulation for skylight of MOBILE PAPE.

FIG. 28 provides a bottom up view of a further embodiment of the invention where movable insulation 2705 is used to cover over a skylight 2603 when it gets to hot or cold outside. In this case, insulating shades 2801 are attached to spring rollers 2802 which are attached to cables 2706, which are attached to motors 2707. When the shades are be closed over the skylight the motors pull the cables attached to the shades.

When the shades are to be opened the tension on the cables is released and the spring rollers rewind the shades up once more.

Figure 29:
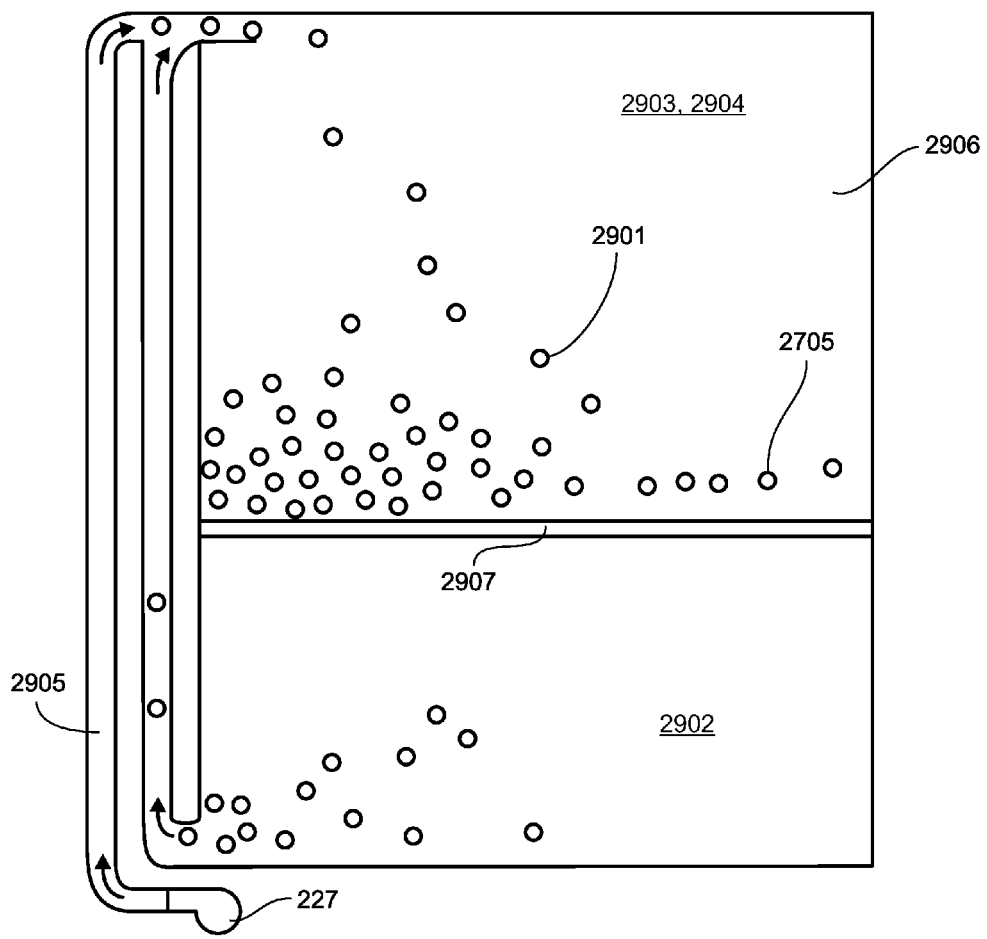
FIG. 29 illustrates a side view of Styrofoam bead wall that insulates the window or translucent wall of MOBILE PAPE.

FIG. 29 shows a forward looking embodiment of one component of the invention where movable insulation 2705 this case Styrofoam beads 2901 are held in a lower compartment 2902 below a window 2903 or translucent wall 2904 and a blower 227 blows air through a pipe 2905 which sucks the beads out of the lower compartment where they are stored and pulls them into a translucent bladder 2906 that insulates the space between the window and the interior of the unit where the plant air purifier is located. When light is available from outside, a fin 2907 which hitherto had prevented the beads from dropping down and out of the space covering the window, is turned and the beads simply fall into the lower compartment emptying the space in front of the window in the interior of the unit so light may enter. Providing such bead Styrofoam provides as much as 3R of insulation per inch of thickness which is far better insulation than simply empty space where convection currents could draw thermal energy within the PAPE and so increase energy needs for heating or cooling of the main structure whose air was being purified.

Figure 30A:
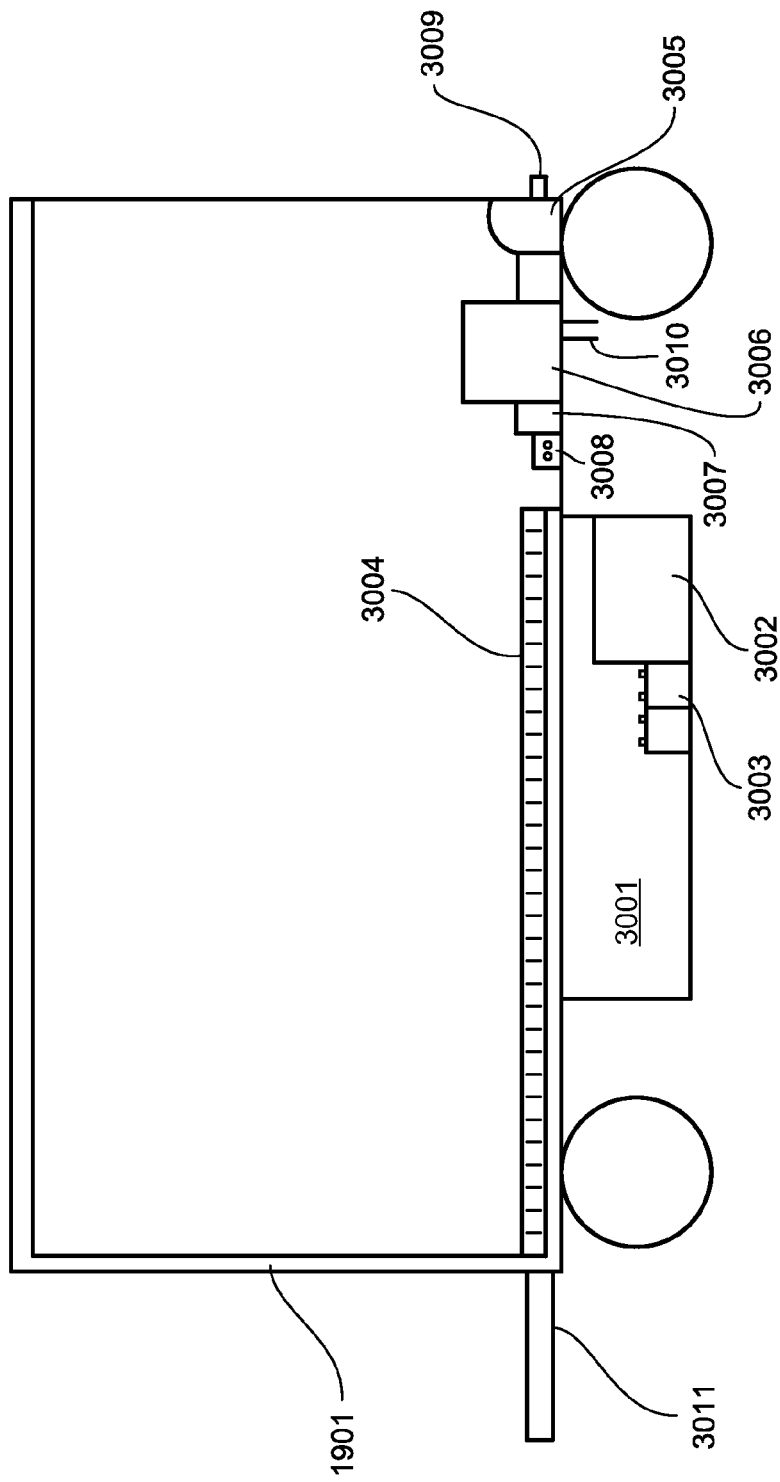
FIG. 30A illustrates a side view of MOBILE PAPE showing backup batteries, generator, water reservoir, tailgate etc.

FIG. 30A provides some of the emergency equipment necessary for the maintenance of the plants within the PAPE were outside power to fail, or were the heat or cooling air from a conditioned space fail to enter the area of the PAPE. In this particular figure a mobile PAPE 1901 is shown. This unit has a storage area 3001 under the undercarriage of the unit. Within the space therein is a generator 3002 and some backup batteries 3003. The interior of the PAPE also contains baseboard heating 3004, a water tank 3005, a water reservoir 3006, a water pump 3007, an electric hookup 3008 to take in outside current, a water inlet 3009, and a drain 3010. Also shown in the figure is a hydraulic tail lift 3011 which allows heavy materials to be lifted up to the level of the floor or removed from inside the PAPE which is here stationed above the ground.

Figure 30B:
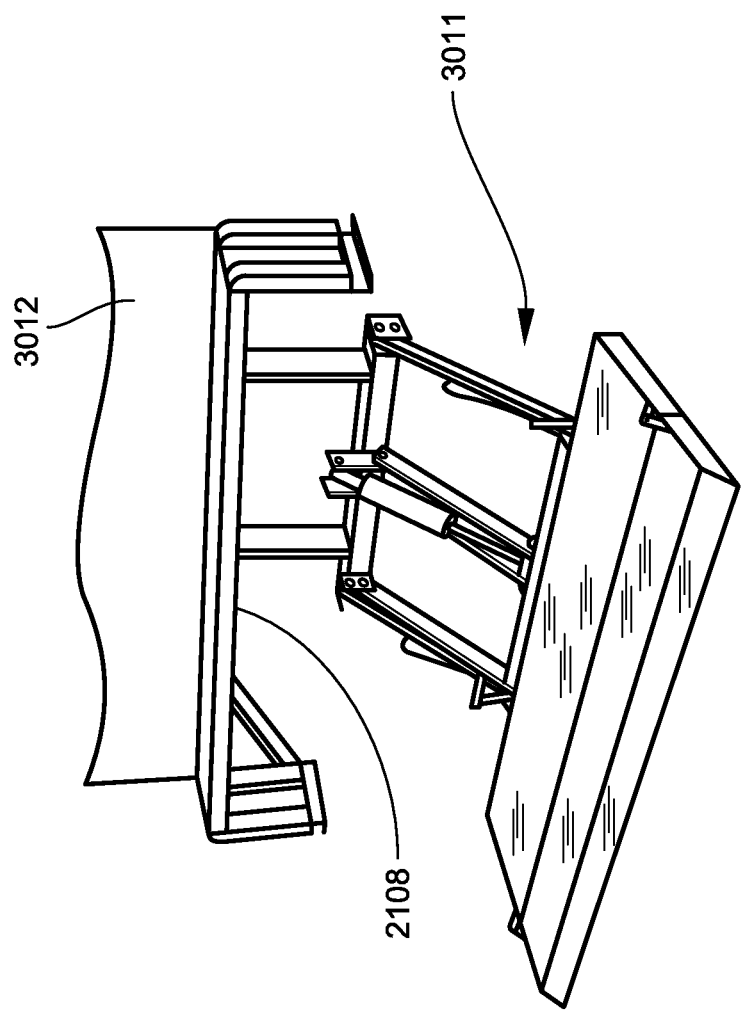
FIG. 30B illustrates a side angled view of hydraulic tailgate lift for MOBILE PAPE.

FIG. 30B provides us with a more detailed showing of the hydraulic lift 3011, here in the lowered position. While it is here shown as being attached to the undercarriage 2108 of a mobile unit in the back 3012 of that unit, it could just as easily be stationed at the side or front of the unit, where there would be a door for the taking in or removing of heavy materials, especially such items as the baker carts.

Figure 31:
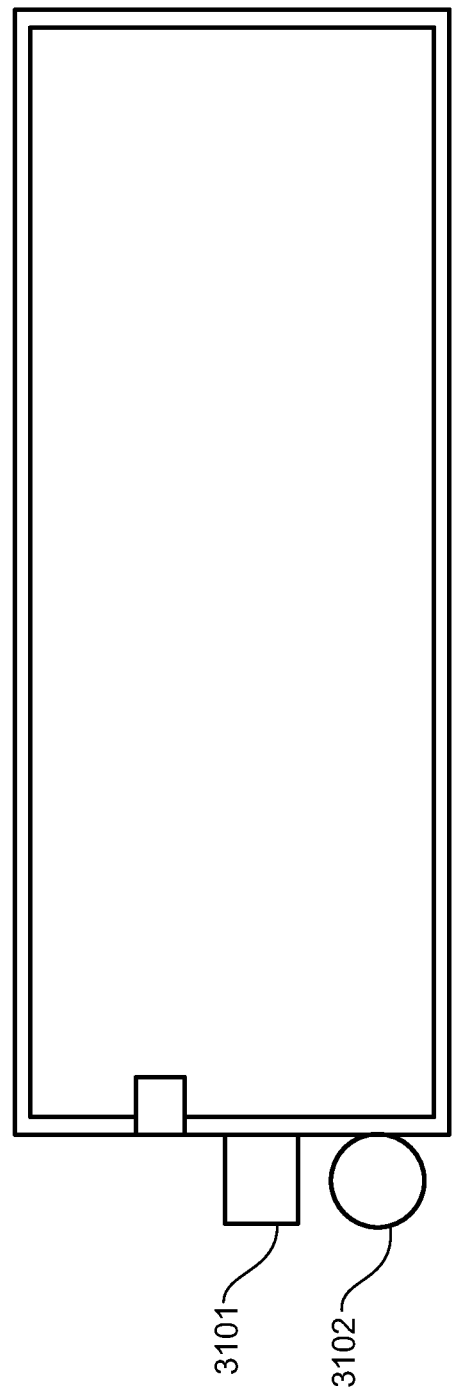
FIG. 31 illustrates a top down view of MOBILE PAPE equipped with propane tank and furnace.

FIG. 31 shows a top down view of the same unit with a furnace 3101 and a propane tank 3102.

Figure 32:
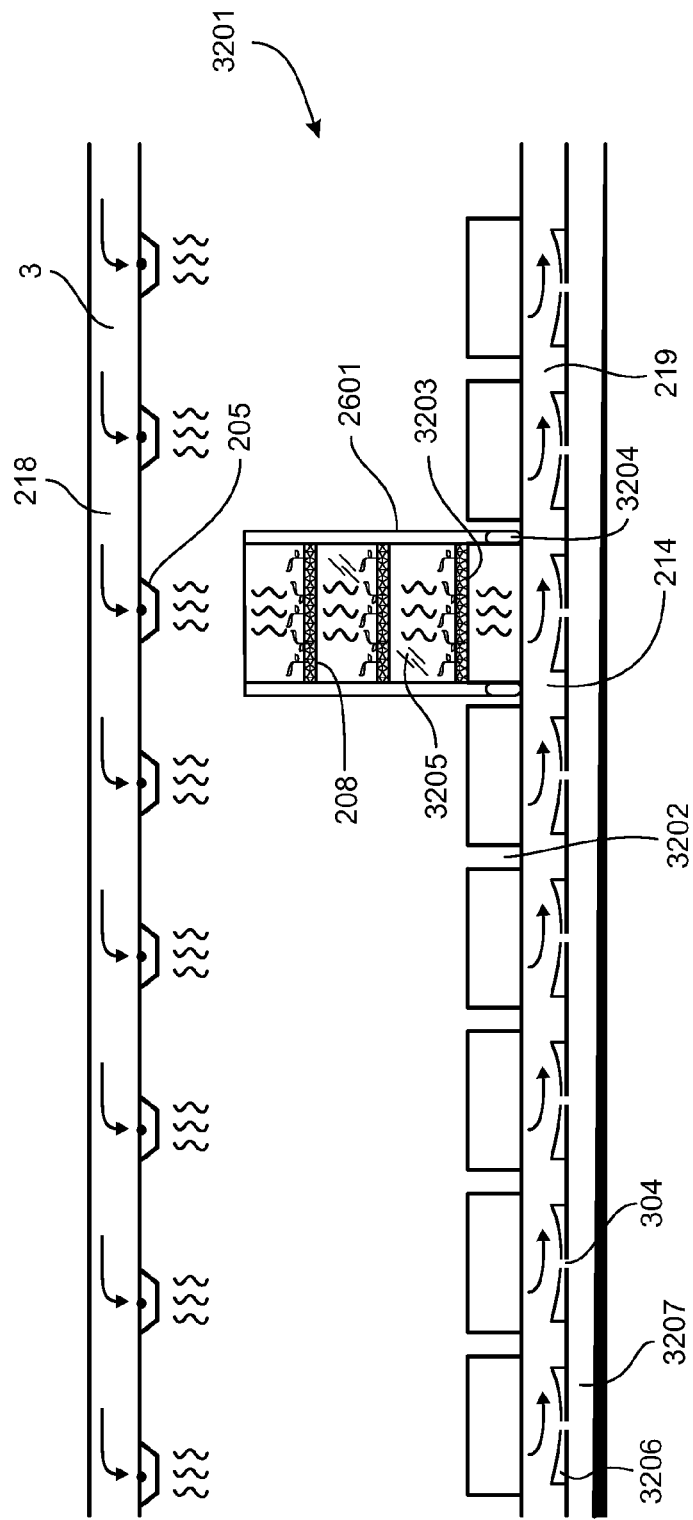
FIG. 32 illustrates a side view of the interior of a Mobile PAPE with baker's cart stacked plant air purifying trays stationed over an air plenum.

FIG. 32 Shows a side view of the interior of a PAPE 3201 or enclosure wherein the baker cart 2601 type plant air purifier on wheels 3204 is stationed over a plenum 214. Space 3202 between the plenum opening and the floor allows the baker's cart to be wheeled into place or removed. The baker's cart is locked into place and an airtight seal 3203 is had between the plenum and the lowest tray on the backer's car, thus ensuring that impure air 218 which exits from the overhead duct 3 through ceiling supply vents 205 travels down through each filter bed 208 on each baker's cart. Plexiglas walls 3205 on all sides of the baker's cart ensure that air will not take the path of least resistance and simply travel through the lowest tray. Plexiglas walls also are located on the front and back of the baker's cart itself. Each tray is on supporting elbow brackets which ensures that all air travels through the filter bed on each tray and not between the outer edge of the tray and the Plexiglas walls. Once the purified air 219 enters the plenum it is then ducted out of the PAPE whereupon it than enters a conditioned space within the main structure. Within the plenum itself 214 are cup like structures 3206 with drain 304 at the bottom of each which allow water to drain down into the sloping lower water chamber 3207 located below the plenum which leads to either an overall drain or into a reservoir, neither of which is shown in this figure but which have been illustrated elsewhere. The reason for such a lower chamber is because it might take too long for water to get to the end of the plenum which could be 55 feet or even longer. By the water being able to drop straight down into the lower chamber the air from the overhead vent can go through the plant air purifier that much sooner without having to be interrupted in its air cleaning capability.

Figure 33:
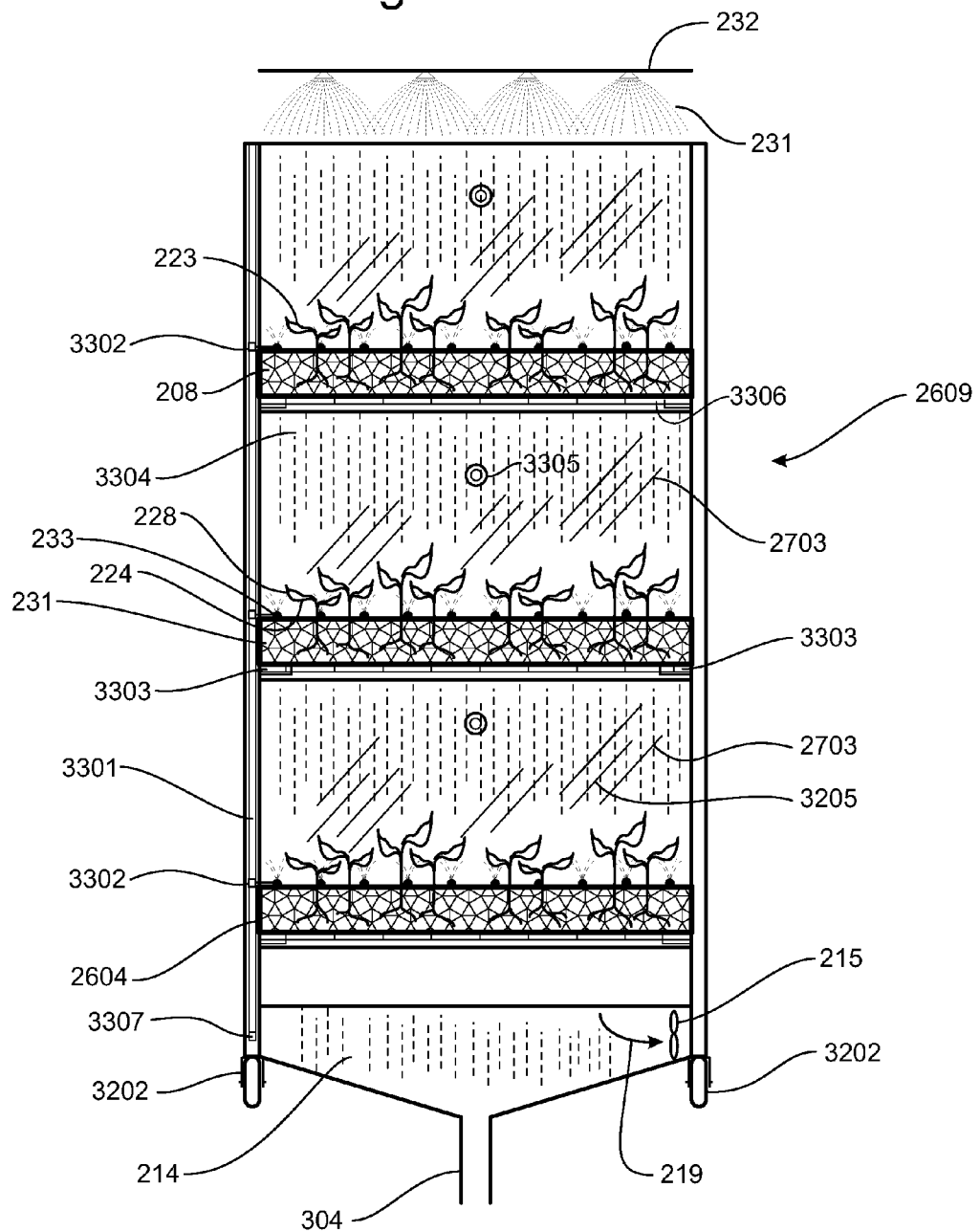
FIG. 33 illustrates a front view of a baker's cart plant air purifier equipped with multiple filter beds, lights and pressured water irrigation connections housed over an air plenum and drain.

FIG. 33 shows an enlarged front view of a baker's cart 2609 with an overhead sprinkler 232 above it. Spray water 231 from the sprinkler washes the dust from off the tops of leaves 223 in the first tray. But as the water drains through the filter bed 208 and drops down to each successive filter bed, it washes the dust off the tops of the leaves of the plants in each lower tray. In addition, micro irrigation sprinklers 233 located just above the filter bed of each tray below the leaf canopy of the plants in that tray spray water which reaches the underside of the leaves 224 and removes dust from that side as well. With the air draft, overhead water and underside water, dust is removed in this triple action from the leaves of the plants, keeping the stomata 228 on the leaves' surface free to do their job. Water passes through the filter beds dropping by gravity until finally the water goes down the drain 304 and depending on how dirty the water is after it completes this process, it is recycled, goes down the sewer, or runs from the bottom of the PAPE (if it is a mobile unit and has no sewer connection). The baker's cart's walls 3205 are of Plexiglas 2703 though other materials could be used as well. They are clear so that light from whatever direction will flow through and attend to the plants' lighting requirements. The micro irrigation sprinklers are attached to a water feed line 3301 with pressure couplings 3302 which allows for quick attachment or disconnection so that the trays 2604 can be removed from off the racks 3303 without being encumbered by watering attachments. Plus there is a pressure coupling 3307 which allows the water supply to the water feed line to be detached from the overall water supply so the baker's cart itself can be removed from its usual location. Both front and back of the baker's cart has Plexiglas 2703 as well. Plus there are hinges 3306 for each door 3304 at each level with a knob 3305 to grab hold of which allows for the door to come down so that a tray may be removed or inserted. Each cart has wheels 3202. After the water leaves the last tray it enters a plenum 214 and then goes down the drain 304. Purified air 219 enters the plenum and is pulled by an induction fan 215 out from the plenum itself.

Figure 34A:
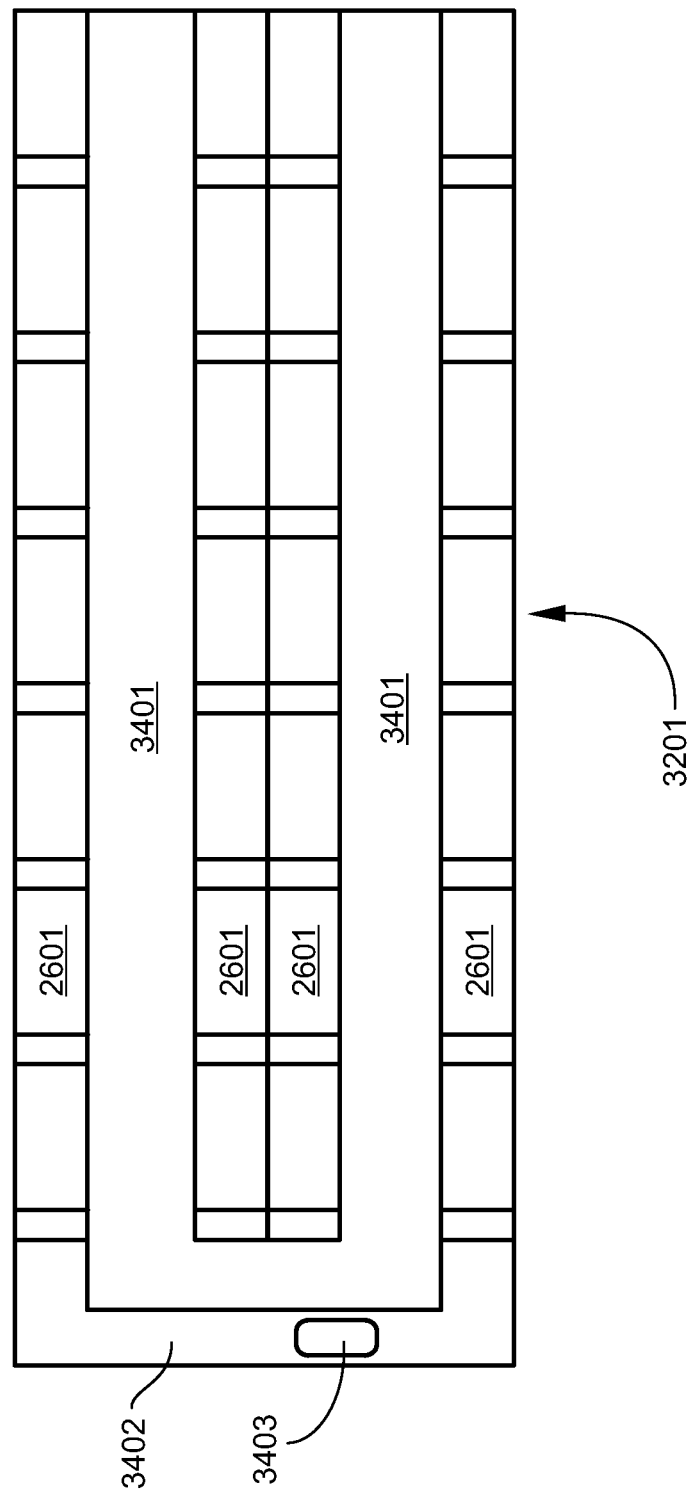
FIG. 34A illustrates a top down view of the interior of a PAPE with aisles, air purifiers, counter space and sink.

FIG. 34A shows a top down view of the layout of the interior space 3201 of a PAPE in FIG. 33. Here baker's cart plant air purifiers 2601 are stationed both in the center in double rows and on either side of two aisles 3401 broad enough so that any cart can be wheeled out of place and taken down to where there is available counter space 3402 and a sink 3403. This configuration could easily be built into a mobile trailer.

Figure 34B:
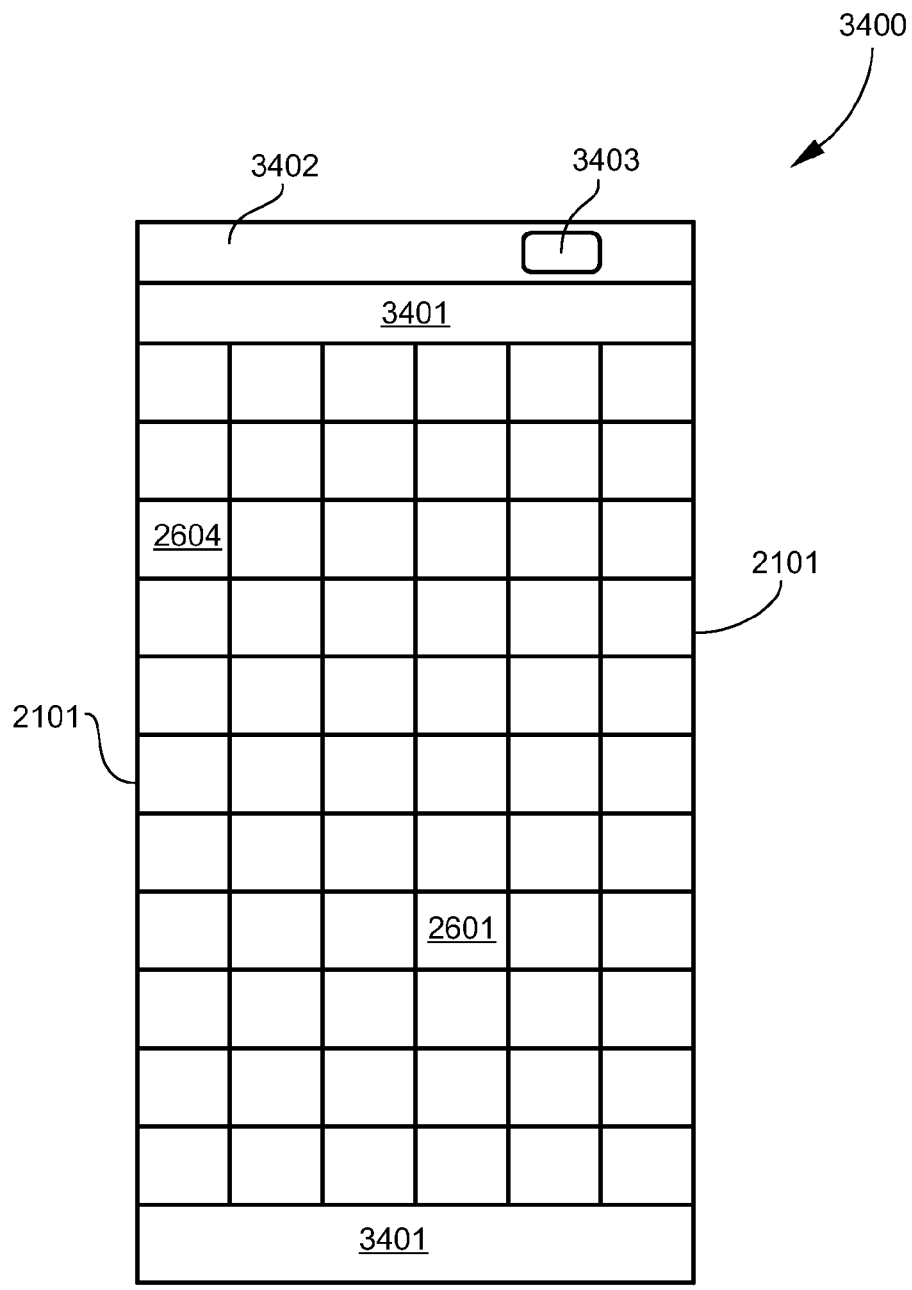
FIG. 34B illustrates a top down view of the layout of a MOBILE PAPE in a contracted traveling position.

FIG. 34B shows a condensable mobile PAPE 3400 which has the ability to both contract and expand, in a contracted configuration. This figure shows this condensing expanding mobile PAPE in a condensed traveling position and is shown from a top down interior viewpoint. Each square represents a baker's cart 2601 wherein are a series of filter bed trays 2604. These bakers' carts are bunched together and braced against the interior walls 2101 of the unit. All baker's carts are locked in place over a plenum. In this figure the plenum stationed below the baker's carts cannot be seen. There is a front and back aisle 3401. Plus the counter space 3402 is in a condensed position. There is also a sink 3403.

Figure 34C:
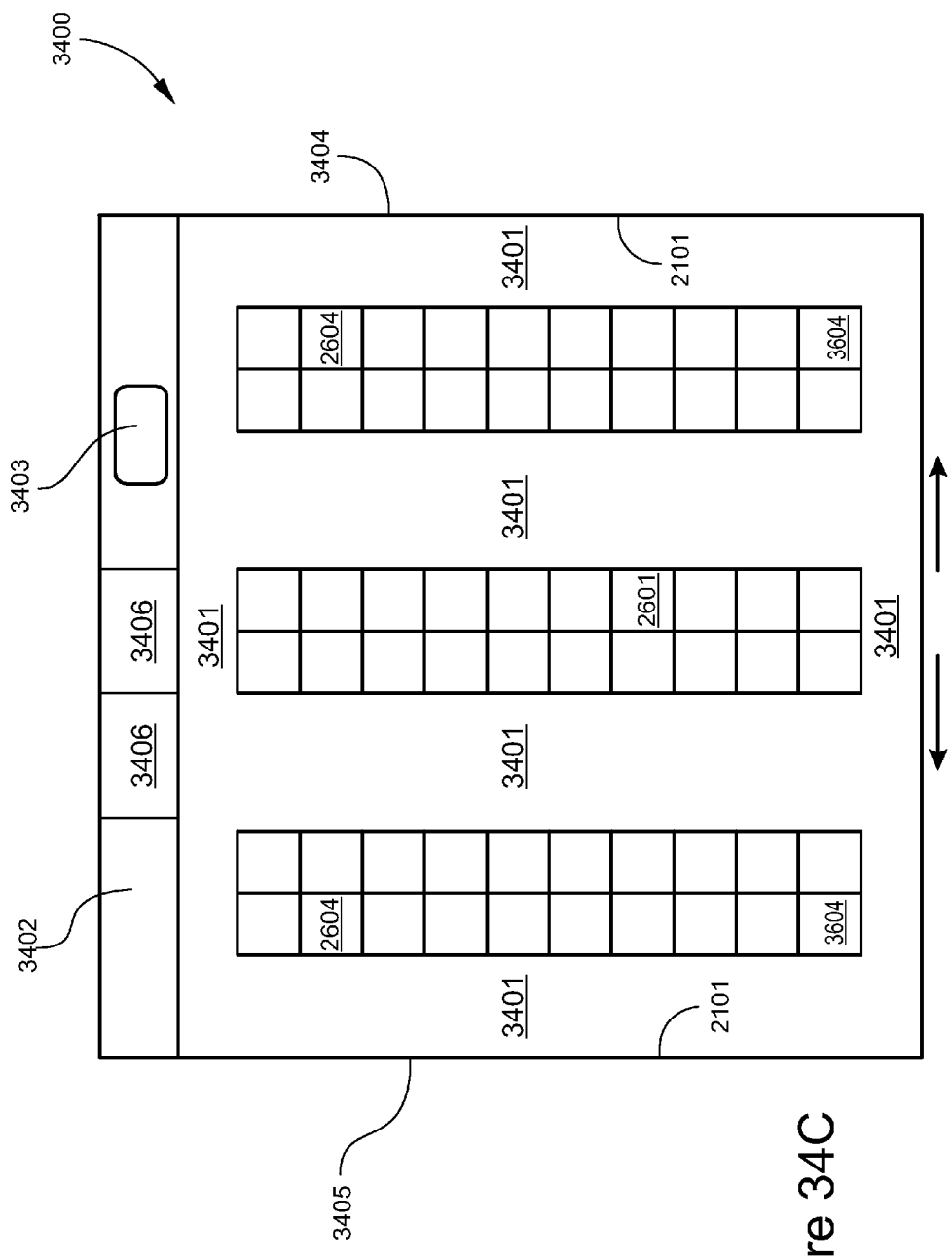
FIG. 34C illustrates a top down view of the layout of a MOBILE PAPE in the extended working position.

FIG. 34C shows a top down view of the interior of the mobile condensing expanding PAPE 3400 in its expanded operational position. This is what the unit looks like when placed in a location where it will be utilized. The unit expands or extends out to the sides, usually through a slide mechanism, often using hydraulic expanders shown in 34D. Once the unit is expanded there are aisles 3401 between the rows of bakers' carts 2601 which allow easy access from either side. The added feature of an expanded contracting mobile PAPE is that the plants within the trays 2604 are now distanced from the interior walls 2101 of the unit so that air coming in from the overhead duct will more uniformly provide the optimum temperature for the plants and microbes within the trays located in each baker's cart. By having baker's carts and trays placed further from the walls there is less of a temperature differential caused by thermal gain or loss from the walls themselves. Plus there is less likelihood of direct sunlight causing harm to the plants if translucent walls 3404 or clear walls 3405 supplement the lighting needs of the plants, given that the plant trays are now a sufficient distance from the outer perimeter of the unit. The counter meanwhile is expanded and has insertable counter panels 3406.

Figure 34D:
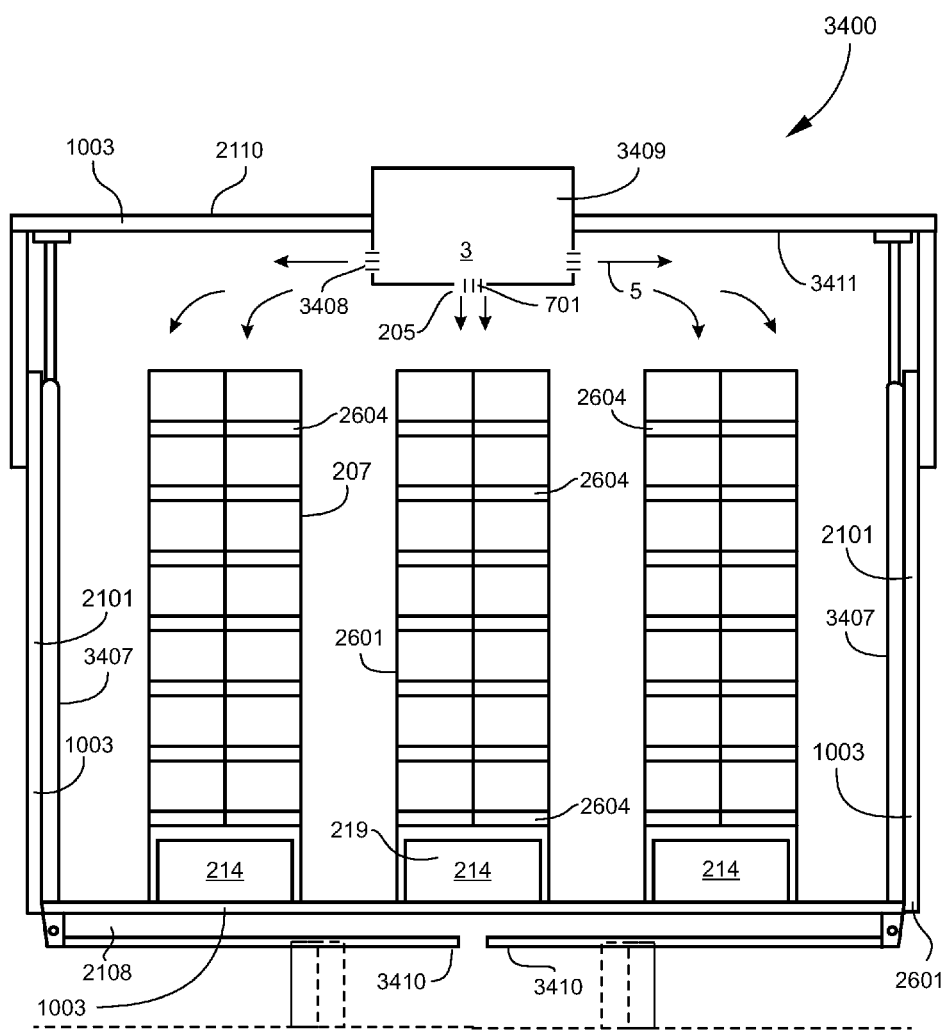
FIG. 34D illustrates a side interior view of a MOBILE PAPE in the extended and elevated working position.

FIG. 34D illustrates a rear view of the condensable expandable mobile PAPE 3400. In this figure we see the unit in the expanded operational position. One main advantage to such a version is it provides us with greater space both vertically and horizontally. Once the unit is parked in a place where it will be utilized, the ceiling cap 3411 can be raised with hydraulic lifts 3407, here mounted along the interior walls 2101 of the unit. With the ability to have a higher ceiling, more plant trays 2604 can be placed on each baker's cart 2601. Additionally, the air plenum 214 below the lowest plant tray on the baker's rack can be placed within the interior of the PAPE itself, rather than to have the plenum below the undercarriage 2108 of the mobile PAPE itself. This means that insulation 1003 within the unit will insulate the air 219 within the plenum and no additional insulation has to be placed around the plenum itself. The overhead duct 3 can have side grates 3408 or vents as well as down vents 205 or diffusers 701 so that air 5 will move on a horizontal plane before the induction fans within the plenum pull the air down into the plant air purifiers 207. In this embodiment part of the mechanicals 3409 of the unit are situated on the roof 2110. These might hit an overhead structure during travel were the roof cape 3411 in the raised position while traveling, but such will not occur when the roof is in the lowered position while the unit is in travel mode. A lower roof means easier handling during travel and less wind resistance which makes for increased mileage per gallon.

Mounted under the undercarriage 2108 of the mobile expanding and contracting PAPE are hydraulic cylinders 3410 which expand or enlarge the footprint of the unit on the horizontal plane. FIG. 34D shows the unit in the extended or operational mode. Because of the length of the mobile PAPE which will be 45 feet or more, more than one set of horizontal hydraulic cylinders and vertical hydraulic lifts are placed along the length of the unit.

Figure 35:
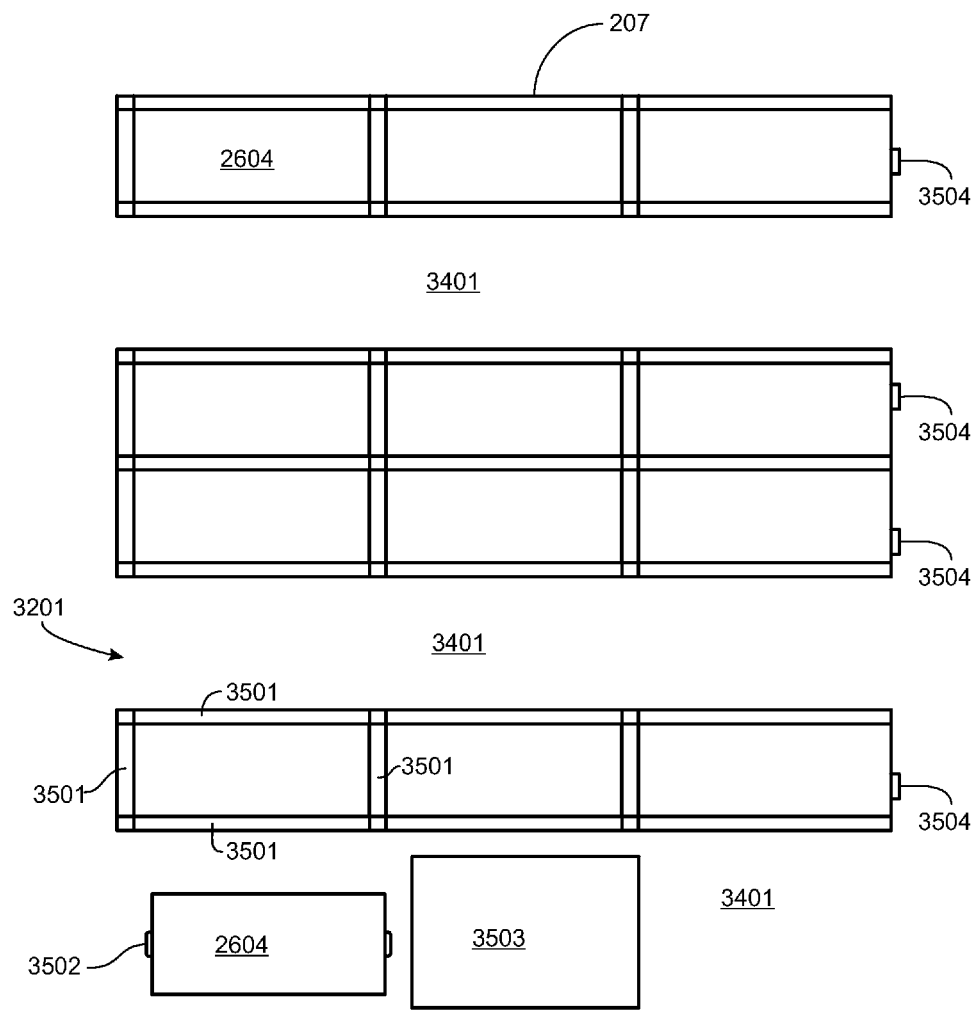
FIG. 35 illustrates a top down layout of a PAPE with single level plant air purifiers, showing aisles, trays and a dolly to move the filter bed trays therein.

FIG. 35 shows a top down view of another embodiment of the invention where part of the interior space 3201 of a PAPE is shown. Here single level plant air purifiers 207 are being used. The space has three aisles 3401, with the center plant air purifier section having two plant air purifiers abreast in a column. All trays 2604 are at waist height and are easy to work on. Elbow channeling 3501 is used as part of the construction of the plant air purifiers on which the tray filter beds are inserted. This channeling or framework prevents air from going down to the plenum below without it going first through the filter bed. In the lower left side of the drawing is a filter bed tray 2604 which has been removed from the plant air purifier. Each tray has handles 3502 for easy removal. Within the aisle closest to the bottom of the figure is a dolly 3503 which can be used to put trays on and roll them down the aisle to where the counter top and sink are located. Since these trays are quite heavy, this is a distinct advantage. When a plant tray is being worked on in place, or is being removed from a plant air purifier row, a switch 3504 can turn off the induction fan set in the plenum below it. A switch for each row is so attached.

Figure 36:
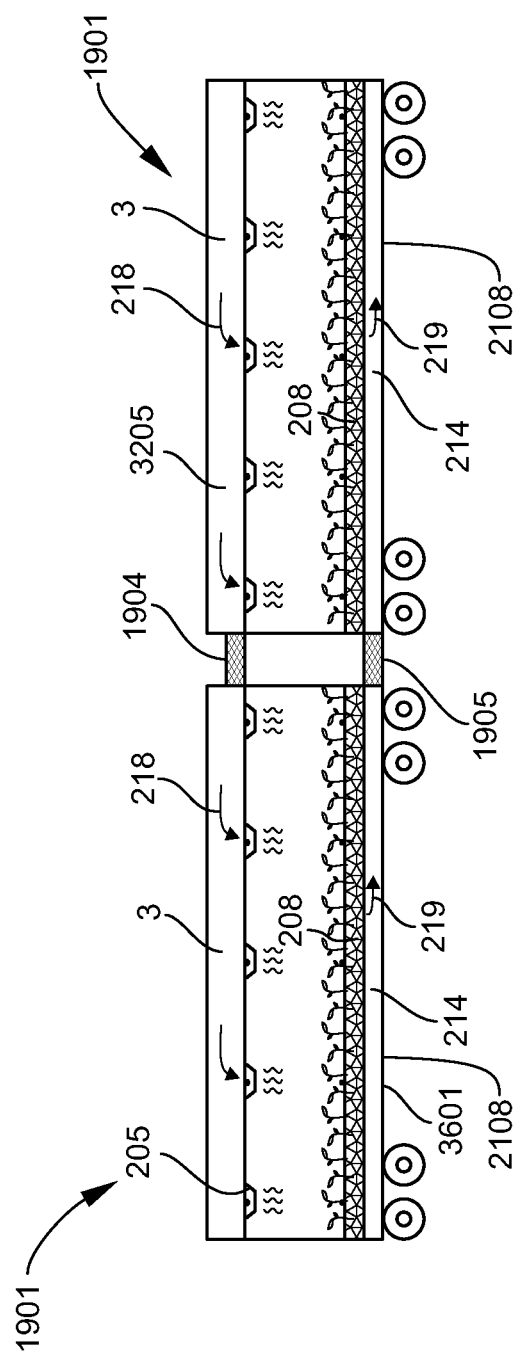
FIG. 36 illustrates a side view of a double trailer MOBILE PAPE hooked up in tandem.

FIG. 36 shows two mobile PAPEs hooked up in tandem so that the air 218 to be purified can go through the overhead ducts 3 of both mobile plant air purification enclosures 1901. The air comes out of ceiling vents 205 from the overhead ducts and travels through the plant air purifier filter beds 208 down into the plenums 214 below. The overhead ducts 3 from both mobile PAPEs are also hooked together with an external insulated feed duct 1904 and an external insulated return duct 1905 connects the two plenums 214 between the two units. The purified air 219 returns to the main structure whose air is to be purified. Two or more units can be hooked together in series in the event air from the main structure is coming out from only one location and the size of the structure is larger than one mobile PAPE can accommodate. The area below the plenums through which the purified air than travels is situated below the undercarriage 2108 of the mobile PAPEs and has insulation 3601 around it so there is little or no thermal energy loss or gain to the air traveling through.

Figure 37A:
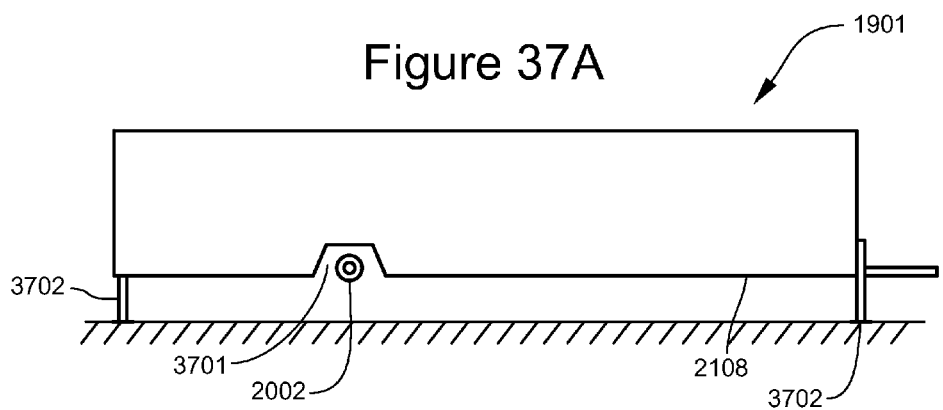
FIG. 37A illustrates a side view of a MOBILE PAPE with wheels contracted stationed on jacks.
Figure 37B:
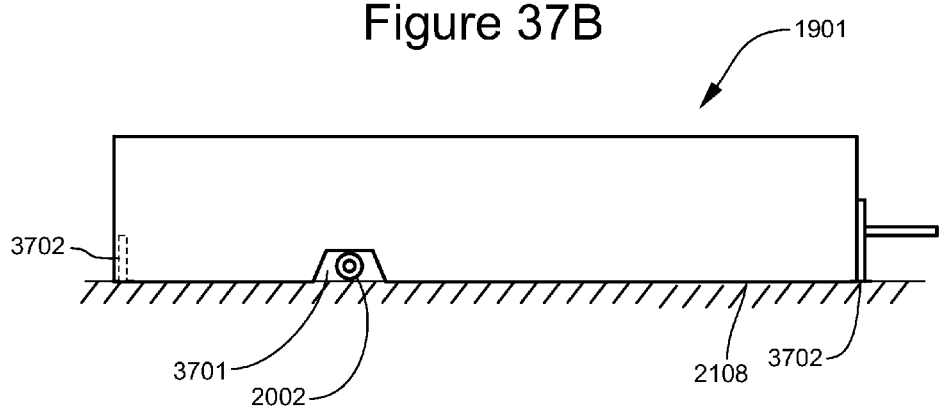
FIG. 37B illustrates a side view of a MOBILE PAPE with wheels contracted resting at ground level.

FIG. 37A shows a mobile PAPE 1901 which has its wheels 2002 pulled up into the wheel wells 3701. Mobile PAPEs can either have their wheel assemblies removed or as in this embodiment are constructed so their wheels can be raised. Jacks 3702 from the undercarriage 2108 can support the unit without the need for the wheels and once the wheels are removed or pulled up, the unit can be lowered to the ground as shown in FIG. 37B.

Figure 38:
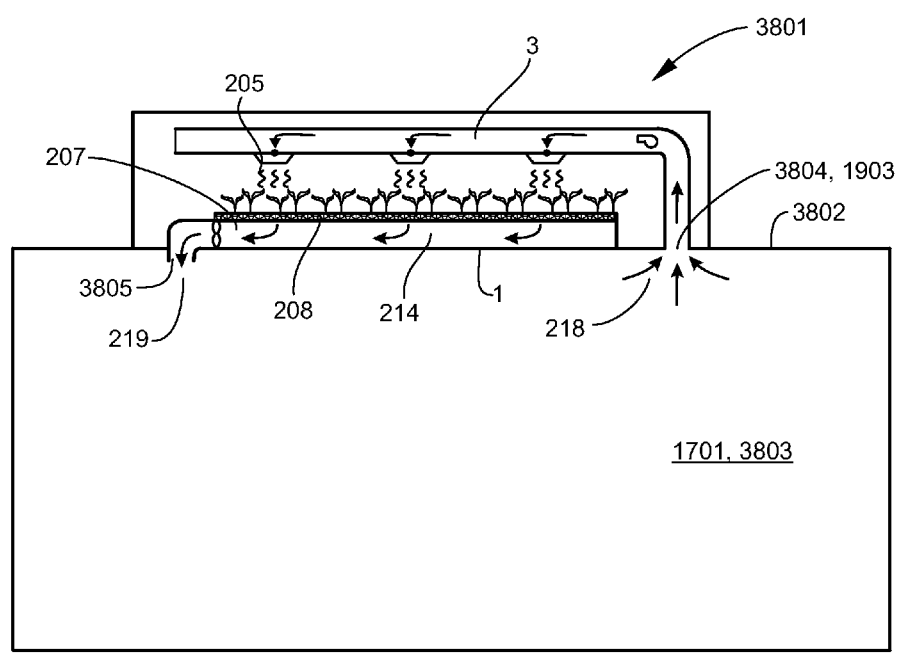
FIG. 38 illustrates a side view of a containerized PAPE stationed on the roof of a building for which it purifies air.

FIG. 38 shows an embodiment where a containerized roof PAPE 3801 is placed on the roof 3802 of a structure 1701. A mobile PAPE with its wheels and axle assembly removed is such a containerized unit. In this embodiment the unit is placed on the roof of a large box store 3803. Impure air 218 enters the containerized PAPE through the building's exhaust vent 1903 which in this case is situated in the ceiling 1 of the main structure 1701. It enters the containerized PAPE through the PAPE's indoor air intake vent 3804. It travels into the overhead duct 3 of the PAPE and passes out of the ceiling vents 205. The air than passes through the filter bed 208 of the plant air purifier 207 where it is pulled down into the plenum 214 and then returns as purified air 219 back to the main structure 1701 through a ceiling vent from the roof containerized indoor exhaust vent 3805.

Figure 39:
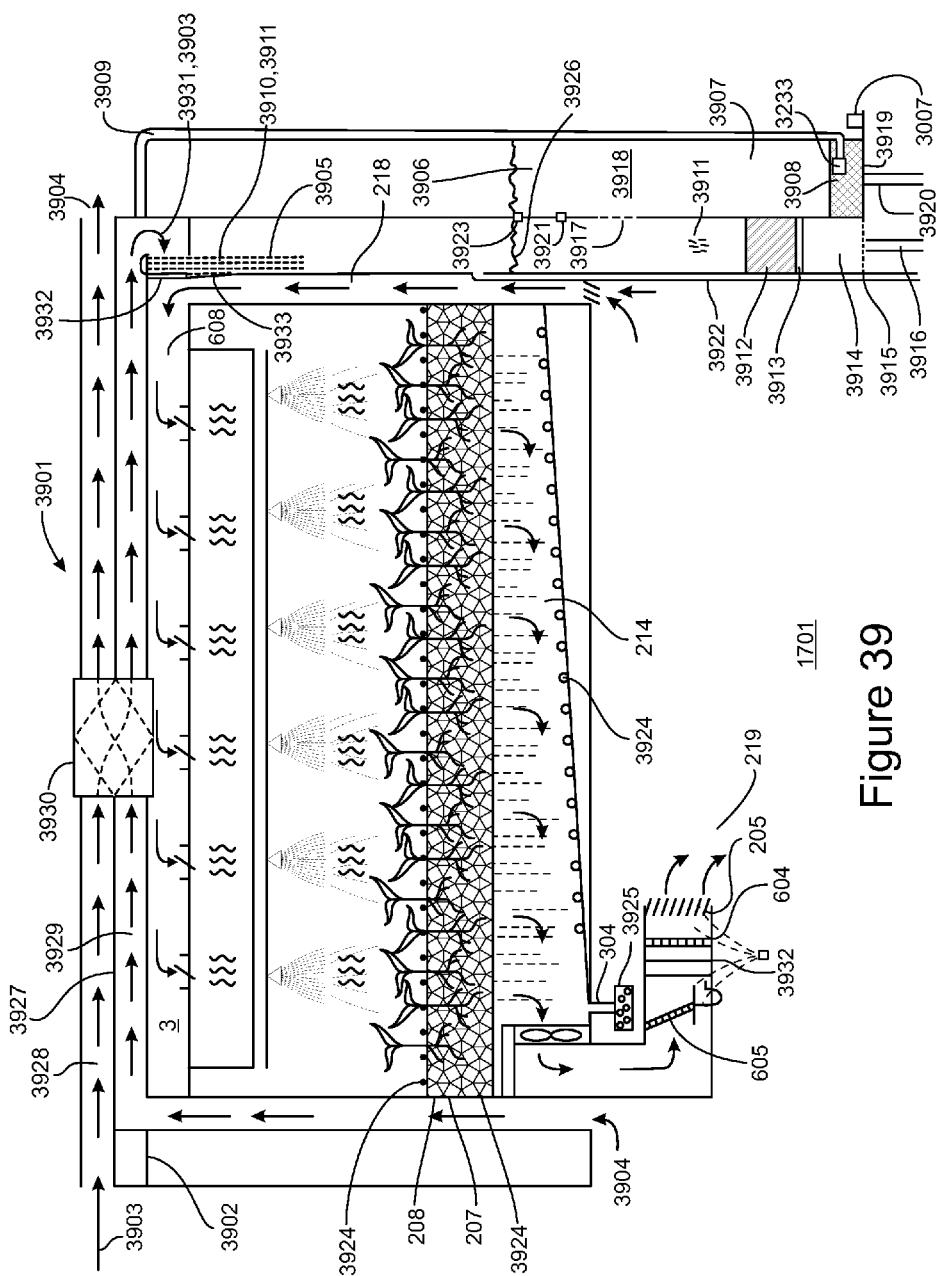
FIG. 39 illustrates a side view of a containerized PAPE with a heat exchanger, a water curtain and a limestone water chamber for particulate removal and to buffer contaminants from smog laden outside air.

FIG. 39 illustrates a plant air purifier enclosure mounted on the roof of a structure. In this embodiment the PAPE has a heat exchanger 3901 mounted on the roof of the plant air purification enclosure 3902. As incoming outside air 3903 enters the heat exchanger it takes on the thermal characteristics of the outgoing air 3904 via the common wall 3927 between the two ducts 3928 and 3929. The common wall 3927 allows soon to be exhausted indoor air to transfer its heat or cold to the incoming outside air stream 3903. The longer the two air streams are in close proximity, one to the other, the closer their temperatures become even, until finally the outside, incoming air's temperature is roughly equivalent to the air leaving the building. At one point 3930 there is a cross over point where the two ducts change position from higher to lower and vice versa. As a result the polluted, outdoor, incoming air 3231 travels through a curtain of water 3905, water which had previously passed through a limestone base 3908.

As the incoming polluted air passes through the water curtain, the air is stripped of certain pollutants 3910 and particulates 3911. It then mixes with recirculated polluted air 218 from the building itself and the mixed air 608 now travels out of the overhead duct 3 through the filter bed 208 of the plant air purifier 207, enters the plenum 214 and from there is ducted out into the main structure 1701 through a ceiling vent 205 as refreshing purified air 219. If for any reason it is found that the air entering the conditioned space would be too humid, a dehumidifier 3932 can be located downstream of the plant air purifier and the conditioned air can pass through the dehumidifier prior to it entering the conditioned space. By the same token if an air conditioner or cooling coil, 605, or a heating coil or heater 604 is placed downstream of the plant air purifier 207 these also will take moisture from the air before it enters the main structure 1701.

The water curtain 3905 has limewater 3906 pumped up from a limewater tank 3907 containing limestone 3908 located, in this illustration, in its right chamber. The water passes through the limestone 3908, and passes through a limewater feed pipe 3909 with a filter 3233 positioned at its inlet. The limewater 3906 is then pumped up to where the water curtain 3905 is located. Then it flows down through the incoming outside air 3903 or the outdoor incoming polluted air 3931 which passes through it. As it does so, the limewater picks up pollutants 3910 and particulates 3911, and falls back into the limewater tank. Most of the particulates fall to the bottom of the tank where they accumulate and form sludge 3912. To take care of some of those particles which do not coagulate but rest on the surface of the water or are suspended therein, a flocculent 3926 is added to the water that combines or coagulates small particles into larger particles, which settle out of the water as sediment and thus form part of the sludge 3912 which falls to the bottom of the tank. Alum and iron salts or synthetic organic polymers are here used for that purpose, though any other flocculent may be used as well by those knowledgeable in the art.

At the bottom of the tank is a sludge fin 3913 which supports the sludge. This fin can be turned and when pointing up, the mixture falls down into a sludge removal chamber 3914. After the sludge enters the sludge removal chamber, the sludge fin is turned back to a horizontal position, preventing any additional water or sludge from entering the chamber.

In the sludge removal chamber there is a grating 3915 located on top of the sludge removal chamber drain 3916, in the floor, that allows water which had entered the chamber and water within the sludge therein to drain away. The grating prevents sludge from entering the drain and so prevents clogging. Once the water drains away and the sludge therein has a chance to dry out, it is removed from the chamber. A sludge dewatering press can be placed within the sludge removal chamber 3914 to hasten drying. The press is not shown in this drawing.

Between the two sides of the limewater tank, is situated a vertical grating 3917 through which water can pass. This grating between the two chambers within the limewater tank prevents particulate matter from entering the right side of the limewater tank where limestone is placed at its bottom. As a result of this vertical grating, particulates which form sludge remain only on the left side of the limewater tank.

Below the limestone on the bottom of the right chamber 3918 of the limewater tank, and below the limestone 3908 is a fine grating 3919 with a drain 3920 below. This allows water to drain from the right side of the tank as well, if the limewater tank is to be completely emptied of all water. This may become necessary for cleaning purposes or in the case of an emergency. Emptying the limewater tank of all water is accomplished by simply opening both drains, the drain 3920 below the limestone 3908 and the drain 3916 below the sludge removal chamber 3914 and by turning the sludge fin 3913 to the vertical position so that there is an open passage between the limewater tank and the sludge chamber 3914 itself.

During normal operation of the limewater tank, when the sludge fin is turned to the vertical position and after sludge and water drop down into the sludge chamber, overall water levels within the limewater tank drop. A level sensor 3921, located within the limewater tank, is triggered when water drops below where it is located. Once the sludge fin is returned to a horizontal position, water from the water refill pipe 3922 will bring water levels back to where a second level sensor 3923 is located. When water reaches this level, the water coming from the water refill pipe will shut off.

When incoming outside air containing nitric oxide, nitrogen dioxide and sulfur dioxide comes in contact with moisture, and if that water is not buffered, it forms nitric acid and sulfuric acid. These acids ordinarily would be harmful to the plants and microbes within the filter bed. But by having the outside air treated prior to entry into the plant air purifier, and by having many of the particulates removed as well as soot, such a danger no longer remains, and the stomata or porous openings on the leaf's surface are less likely to become clogged.

To prevent excess moisture from passing into the overhead duct 3 once the outdoor polluted air has passed through the water curtain containing limewater, a screen or fog mesh 3932 has been placed downstream of the water curtain. As the air passes through the water curtain and then passes through the screen with its fine mesh, water within the air coalesces on the fibers of the mesh and drips downward where a diagonal fog mesh or fog screen pan 3933 directs that moisture back into the limewater tank, thus lessening moisture content within the air itself.

One can also buffer the moisture within the plant air purifier directly by buffering the water passing through the emitters and overhead sprinkler of the plant air purifier rather than using the water curtain. This can be accomplished by placing limestone granules 3924 on the surface of the filter bed within the plant air purifier. By mixing limestone granules throughout the filter bed when outside air comes in contact with the moistened filter bed with limestone granules within it, the nitric oxides and sulfur dioxide do not produce acids, but rather produce nitrates and sulfates which are fertilizers, beneficial to plant life.

Such granules can also be placed in the plenum within the plant air purifier or in a container 3925 below the drain of the plant air purifier so that after water passes through the plant air purifier and through the granules it is buffered water that can be recycled and pass through the micro irrigation emitters where it will nourish the plants, it now having these fertilizers within it.

One other advantage to using an outside air purifier as here described, be it either the water curtain or the limestone granules, is that it eliminates the need for outside air having to first pass through filter bags which need constant replacement. Rather the pollutants are turned into a source of fertilizer for the plants within the filter bed. By having such an outdoor air purifier, coupled with a PAPE, a cause of irritation to the building's inhabitants is now turned into a useful source of nourishment for plant life.

Needless to say limestone granules don't have to be placed in all of the places here stated. However, all are shown as ways of limiting outside air pollution when outside ventilation is used. Other buffering agents could be used in place of limestone and this patent is intended to cover all such other buffering agents known to those familiar with the art.

Figure 40:
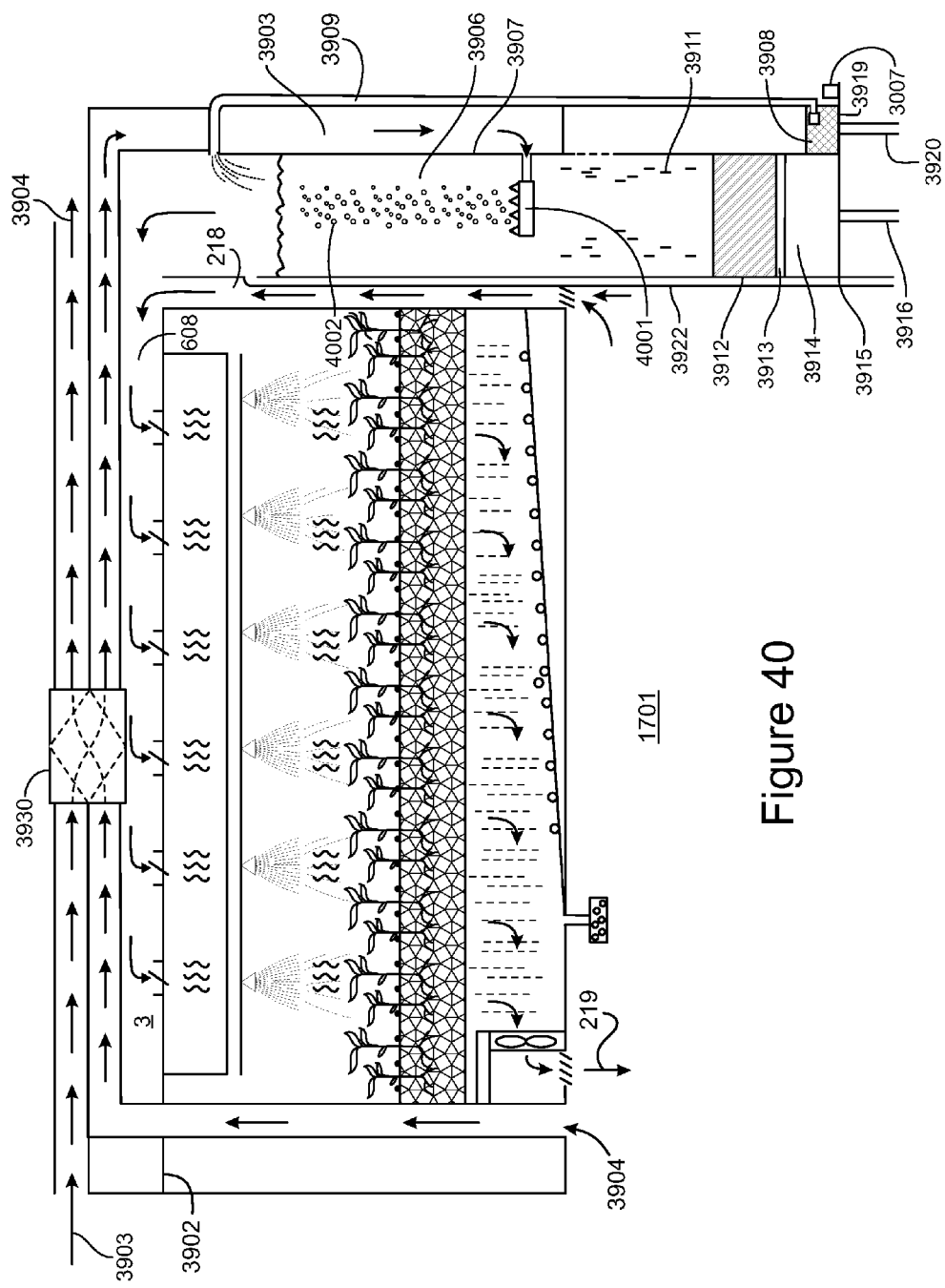
FIG. 40 illustrates the side view of the containerized PAPE of FIG. 39 save with an aerator in place of a water curtain for removal of particulates.

FIG. 40 is very similar to FIG. 39, except that instead of outside polluted air traveling through a water curtain, it is ducted directly into the limewater tank 3907, entering the tank's water through an aerator 4001. Bubbles of outside air 4002 then rise to the surface of the tank, releasing particulates and other pollutants 3911 into the water which then sink to the bottom to form sludge 3912. If these particles are too light and rise to the surface, a flocculent 3926 (shown in FIG. 39) is mixed with the water, causing the particulates to combines or coagulate so that smaller particles form into larger particles, which settle out of the water as sediment and also form part of the sludge 3912 which falls to the bottom of the tank. Meanwhile, the air exits the tank and mixes 608 with recirculating polluted inside air 218 from the building. In all other respects this figure is similar to the last figure except for the way in which the incoming outside air is first treated. However, this figure does not show dehumidifying attachments located downstream of the filter bed in the plant air purifier and prior to the purified air 219 entering the main structure 1701.

Figure 41:
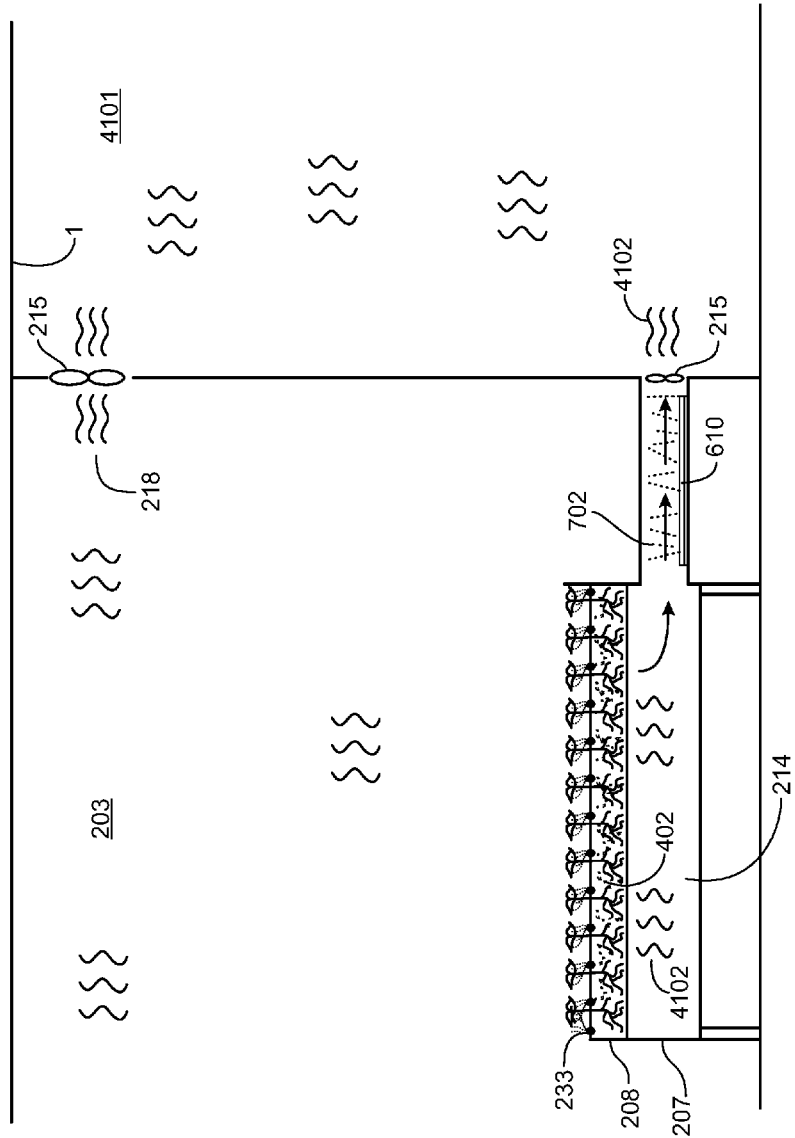
FIG. 41 illustrates a side view of a PAPE within a structure with a common wall to a space whose air is to be purified where overhead ducting is eliminated.

FIG. 41 is a simple humidifier air purifier for a large space without overhead ducting. Here a PAPE 203 adjoins a room of conditioned space 4101. Impure air 218 is drawn from the conditioned space via an induction fan 215 in the wall close to the ceiling 1 and travels into the PAPE. It is than drawn down to the plant air purifier 207 where it passes through the filter bed 208 which contains moisture 402. Moisture is provided by the micro irrigation emitters 233 on the surface of the filter bed. As the air passes through the filter bed it picks up moisture. The now humidified air 4102 is than drawn via another induction fan 215 in the plenum 214 of the plant air purifier 207 into a duct with a UV light 610. As the air passes over the UV light, the light 702 helps to kill pathogens which the plant air purifier had not completely disposed of. The humidified air 4102 than reenters the conditioned space 4101 adjacent to the plant air purification enclosure where it repeats the process ad infinitum.

Figure 42A:
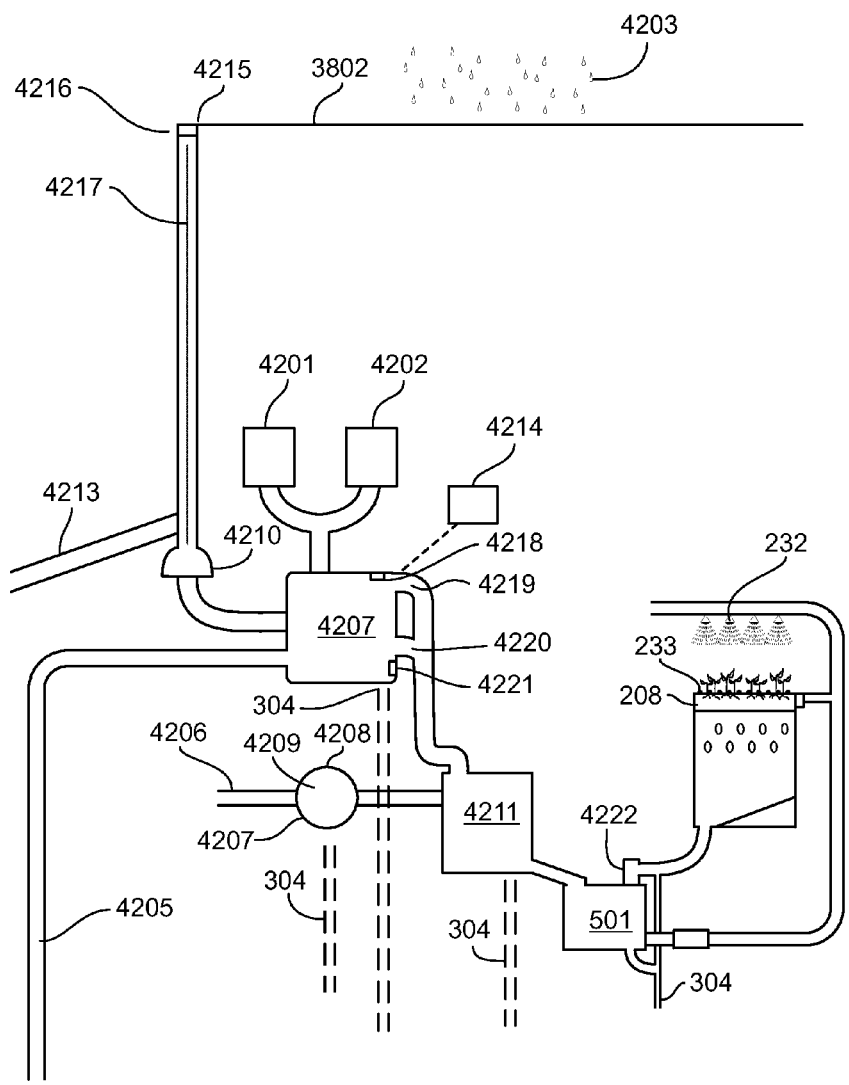
FIG. 42A illustrates a side view of a building with sources of water for a plant air purifier, with holding tanks, water connections and drains.

FIG. 42A is a schematic showing various sources of water which can be utilized for moisturization of the filter bed and for the plants in the plant air purifier located within the PAPE. These water sources are herein listed in order of preference since plants prefer chemical free water. Water can come from dehumidifiers 4201 and air conditioners 4202 where condensed moisture forms on the cooling coil of these devices. It can come from rainwater 4203 which is deposited on the roof 3802, from a well 4205 and from a municipal water supply 4206. Because municipalities tend to put chlorine and fluorides into their water this is the least desirable source of water. Since the ideal temperature that the plants like is 65 to 85 degrees Fahrenheit, water from any of these sources, except municipal water, goes from its source into an acclimation tank 4207. The tank should be placed in a location where the ambient air is within the desired temperature range which plants in the plant air purifier prefer. Basement or sub-grade areas near the boiler or furnace often have such a temperature.

A thermostat or thermo sensor 4218 measures the temperature within the acclimation tank and does not allow water out of the acclimation tank unless the temperature of water to be released is in the range of about 65-85 degrees F. In this case there is a temperature gauge at a lower point 4221 in the acclimation tank and one higher up 4218 since heat rises. If water is within the range higher up, water will first be taken from the higher exit port 4219 as opposed to the lower exit port 4220. It then goes to the $2^{nd}$ tank, the irrigation refill tank 4211, and then to the irrigation tank 501 and from then to the filter beds 208 in the plant air purifier(s). It is preferable that the larger tank should always be the first tank and the other tanks downstream equal or smaller in size. If water gets too low in any tank downstream, it can be refilled by a pump or by means of a gravity feed. It is advisable that all tanks downstream be at a lower level than the one before it so that a gravity can feed the next tank down the line thus saving on energy.

Watering of the filter bed will wash out all excess salts and fertilizer residue. A problem might arise if the water is continually recirculated as salt will build up in the water. Therefore it is better if all reservoirs have the capability of being backwashed, or have a sand filter 4222 to filter the water before used water returns to a reservoir. After back washing the back washed water should go down a drain 304. This procedure should occur periodically. Overhead sprinklers could also add dust to the mix and to a reservoir where that water which runs out of the filter bed when the overhead sprinklers had run been allowed to re-enter a reservoir. It is advisable any time the overhead sprinkler 232 runs that all water coming from the sprinkler and draining down through the filter bed 208 therefrom should go down a drain 304.

Water coming from a municipal source 4206 where usually chemicals have been put into the water, goes through a dechlorination tank 4208. This tank also may act as an acclimation tank. It is open faced 4209 so chlorine within the water can escape into the air. When water comes from the roof 3802 as rainwater 4203, it goes through a limestone container 4210 so as to buffer the acidity from what might be acid rain. The recirculation tank 501 takes water, passes it through the micro irrigation system and through emitters 233 and through the overhead sprinklers 232. The water moisturizes the filter bed 208 and then often returns to the recirculation tank 501 to be recycled. If the water is too dirty it goes down the drain 304. Well 4205 water is desirable and preferred over municipal water 4206 but if a facility has municipal water it rarely has a well. In the figure a well 4205 is placed near the outside of the building. All tanks have drains 304 so that water may be removed from the tanks. If a tank becomes overfilled or in danger of becoming overfilled, excess water can go down the drain. If water in the acclimation tank fills to capacity, excess water drains back through the limestone base and can run through a diverting gutter 4213. Signals can also be sent to the BAS (building automation system) 4214 so that rainwater is diverted through a diverting gutter if the acclimation tank 4207 is full. Heat tape 4215 can be used near the roof drain 4216 so that water continues to flow during the winter and a heat tape wire 4217 can be dropped down the drain pipe to prevent freezing and cracking of the pipe itself.

Figure 42B:
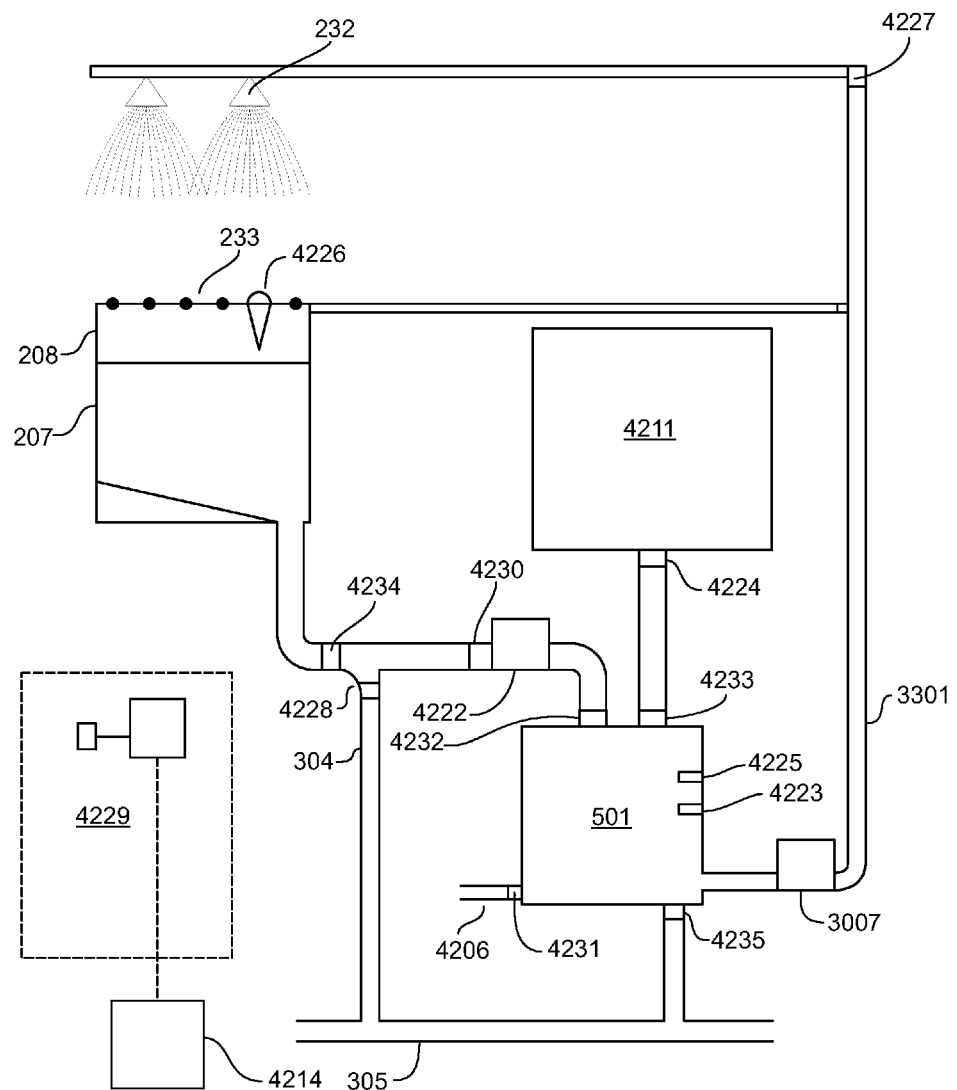
FIG. 42B illustrates a schematic layout of plumbing connections between a plant air purifier and its various holding tanks, said plumbing providing for back washing.

FIG. 42B shows how water enters both the overhead water sprinkler and the micro irrigation from the irrigation reservoir and how the irrigation reservoir is automatically cleaned and the filter backwashed when necessary.

Replenishment of the irrigation reservoir 501 partially comes from filtered water which leaves the plant air purifier 207. It passes by the drain 304 to the sewer 305, which is closed, passes through a filter, in this case a sand filter 4222, and enters the irrigation reservoir 501. If the water returning to the irrigation reservoir returns enough water so that the water level is higher than the irrigation reservoir's replenishment water sensor 4223 then no additional water enters from the irrigation refill tank 4211. If, however, the returning water from the plant air purifier does not bring the water level above the irrigation reservoir's replenishment water sensor, than the irrigation refill reservoir solenoid valve 4224 allows water to enter the irrigation reservoir 501 until water reaches the optimum level water sensor 4225. The irrigation refill tank solenoid valve solenoid valve 4224 then closes.

Moisturizing of the filter bed 208 within the plant air purifier 207 of the plant air purification enclosure occurs normally when the moisture sensor 4226 within the plant air purifier 207 signals that moisture is needed. A solenoid valve 4227 for the feed to the overhead sprinkler closes and a pump 3007 pumps the water up through a feed 3301 to the emitters 233 located on or close to the surface of the filter bed 208 within the plant air purifier. When the moisture sensor determines that there is enough moisture in the filter bed, the pump which sends water to the emitters is shut off.

When the dust removal process is to proceed, the overhead sprinkler solenoid valve 4227 is opened. This allows water to flow through the overhead sprinkler 232 and the pump 3007 which pumps water to both the overhead sprinkler 232 and the filter bed surface emitters 233, while the stopper 4228 which allows water to flow down the first drain 304 to the sewer 305 is opened. After a specific time setting has been reached for the dust removal process to run, the micro processor 4229 or the BAS 4214 shuts off the pump 3007 which supplies water to both the overhead sprinkler 232 and the emitters 233 and the overhead sprinkler solenoid valve 4227 is closed. Then a few minutes (predetermined time) after the dust removal process has been completed, the solenoid stopper 4228 is closed. Thereafter, when water leaves the plant air purifier, it will pass through the sand filter 4222 and enter the irrigation tank 501.

To eliminate clogging of the filter 4222 leading into the irrigation reservoir 501, a pressure gauge 4230 measures water flow or a timer located within the microprocessor determines that the filter 4222 upstream of the irrigation reservoir 501 should be back washed. The municipal water 4206 feed valve 4231 is then opened into the irrigation reservoir 501. Water fills the tank than moves up through the opening 4232 by which water had entered the tank from the plant air purifier and backwashes the filter 4222 which had been clogged. Impurities and dirty water from the back washing process now pass down the drain leading to the sewer which hitherto had been closed by stopper 4228, which is now opened. A check valve or backwater valve 4233 prevents water from rising into the pipe which leads to the irrigation refill tank 4211 and a similar check valve 4234 is placed downstream of the drain pipe leading to the plant air purifier. Once sufficient time has passed after water back washes the filter, the solenoid valve 4231 for the municipal water feed 4206 is turned off and the irrigation reservoir drain stopper 4235 opens allowing all water within the tank to drain away, while the stopper 4228 is closed on the drain leading to the sewer further upstream. During this process the water level sensor 4225 which activate the water feed from the irrigation refill reservoir 4211 is disabled.

To automatically clean the irrigation reservoir 501 of salt and scum buildup, the stopper 4235 for the drain at the bottom of the irrigation reservoir is in the closed position and the check valve 4232 closed downstream of the sand filter. Water from the municipal feed 4206 enters the reservoir 501 and fills the reservoir to the top or close thereto, whereupon the irrigation reservoir's municipal water feed valve 4231 is closed. Because water from the municipal feed is pressurized, its circulating motion, as it fills the irrigation tank, helps to dislodge grit and scum on the sides of the reservoir itself. Once the irrigation reservoir is filled, the municipal water valve feed 4231 is closed and the drain 4235, situated below the irrigation reservoir is opened. The dirty water and debris within the reservoir then drain away. Once the dirty water empties itself from the irrigation reservoir, the stopper 4235 at the top of the drain is closed once more. This method of cleaning the irrigation reservoir may be repeated a number of times for added effectiveness. When completed, the level sensors 4223 and 4225 within the irrigation reservoir are reactivated and water from the irrigation refill tank 4211 refills the irrigation reservoir 501.

Automation of all of these processes is controlled by a micro processor 4229, which functions on its own, or the BAS 4214 can oversee these functions, or the two can work together.

Figure 42C:
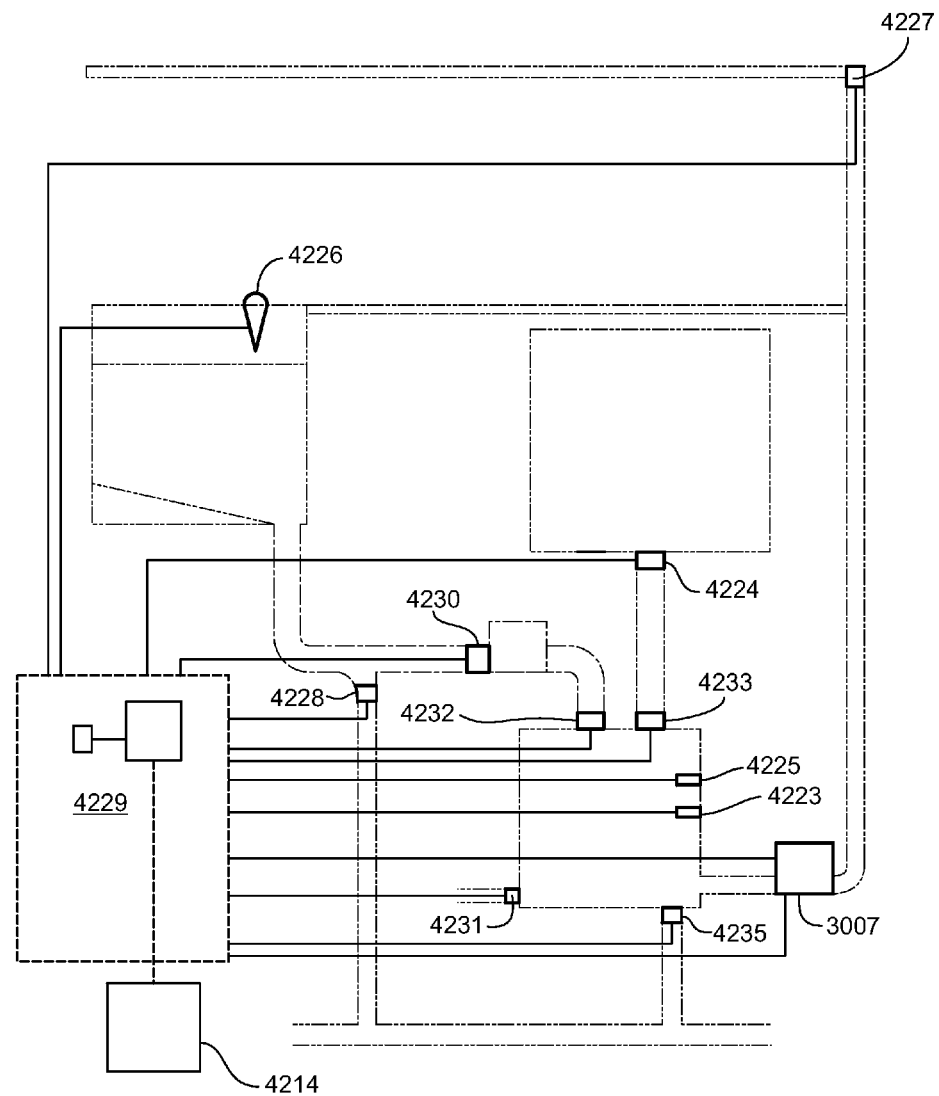
FIG. 42C illustrates an electrical layout between the various plumbing connections of FIG. 42A and a micro processor and a BAS.

FIG. 42C shows how the microprocessor 4229 is electronically attached to various of the components within the system, namely the irrigation reservoir's replenishment water sensor 4223, the irrigation refill reservoir solenoid valve 4224, the optimum level water sensor 4225, the moisture sensor 4226, the solenoid valve for the overhead sprinkler 4227, the stopper for the drain just after the plant air purifier 4228, the pressure gauge 4230, the municipal water feed valve 4231, the water entree opening to the irrigation reservoir from the plant air purifier 4232, the irrigation reservoir stopper 4235 and the water pump 3007. Lines from the microprocessor 4229 to these components shows the connection between them. A connection of the microprocessor 4229 to the BAS 4214 is necessary so that those overseeing management of the building may be notified if a problem or malfunction occurs.

Figure 43:
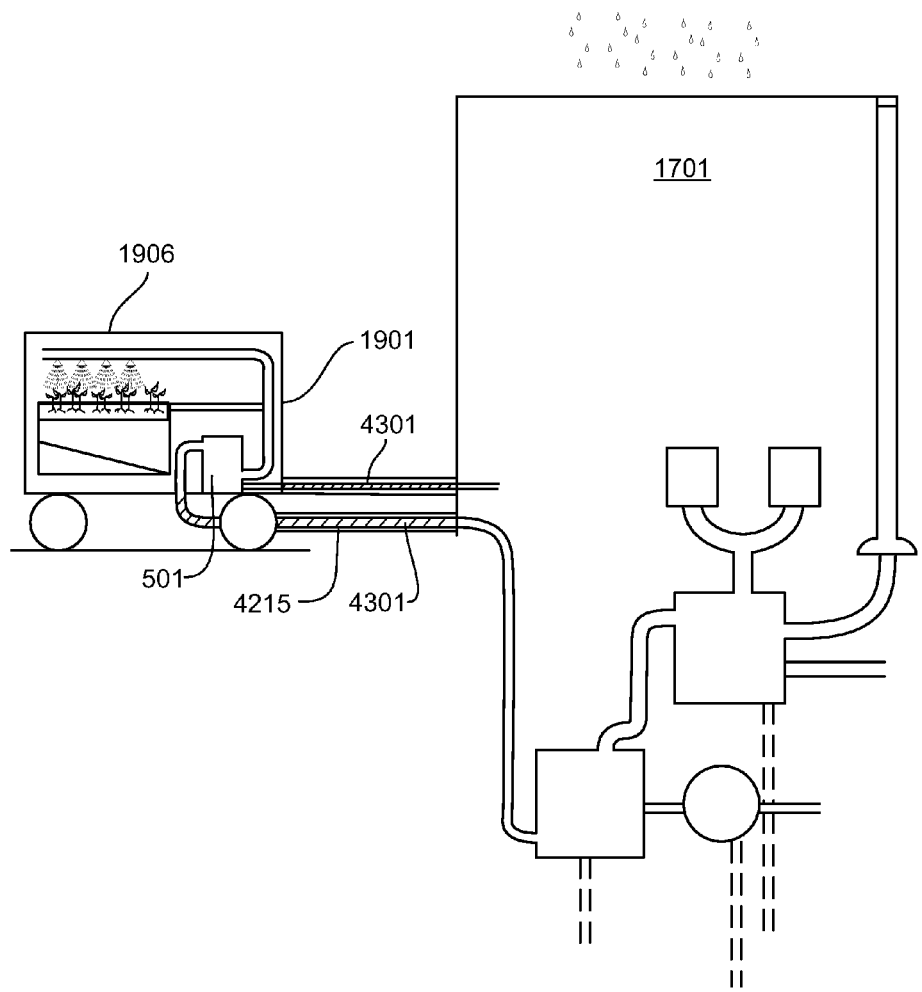
FIG. 43 illustrates a side view of an abbreviated version of FIG. 41, where a Mobile PAPE purifies the air of the main structure, in place of a plant air purifier being within the structure itself.

FIG. 43 is the same as FIG. 42A except that the plant air purifier is situated in a mobile PAPE 1901 or in a separate structure 1906. In such a circumstance all tanks other than the recirculation tank 501 are kept in the main structure 1701 and water is fed to the separate structure or mobile PAPE 1901 through insulated water feeds 4301 with heat tape 4215 around the feed lines.

Figure 44:
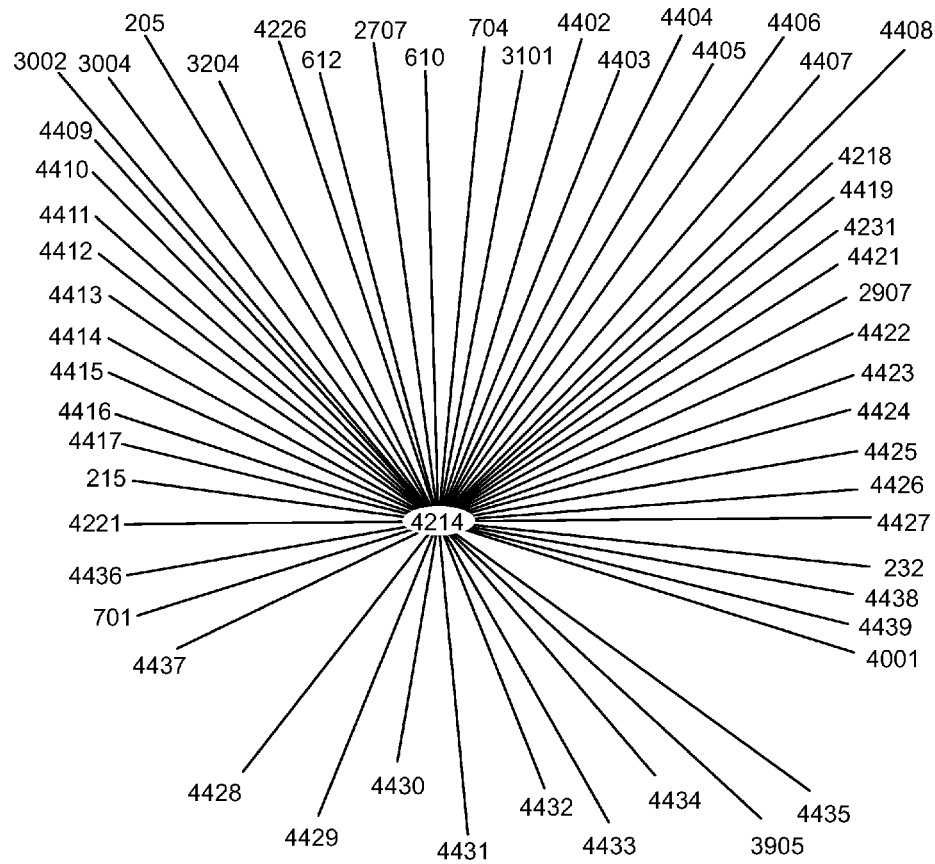
FIG. 44 illustrates a diagrammatic sketch showing the connections between a BAS and the various components which work in conjunction with a PAPE.

FIG. 44 is a schematic drawing showing the various pieces of apparatus and equipment the Building Automated management system 4214 (BAS) is connected to which are both in and out of the PAPE but which have to do with its functioning properly. The various pieces are:
1. The emergency generator 3002
2. The emergency baseboard heating within the enclosure 3004
3. The overhead damper 205
4. The ceiling vents within the enclosure 3204
5. The moisture sensor in the filter bed of the plant air purifier 4401
6. The emergency outside air vent for the enclosure 612
7. The motor which moves the movable insulation covering natural light sources 2707
8. The ultraviolet lights overhead and in the duct leading away from the plant air purifier 610 & 704
9. The emergency furnace 3101
10. The gauge which monitors the amount of propane in the propane tank 4402
11. The drain valves within the acclimation tank, recirculation tank, the de-chlorination tank and the irrigation tank, 4403, 4226, 4405, 4406
12. The thermostat which records the temperature level within the PAPE 4407
13. The sensor which tells if electricity to the structure and to the PAPE is on 4408
14. The water level gauges in the various water tanks used to supply water to the plant air purifier and the overhead water sprinkler 4409, 4410, 4411, 4412
15. The outdoor temperature gauge 4413
16. The heat tape electrical feeds to the water feeds, air ducts, and the roof down spout, 4414, 4415, 4416
17. The water shunt that directs water from the roof into the acclimation tank or the diversion gutter 4417
18. The induction fan within the plant air purifier 215

19. The ceiling vents attached to the overhead duct within the enclosure 3204
20. The temperature gauges within the acclimation tank 4218, 4221
21. The filter gauge within the limewater tank, 4419
22. The water feed valve from the municipal utility 4231
23. The timer for water placed in the de-chlorination tank 4421
24. The fin which opens and closes the lower chamber within the Styrofoam bead container 2907
25. The blowers which blow Styrofoam beads into the upper chamber which covers the window or wall which lets in light to where the plants in the plant air purifier are located 4422
26. The on/off light switches for the florescent and LED lights within the enclosure 4423, 4424
27. The pumps which pump water from the various water tanks 4425, 4426, 4427, 4428
28. The damper which sets the amount of air from the overhead duct which enters the enclosure and the amount that by passes the chamber 4429
29. The damper which allows air within the enclosure to escape through the HVAC system 4430
30. The water gauges which monitor the amount of water in the various water tanks 4431, 4432, 4433, 4434
31. The water curtain 3905
32. The air conditioner sensor 4435
33. The on/off sensor for the humidifier 4436
34. The overhead sprinkler 232
35. The air diffusers 701
36. The flocculent dispenser 4437
37. The limewater feed 4438
38. Various drains which are exit ports for the limewater tank 4439
39. The aerator which bubbles air into the limewater tank 4001

While a wide variety of features were illustrated in the various figures, this should not be taken to imply that a particular embodiment of the invention must employ all of the features shown in any particular figure. Rather, as a general rule, the various features illustrated in the various figures can be combined or not with one another, as is most appropriate to any given air purification situation given physical and cost constraints.

The knowledge possessed by someone of ordinary skill in the art at the time of this disclosure is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A plant air purification enclosure for enabling a plant air purifier to purify air in a building structure, comprising:
    an enclosure separating an interior space therein from an exterior space external thereto, said enclosure providing thermal insulation and substantially preventing moisture and air flow, between said interior and exterior spaces;
    incoming and outgoing air openings connecting said interior space with said exterior space, configured such that—exclusive of any emergency source of air which may optionally be provided—substantially all exchange of thermal energy and air between said interior and exterior spaces transpire through said openings;
    a plant air purifier containment within said interior space, said containment configured for containing at least one filter bed of a plant air purifier and plants growing within said at least one filter bed;
    at least one water source, situated relative to said plant air purifier containment to deliver water for plant growth to a plant air purifier, when the plant air purifier is contained within said containment;
    at least one source of growing light, situated relative to said plant air purifier containment to deliver light for plant growth to a plant air purifier, when the plant air purifier is contained within said containment;
    at least one air movement apparatus for causing impure air arriving from said exterior space via said incoming air opening to move from said incoming air opening, through a filter bed containment region of said containment, to said outgoing air opening, and be returned via said outgoing air opening as purified air to said exterior space; and
    said thermal insulation in combination with thermal energy from said impure air arriving from said exterior space via said incoming air opening maintaining the temperature within said interior space within a range suitable for plant growth; and said plant air purification enclosure further comprising at least one of the following:
    a work counter;
    a sink;
    sufficient space to physically accommodate a human being working therein;
    an emergency generator for supplying power to said plant air purification enclosure when a usual source of power is inoperative;
    backup batteries for supplying power to said plant air purification enclosure when a usual source of power is inoperative;
    baseboard heating;
    forced air heating;
    propane heating;
    an emergency water source for supplying water for the plants when said at least one water source is inoperative;
    an emergency source of air for supplying air to the plants when air arriving via said incoming air opening is insufficient to sustain the plants;
    an excess heat vent for discharging excess heat.

2. The plant air purification enclosure of claim 1, said at least one water source comprising a top leaf surface cleaning water source situated and oriented relative to said containment so as to clean a top surface of the plants within the plant air purifier when the plant air purifier is contained within said containment.

3. The plant air purification enclosure of claim 2, said at least one water source further comprising a bottom leaf surface cleaning water source situated below said top leaf surface cleaning water source and oriented relative to said containment so as to clean a bottom surface of the plants within the plant air purifier when the plant air purifier is contained within said containment.

4. The plant air purification enclosure of claim 3, said at least one water source further comprising a filter bed watering source situated below said bottom leaf surface cleaning water source, emitting water directly onto the filter bed so as to moisturize said filter bed when the plant air purifier is contained within said containment, without said water substantially contacting the leafs of the plants.

5. The plant air purification enclosure of claim 1, said at least one water source comprising a bottom leaf surface cleaning water source situated and oriented relative to said containment so as to clean a bottom surface of the plants within the plant air purifier when the plant air purifier is contained within said containment.

6. The plant air purification enclosure of claim 1, said at least one water source comprising a micro irrigation system.

7. The plant air purification enclosure of claim 1, wherein said plant air purifier containment comprising the capability to contain filter beds at a plurality of vertically-distinct levels.

8. The plant air purification enclosure of claim 7, further comprising, at each of said levels:
    at least one water source comprising a top leaf surface cleaning water source situated and oriented relative to said containment so as to clean a top surface of the plants within the plant air purifier when the plant air purifier is contained within said containment; and
    said at least one water source comprising a bottom leaf surface cleaning water source situated below said top leaf surface cleaning water source and oriented relative to said containment so as to clean a bottom surface of the plants within the plant air purifier when the plant air purifier is contained within said containment.

9. The plant air purification enclosure of claim 1, said at least one water source selected from the water source group consisting of: water produced by a dehumidifier; water produced by an air conditioner; captured rainwater; rainwater purified by limestone; well water; water from a municipal water supply which water is dechlorinated prior application to the plants; water from a backwash reservoir which water has had salt or dirt filtered therefrom prior application to the plants; water stored in an acclimation tank for acclimating a temperature of said water into a range suitable for application to the plants.

10. The plant air purification enclosure of claim 1, further comprising a UVC light source situated to sterilize the air passing through said plant air purification enclosure before said air is returned to said exterior space.

11. The plant air purification enclosure of claim 1, said light source comprising at least one of:
    a substantially transparent window through which light can penetrate from said exterior space into said interior space; and
    a substantially transparent skylight through which light can penetrate from said exterior space into said interior space.

12. The plant air purification enclosure of claim 1, said light source comprising an artificial grow light source.

13. The plant air purification enclosure of claim 1, further comprising an integrated grow and sterilization light fixture integrating an artificial grow light source for providing said at least one source of growing light, and a UVC light source providing sterilization light for sterilizing the air passing through said plant air purification enclosure before said air is returned to said exterior space; wherein:
    said UVC light source is oriented to direct UVC light in a first direction toward impure air arriving via said incoming air opening; and
    said grow light source is oriented to direct grow light in a second direction toward said plants, when the plant air purifier is contained within said containment.

14. The plant air purification enclosure of claim 13, said integrated grow and sterilization light fixture further comprising a shield substantially preventing said UVC light from propagating in a direction other than said first direction, so as to minimize the exposure of human eyes to said UVB light.

15. The plant air purification enclosure of claim 1, wherein said thermal insulation in combination with thermal energy from said impure air maintains the temperature within said interior space within a range suitable for plant growth by ensuring that during air purification operation, air passing through said enclosure does not have its temperature altered by more than five (5) degrees F. between when it enters and when it exits said enclosure.

16. The plant air purification enclosure of claim 1, said thermal insulation comprising at least one insulator selected from the insulator group consisting of: straw bales; straw panels; polyurethane; phenol-cored sandwich panels with layers of steel; phenol cored sandwich panels with layers of aluminum, polyurethane-cored sandwich panels with at least one side comprising steel; polyurethane-cored sandwich panels with at least one side comprising flexible sheet; Styrofoam; polyethylene; polyethylene beads; poly carbon; foam; and fiberglass.

17. The plant air purification enclosure of claim 1, wherein said incoming air opening is connected to, and receives air from, an HVAC system situated in said exterior space.

18. The plant air purification enclosure of claim 1, wherein:
    said plant air purification enclosure is a structure separate and distinct from, and situated outside of, the building;
    said incoming and outgoing air openings connect said plant air purification enclosure to an inside of the building through an exterior wall or roof of the building;
    said thermal insulation in combination with said thermal energy from said impure air is sufficient to enable said plant air purification enclosure to be placed out of doors in both the summer and the winter without damaging plants placed therein.

19. The plant air purification enclosure of claim 18, wherein:
    said plant air purification enclosure is mobile, wherein it can be moved to a location exterior and proximate to the building, from another location remote from the building;
    said incoming and outgoing air openings, at will, can be connected to and disconnected from the exterior wall or roof of the building; and
    said plant air purification enclosure, once a plant air purifier is contained within said containment, can thereafter be activated and used to purify air from inside the building.

20. The plant air purification enclosure of claim 1, wherein:
    said plant air purification enclosure is mobile; and
    said incoming and outgoing air openings, at will, can be connected in series with incoming and outgoing air openings of a second plant air purification enclosure to increase the air purification capacity thereof.

21. The plant air purification enclosure of claim 1, wherein said plant air purification enclosure is situated in an unconditioned space inside of the building.

22. The plant air purification enclosure of claim 1:
said incoming opening configured to deliver into said interior space through said enclosure, incoming air comprising impure air drawn from inside the building mixed with air drawn from outside the building; and
said incoming opening configured therein to provide thermal contact and permit heat exchange between said impure air drawn from inside the building and said air drawn from outside the building.

23. The plant air purification enclosure of claim 1, further comprising a heating apparatus within said enclosure for heating air within said enclosure.

24. The plant air purification enclosure of claim 1, further comprising a cooling apparatus within said enclosure for cooling air within said enclosure.

25. The plant air purification enclosure of claim 1, further comprising a limewater source, and said incoming air opening configured to pass incoming air through said limewater.

26. The plant air purification enclosure of claim 1, further comprising a wet scrubber for removing nitric oxide and SO2 from air, and said incoming air opening configured to pass incoming air through said wet scrubber.

27. The plant air purification enclosure of claim 1, further comprising an aerator, and said incoming air opening configured to pass incoming air through said aerator.

28. The plant air purification enclosure of claim 1, further comprising a dehumidifying apparatus for removing moisture from the air before said purified air is returned to said exterior space.

29. The plant air purification enclosure of claim 1, further comprising a humidifying apparatus for adding moisture to the air before said purified air is returned to said exterior space.

30. The plant air purification enclosure of claim 1, said containment further containing at least one filter bed of a plant air purifier and plants growing within said at least one filter bed.

31. The plant air purification enclosure of claim 1, further comprising a control system which closes the passage of air through said air openings responsive to at least one of the following conditions:
at least one of said water sources is operating;
a predetermined amount of water is dripping down through a filter bed;
air that would otherwise enter through said incoming and outgoing air opening is at a temperature either lower than 65 degrees F. or higher than 85 degrees F.

32. The plant air purification enclosure of claim 1, further comprising sensors which notify a control system responsive to sensing at least one of the following conditions:
that the temperature within said interior space is outside of said range suitable for plant growth;
that said air arriving from said exterior space has not been arriving for a predetermined period of time;
that said air arriving from said exterior space is outside of said range suitable for plant growth;
that a power source for operating said plant air purification enclosure is inoperative;
that at least one of said source of light is inoperative;
that least one of said water sources is inoperative; and
that a moisture sensor for detecting a level of moisture within a filter bed is inoperative.

33. The plant air purification enclosure of claim 1, further comprising a control system; and at least one of:
an emergency generator responsive to said control system, for supplying power to said plant air purification enclosure when it is detected that a usual source of power is inoperative;
an emergency heater responsive to said control system, for supplying heat to said plant air purification enclosure when it is detected that a usual source of heat is inoperative;
an emergency cooler responsive to said control system, for supplying cooling to said plant air purification enclosure when it is detected that a usual source of cooling is inoperative;
dampers or vents responsive to said control system, for allowing and preventing the air flow of air into said enclosure, in response to one or more of: when said water sources are operating; and the level of moisture sensed to be in said at least one filter bed;
a movable opaque barrier responsive to said control system, for permitting and blocking the penetration of light from said exterior space into said interior space;
a UVC light source responsive to said control system, situated to sterilize the air passing through said plant air purification enclosure before said air is returned to said exterior space;
said at least one source of growing light, responsive to said control system;
said at least one water source, responsive to said control system;
said at least one air movement apparatus, responsive to said control system;
a dehumidifying apparatus, responsive to said control system, for removing moisture from the air before said purified air is returned to said exterior space;
a humidifying apparatus, responsive to said control system, for adding moisture to the air before said purified air is returned to said exterior space;
a limewater source, responsive to said control system, with said incoming air opening configured to pass incoming air through said limewater; and
an aerator, responsive to said control system, with said incoming air opening configured to pass incoming air through said aerator.

34. A method of providing a plant air purification enclosure for enabling a plant air purifier to purify air in a building structure, comprising:
establishing an enclosure separating an interior space therein from an exterior space external thereto by providing thermal insulation and a substantial barrier to moisture and air flow, between said interior and exterior spaces;
connecting said interior space with said exterior space by configuring incoming and outgoing air openings such that—exclusive of any emergency source of air which may optionally be provided—substantially all exchange of thermal energy and air between said interior and exterior spaces transpire through said openings;
configuring a plant air purifier containment within said interior space for containing at least one filter bed of a plant air purifier and plants growing within said at least one filter bed;
situating at least one water source relative to said plant air purifier containment for delivering water for plant growth to a plant air purifier, when the plant air purifier is contained within said containment;

situating at least one source of growing light relative to said plant air purifier containment for delivering light for plant growth to a plant air purifier, when the plant air purifier is contained within said containment;

causing impure air arriving from said exterior space via said incoming air opening to move from said incoming air opening, through a filter bed containment region of said containment, to said outgoing air opening, and be returned via said outgoing air opening as purified air to said exterior space, using at least one air movement apparatus; and maintaining the temperature within said interior space within a range suitable for plant growth using said thermal insulation in combination with thermal energy from said impure air arriving from said exterior space via said incoming air opening; and said method further comprising at least one of the following:

a work counter;

a sink;

a human being working therein, physically accommodated by a space sufficient therefor;

supplying power to said plant air purification enclosure when a usual source of power is inoperative, using an emergency generator therefor;

supplying power to said plant air purification enclosure when a usual source of power is inoperative, using backup batteries therefor;

baseboard heating;

forced air heating;

propane heating;

supplying for watering the plants when said at least one water source is inoperative, using an emergency water source therefor;

supplying air to the plants when air arriving via said incoming air opening is insufficient to sustain the plants, using an emergency source of air therefor;

discharging excess heat using an excess heat vent therefor.

35. The method of claim 34, further comprising cleaning a top surface of the plants within the plant air purifier when the plant air purifier is contained within said containment, using said at least one water source comprising a top leaf surface cleaning water source, situated and oriented relative to said containment therefor.

36. The method of claim 35, further comprising cleaning a bottom surface of the plants within the plant air purifier when the plant air purifier is contained within said containment, using said at least one water source comprising a bottom leaf surface cleaning water source, situated below said top leaf surface cleaning water source and oriented relative to said containment therefor.

37. The method of claim 36, further comprising moisturizing said filter bed when the plant air purifier is contained within said containment, using said at least one water source further comprising a filter bed watering source situated below said bottom leaf surface cleaning water source, emitting water directly onto the filter bed without said water substantially contacting the leafs of the plants.

38. The method of claim 34, further comprising cleaning a bottom surface of the plants within the plant air purifier when the plant air purifier is contained within said containment, using said at least one water source comprising a bottom leaf surface cleaning water source, situated and oriented relative to said containment therefor.

39. The method of claim 34, said at least one water source comprising a micro irrigation system.

40. The method of claim 34, further comprising configuring said plant air purifier containment for containing filter beds at a plurality of vertically-distinct levels.

41. The method of claim 40, further comprising, at each of said levels:

cleaning a top surface of the plants within the plant air purifier when the plant air purifier is contained within said containment, using said at least one water source comprising a top leaf surface cleaning water source, situated and oriented relative to said containment therefor; and cleaning a bottom surface of the plants within the plant air purifier when the plant air purifier is contained within said containment, using said at least one water source comprising a bottom leaf surface cleaning water source, situated below said top leaf surface cleaning water source and oriented relative to said containment therefor.

42. The method of claim 34, said at least one water source selected from the water source group consisting of: water produced by a dehumidifier; water produced by an air conditioner; captured rainwater; rainwater purified by limestone; well water; water from a municipal water supply which water is dechlorinated prior application to the plants; water from a backwash reservoir which water has had salt or dirt filtered therefrom prior application to the plants; water stored in an acclimation tank for acclimating a temperature of said water into a range suitable for application to the plants.

43. The method of claim 34, further comprising sterilizing the air passing through said plant air purification enclosure before said air is returned to said exterior space, using a UVC light source situated therefor.

44. The method of claim 34, further comprising delivering said light for plant growth using at least one of:

a substantially transparent window through which light can penetrate from said exterior space into said interior space; and a substantially transparent skylight through which light can penetrate from said exterior space into said interior space.

45. The method of claim 34, said light source comprising an artificial grow light source.

46. The method of claim 34, further comprising an artificial grow light source delivering said light for plant growth using, and providing sterilization light for sterilizing the air passing through said plant air purification enclosure before said air is returned to said exterior space, using an integrated grow and sterilization light fixture comprising:

a UVC light source oriented to direct UVC light in a first direction toward impure air arriving via said incoming air opening; and said grow light source oriented to direct grow light in a second direction toward said plants, when the plant air purifier is contained within said containment.

47. The method of claim 46, said integrated grow and sterilization light fixture further comprising substantially preventing said UVC light from propagating in a direction other than said first direction, so as to minimize the exposure of human eyes to said UVB light, using a shield therefor.

48. The method of claim 34, said thermal insulation in combination with thermal energy from said impure air maintaining the temperature within said interior space within a range suitable for plant growth by ensuring that during air purification operation, air passing through said enclosure does not have its temperature altered by more than five (5) degrees F. between when it enters and when it exits said enclosure.

49. The method of claim 34, further comprising providing said thermal insulation using at least one insulator selected from the insulator group consisting of: straw bales; straw panels; polyurethane; phenol-cored sandwich panels with layers of steel; phenol cored sandwich panels with layers of aluminum, polyurethane-cored sandwich panels with at least one side comprising steel; polyurethane-cored sandwich panels with at least one side comprising flexible sheet; Styrofoam; polyethylene; polyethylene beads; poly carbon; foam; and fiberglass.

50. The method of claim 34, said incoming air opening connected to, and receiving air from, an HVAC system situated in said exterior space.

51. The method of claim 34, further comprising:
   embodying said plant air purification enclosure in a structure separate and distinct from, and situated outside of, the building; and
   connecting said plant air purification enclosure to an inside of the building through an exterior wall or roof of the building, through said incoming and outgoing air openings; wherein:
   said thermal insulation in combination with said thermal energy from said impure air is sufficient to enable said plant air purification enclosure to be placed out of doors in both the summer and the winter without damaging plants placed therein.

52. The method of claim 51, further comprising:
   providing said plant air purification enclosure in a mobile embodiment;
   moving said plant air purification enclosure to a location exterior and proximate to the building, from another location remote from the building; and
   connecting to said incoming and outgoing air openings to the exterior wall or roof of the building; wherein:
   said plant air purification enclosure, once a plant air purifier is contained within said containment, can thereafter be activated and used to purify air from inside the building.

53. The method of claim 34, further comprising:
   providing said plant air purification enclosure in a mobile embodiment; and
   increase the air purification capacity of said plant air purification enclosure by connecting said incoming and outgoing air openings in series, at will, with incoming and outgoing air openings of a second plant air purification enclosure.

54. The method of claim 34, situating said plant air purification enclosure in an unconditioned space inside of the building.

55. The method of claim 34:
   delivering into said interior space through said enclosure, a mix of incoming air comprising impure air drawn from inside the building and air drawn from outside the building, using said incoming opening configured therefor; and
   providing thermal contact and permitting heat exchange between said impure air drawn from inside the building and said air drawn from outside the building, using said incoming opening configured therein, therefor.

56. The method of claim 34, further heating air within said enclosure using a heating apparatus within said enclosure, therefor.

57. The method of claim 34, further comprising cooling air within said enclosure using a cooling apparatus within said enclosure, therefor.

58. The method of claim 34, further comprising passing incoming air through a limewater source, using said incoming air opening configured therefor.

59. The method of claim 34, further comprising removing nitric oxide and SO2 from air using a wet scrubber, using said incoming air opening is configured to pass incoming air through said wet scrubber.

60. The method of claim 34, further comprising passing incoming air through an aerator, using said incoming air opening configured to pass said incoming air through said aerator.

61. The method of claim 34, further comprising removing moisture from the air before said purified air is returned to said exterior space, using a dehumidifying apparatus therefor.

62. The method of claim 34, further comprising adding moisture to the air before said purified air is returned to said exterior space, using a humidifying apparatus therefor.

63. The method of claim 34, said further comprising containing at least one filter bed of a plant air purifier and plants growing within said at least one filter bed, in said containment.

64. The method of claim 34, further closing the passage of air through said air openings, using a control system responsive to at least one of the following conditions:
   at least one of said water sources is operating;
   a predetermined amount of water is dripping down through a filter bed;
   air that would otherwise enter through said incoming and outgoing air opening is at a temperature either lower than 65 degrees F. or higher than 85 degrees F.

65. The method of claim 34, further comprising notifying a control system responsive to sensors sensing at least one of the following conditions:
   that the temperature within said interior space is outside of said range suitable for plant growth;
   that said air arriving from said exterior space has not been arriving for a predetermined period of time;
   that said air arriving from said exterior space is outside of said range suitable for plant growth;
   that a power source for operating said plant air purification enclosure is inoperative;
   that at least one of said source of light is inoperative;
   that least one of said water sources is inoperative; and
   that a moisture sensor for detecting a level of moisture within a filter bed is inoperative.

66. The method of claim 34, further comprising a control system; and at least one of:
   an emergency generator supplying power to said plant air purification enclosure when it is detected that a usual source of power is inoperative, responsive to said control system;
   an emergency heater supplying heat to said plant air purification enclosure when it is detected that a usual source of heat is inoperative, responsive to said control system;
   an emergency cooler supplying cooling to said plant air purification enclosure when it is detected that a usual source of cooling is inoperative, responsive to said control system;
   dampers or vents allowing and preventing the air flow of air into said enclosure, in response to one or more of: when said water sources are operating; and the level of moisture sensed to be in said at least one filter bed, all responsive to said control system;
   a movable opaque barrier permitting and blocking the penetration of light from said exterior space into said interior space, responsive to said control system;

a UVC light source sterilizing the air passing through said plant air purification enclosure before said air is returned to said exterior space, responsive to said control system;

said at least one source of growing light, responsive to said control system;

said at least one water source, responsive to said control system;

said at least one air movement apparatus, responsive to said control system;

a dehumidifying apparatus removing moisture from the air before said purified air is returned to said exterior space, responsive to said control system;

a humidifying apparatus adding moisture to the air before said purified air is returned to said exterior space, responsive to said control system;

a limewater source with said incoming air opening configured to pass incoming air through said limewater, responsive to said control system; and an aerator, with said incoming air opening configured to pass incoming air through said aerator, responsive to said control system.

* * * * *